US007030863B2

(12) United States Patent
Longe et al.

(10) Patent No.: US 7,030,863 B2
(45) Date of Patent: Apr. 18, 2006

(54) VIRTUAL KEYBOARD SYSTEM WITH AUTOMATIC CORRECTION

(75) Inventors: Michael R. Longe, Seattle, WA (US); Pim van Meurs, Kenmore, WA (US)

(73) Assignee: America Online, Incorporated, Dulles, VA (US)

( * ) Notice: Subject to any disclaimer, the term of this patent is extended or adjusted under 35 U.S.C. 154(b) by 0 days.

(21) Appl. No.: 11/019,517

(22) Filed: Dec. 20, 2004

(65) Prior Publication Data

US 2005/0169527 A1 Aug. 4, 2005

Related U.S. Application Data

(63) Continuation-in-part of application No. 09/580,319, filed on May 26, 2000, now Pat. No. 6,801,190.

(60) Provisional application No. 60/532,131, filed on Dec. 22, 2003, provisional application No. 10/621,864, filed on Jul. 16, 2003.

(51) Int. Cl.
*G09G 5/00* (2006.01)

(52) U.S. Cl. ....................... 345/173; 345/172; 715/533

(58) Field of Classification Search ................ 345/172, 345/173

See application file for complete search history.

(56) References Cited

U.S. PATENT DOCUMENTS 4,454,592 A * 6/1984 Cason et al. ................ 715/708
4,559,598 A * 12/1985 Goldwasser et al. ........ 715/531
4,891,786 A * 1/1990 Goldwasser ................ 715/534
5,317,507 A * 5/1994 Gallant ....................... 715/532
5,748,512 A * 5/1998 Vargas ........................ 708/142
5,784,008 A * 7/1998 Raguseo ...................... 341/20
6,002,390 A * 12/1999 Masui ........................ 345/173
6,585,162 B1 * 7/2003 Sandbach et al. ...... 235/462.44

* cited by examiner

*Primary Examiner*—Dennis-Doon Chow
(74) *Attorney, Agent, or Firm*—Michael A. Glenn; Glenn Patent Group

(57) ABSTRACT

There is disclosed an enhanced text entry system which uses word-level analysis to correct inaccuracies automatically in user keystroke entries on reduced-size or virtual keyboards. A method and system are defined which determine one or more alternate textual interpretations of each sequence of inputs detected within a designated auto-correcting region. The actual interaction locations for the keystrokes may occur outside the boundaries of the specific keyboard key regions associated with the actual characters of the word interpretations proposed or offered for selection, where the distance from each interaction location to each corresponding intended character may in general increase with the expected frequency of the intended word in the language or in a particular context. Likewise, in a virtual keyboard system, the keys actuated may differ from the keys actually associated with the letters of the word interpretations. Each such sequence corresponds to a complete word, and the user can easily select the intended word from among the generated interpretations. Additionally, when the system cannot identify a sufficient number of likely word interpretation candidates of the same length as the input sequence, candidates are identified whose initial letters correspond to a likely interpretation of the input sequence.

58 Claims, 24 Drawing Sheets

VIRTUAL KEYBOARD SYSTEM WITH AUTOMATIC CORRECTION

The present application is a continuation-in-part application to the application, U.S. Ser. No. 09/580,319, filed on May 26, 2000 now U.S. Pat. No. 6,801,190; and claims priority to to U.S. Ser. No. 10/621,864, filed on Jul. 16, 2003, and to U.S. Provisional Patent Application Ser. No. 60/532,131, filed on Dec. 22, 2003 each of which is incorporated herein in its entirety by this reference thereto.

TECHNICAL FIELD OF THE INVENTION

The invention relates to systems that auto-correct sloppy text input due to errors or imprecision in interacting with an input device. More specifically, the invention provides automatic correction for keyboards such as those implemented on a virtual keyboard, gesture-based keyboard, and the like, using word-level analysis to resolve inaccuracies, i.e. sloppy text entry.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated with sufficient accuracy by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or display screen. This handwritten text is then converted into digital data by the recognition software. Unfortunately, in addition to the fact that printing or writing with a pen is in general slower than typing, the accuracy and speed of the handwriting recognition software has to date been less than satisfactory. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail (e-mail).

It would therefore be advantageous to develop a much smaller keyboard for entry of text into a computer. As the size of the keyboard is reduced, the user encounters greater difficulty selecting the character of interest. In general there are two different types of keyboards used in such portable devices. One is the familiar mechanical keyboard consisting of a set of mechanical keys that are activated by depressing them with a finger or thumb. However, these mechanical keyboards tend to be significantly smaller than the standard sized keyboards associated with typewriters, desktop computers, and even laptop computers. As a result of the smaller physical size of the keyboard, each key is smaller and in closer proximity to neighboring keys. This increases the likelihood that the user depresses an unintended key, and the likelihood of keystroke errors tends to increase the faster the user attempts to type.

Another commonly used type of keyboard consists of a touch-sensitive panel on which some type of keyboard overlay has been printed, or a touch-sensitive display screen on which a keyboard overlay can be displayed. Depending on the size and nature of the specific keyboard, either a finger or a stylus can be used to interaction the panel or display screen within the area associated with the key that the user intends to activate. Due to the reduced size of many portable devices, a stylus is often used to attain sufficient accuracy in interactioning the keyboard to activate each intended key. Here again, the small overall size of such keyboards results in a small area being associated with each key so that it becomes quite difficult for the average user to type quickly with sufficient accuracy.

One area of prior development in mechanical keyboards has considered the use of keys that are much smaller than those found on common keyboards. With smaller keys, the user must take great care in controlling each key press. One approach (U.S. Pat. No. 5,612,690) proposes a system that uses up to four miniature keys in unison to define primary characters, e.g. the alphabet, and nests secondary character rows, e.g. numbers, between primary character rows. Selecting a secondary character involves depressing the miniature key from each of the surrounding primary characters. Grouping the smaller keys in this fashion creates a larger apparent virtual key composed of four adjacent smaller keys, such that the virtual key is large enough to be depressed using a finger. However, the finger must interaction the keys more or less precisely on the cross-hairs of the boundaries between the four adjacent keys to depress them in unison. This makes it still difficult to type quickly with sufficient accuracy.

Another area of prior development in both touch screen and mechanical keyboards has considered the use of a much smaller quantity of full-size keys. With fewer keys, each single key press must be associated with a plurality of letters, such that each key activation is ambiguous as to which letter is intended. As suggested by the keypad layout of a touch-tone telephone, many of the reduced keyboards have used a 3-by-4 array of keys, where each key is associated with three or four characters (U.S. Pat. No. 5,818,437). Several approaches have been suggested for resolving the ambiguity of a keystroke sequence on such a keyboard. While this approach has merit for such keyboards with a limited number of keys, it is not applicable to reduced size keyboards with a full complement of keys.

Another approach in touch screen keyboards has considered analyzing the immediately preceding few characters to determine which character should be generated for a keystroke that is not close to the center of the display location of a particular character (U.S. Pat. No. 5,748,512). When the keyboard is displayed on a small touch screen, keystrokes that are off-center from a character are detected. Software compares the possible text strings of probable sequences of two or three typed characters against known combinations, such as a history of previously typed text or a lexicon of text strings rated for their frequency within a context. When the character generated by the system is not the character intended by the user, the user must correct the character before going on to select the a following character because the generated character is used to determine probabilities for the following keystroke.

Recently, various input devices have been introduced that provide new opportunities for user interaction with computers, PDAs, video games, cell phones, and the like.

For example, the laser-projection keyboard offered by companies such as Virtual Keyboard (see http://www.vkb.co.il/) and Canesta (see http://www.canesta.com/) is a projection keyboard that is capable of being fully integrated into smart phones, cell phones, PDAs, or other mobile or wireless devices. The laser-projection keyboard uses a tiny laser pattern projector to project the image of a full-sized keyboard onto a convenient flat surface, such as a tabletop or the side of a briefcase, between the device and the user. The user can then type on this image and the associated electronic perception technology instantly resolves the user's finger movements into ordinary serial keystroke data that are easily used by the wireless or mobile device.

Also known are muscle-sensing keyboards, such as the Senseboard® virtual keyboard (see, for example, http://www.senseboard.com/), which typically consist of a pair of hand modules with a pad that is placed in the palm of the user's hand. A muscle-sensing keyboard enables a user to type without the physical limitations of a standard keyboard. This type of virtual keyboard typically uses sensor technology and artificial intelligence, such as pattern recognition, to recognize the characters that a user is typing. The keyboard detects the movements of the fingers and relates them to how a touch typist would use, for example, a standard QWERTY keyboard. The information thus generated is then transferred to, for example, a mobile device, such as a personal digital assistant (PDA) or a smart phone using, for example, a cable or a Bluetooth wireless connection.

Yet another virtual keyboard is the fabric keyboard (see, for example, http://www.electrotextiles.com/). Such keyboards provide three axes (X, Y and Z) of detection within a textile fabric structure approximately 1 mm thick. The technology is a combination of a fabric sensor and electronic and software systems. The resulting fabric interface delivers data according to the requirements of the application to which it is put. The three modes of sensor operation include position sensing (X-Y positioning), pressure measurement (Z sensing), and switch arrays. Thus, a keyboard can be constructed that detects the position of a point of pressure, such as a finger press, using the interface's X-Y positioning capabilities. The system works even if the fabric is folded, draped, or stretched. A single fabric switch can be used to provide switch matrix functionality. Interpreting software is used to identify the location of switch areas in any configuration, for example to implement keyboard functionality.

Unfortunately, a major obstacle in integrating such virtual keyboards into various data receptive devices is fact that it is very difficult to type accurately when there are no physical keys on which to touch-type. In this regard, the user must rely entirely on hand-eye coordination while typing. Yet most touch typists are taught to type without looking at the keys, relying on tactile feedback instead of such hand-eye coordination. In such virtual keyboards there is literally no point of registration for the user's hands, and thus no tactile feedback to guide the user as he types.

For all of the preceding systems, the fundamental problem is that the specific activations that result from a user's attempts to activate the keys of a keyboard do not always precisely conform to the intentions of the user. On a touch screen keyboard, the user's finger or stylus may hit the wrong character or hit between keys in a boundary area not associated with a specific character. With a miniaturized mechanical keyboard, a given key press may activate the wrong key, or may activate two or more keys either simultaneously or with a roll-over motion that activates adjacent keys in a rapid sequence. And with a virtual keyboard, the lack of tactile feedback allows the user's fingers to drift away from the desired key registrations. Other examples include common keyboards operated by users with limited ranges of motion or motor control, where there is a limited ability to consistently strike any particular space or key; or where the limb, such as in the case of an amputee, or the gloved hand or finger, or the device used to make the entry, such as a stylus, is far larger than the targeted key or character space.

It would be advantageous to provide an enhanced text entry system that uses word-level disambiguation to correct inaccuracies in user keystroke entries automatically, especially with regard to virtual keyboards.

SUMMARY OF THE INVENTION

The invention provides an enhanced text entry system that uses word-level disambiguation to correct inaccuracies in user keystroke entries automatically, especially with regard to virtual keyboards.

Specifically, the invention provides a text entry system comprising:

- a user input device comprising a virtual keyboard including an auto-correcting region comprising a plurality of the characters of an alphabet, wherein one or more of the plurality of characters corresponds to a location with known coordinates in the auto-correcting region, wherein a location associated with the user interaction is determined when a user interacts with the user input device within the auto-correcting region, and the determined interaction location is added to a current input sequence of interaction locations;
- a memory containing a plurality of objects, wherein one or more objects comprise a string of one or a plurality of characters forming a word or a part of a word;
- an output device; and
- a processor coupled to the user input device, memory, and output device, said processor comprising:
- a distance value calculation component which, for a determined interaction location in the input sequence of interactions, calculates a set of distance values between the interaction location should not be plural? and the known coordinate locations corresponding to one or a plurality of characters within the auto-correcting region;
- a word evaluation component which, for a generated input sequence, identifies one or a plurality of candidate objects in memory, and for one or more identified candidate objects, evaluates here "an" might be construed as "only one"? perhaps just pluralize the next "object"? identified candidate objects by calculating a matching metric based on the calculated distance values calculated values don't have to be "associated", and ranks the evaluated candidate objects based on the calculated matching metric values; and
- a selection component for identifying one or a plurality of candidate objects according to their evaluated ranking, presenting the identified objects to the user, and enabling the user to select one of the presented objects for output to the output device.

Preferably, the selection component further comprises (c) resetting the current input sequence of interaction locations to an empty sequence upon detecting the selection by the user of one of the presented objects for output to the text display area on the output device.

Preferably, (a) each of the plurality of objects in memory is further associated with one or a plurality of predefined groupings of objects; and (b) the word evaluation component, for each generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values and the frequency of use associated with each candidate object, and ranks the evaluated candidate objects based on the calculated matching metric values. This reduces the calculation required because, conversely, one or more groupings of objects are identified as containing no candidate objects for a given input sequence of interactions, such that a matching metric need not be calculated for any object in the groupings so identified.

Preferably, the characters of the alphabet are arranged on the auto-correcting region in approximately a standard QWERTY layout. Most preferably, the width to height ratio of the auto-correcting region is approximately 2 to 1, or the width to height ratio of the auto-correcting region is less than 2 to 1. In one embodiment, one or a plurality of the characters arranged on the auto-correcting region are presented in a font so small as to be illegible, or "greeked."

Preferably, the auto-correcting region includes one or a plurality of known locations associated with one or a plurality of punctuation characters, wherein the memory includes one or a plurality of objects in memory which include one or a plurality of the punctuation characters associated with locations in the auto-correcting region. Preferably, the objects in memory are further associated with one or a plurality of modules, wherein each module comprises a set of objects with one or a plurality of common characteristics. In one embodiment, the text entry system comprises a module selector whereby a user can determine which modules are to be evaluated by the word evaluation component to identify candidate objects.

In another embodiment, the plurality of modules comprises word stem modules and suffix modules, wherein each word stem module comprises a logical organization of uninflected word stem objects, and wherein each suffix module comprises a logical organization of suffixes which can be appended to word stems to form inflected words, whereby each word stem module is associated with one or a plurality of suffix modules, whereby whenever the word evaluation component calculates a matching metric value for a given word stem in a given word stem module with respect to an initial sequence of interactions within an input sequence such that the calculated matching metric value ranks higher than a predetermined threshold, the word evaluation component evaluates the remaining interactions of the input sequence with respect to the associated suffix modules, whereby whenever the word evaluation component calculates a matching metric value for a given suffix in one of said associated suffix modules that ranks higher than a second predetermined threshold, said suffix is appended to said word stem to form a completed word corresponding to a matching metric value that is a function of said determined word stem matching metric value and said determined suffix matching metric value.

Preferably, the word evaluation component calculates the matching metric for each candidate object by summing the distance values calculated from each interaction location in the input sequence to the location assigned to the character in the corresponding position of the candidate object, and applying a weighting function according to the frequency of use associated with the object. In addition, each character of the alphabet associated with the auto-correcting region is assigned a Cartesian coordinate and wherein the distance value calculation component calculates the distance between the interaction location and the location corresponding to a character according to standard Cartesian coordinate distance analysis. Further, each character of the alphabet associated with the auto-correcting region is assigned a Cartesian coordinate and wherein the distance value calculation component calculates the distance between the interaction location and the location corresponding to a character as the square of the standard Cartesian coordinate distance. The distance values are placed in a table. In addition, each location on the auto-correcting region is defined by a horizontal and a vertical coordinate, and wherein the distance value between a interaction location and the known coordinate location corresponding to a character comprises a horizontal and a vertical component, wherein the vertical component is adjusted by a weighting factor in calculating the distance of the interaction location from the character. The word evaluation component adds an increment value to the sum of the distance values prior to applying a weighting function according to the frequency of use associated with the candidate object. Most preferably, the increment value is a fixed value that is approximately twice the average distance between adjacent locations on the auto-correcting region corresponding to characters. The frequency of use associated with each candidate object in memory comprises the ordinal ranking of the object with respect to other objects in memory, wherein an object associated with a higher relative frequency corresponds to a numerically lower ordinal ranking. Most preferably, the frequency weighting function applied by the word evaluation component to the summed distance values for a candidate object comprises multiplying the sum of the distance values by the base 2 logarithm of the ordinal ranking of the object.

Preferably, objects in memory are stored such that the objects are classified into groupings comprising objects of the same length. The word evaluation component limits the number of objects for which a matching metric is calculated by initially identifying candidate groupings of objects of the same length as the number of inputs in the input sequence. Most preferably, if fewer than a threshold number of candidate objects are evaluated to have a matching metric score better than a threshold value, the word evaluation component identifies candidate groupings of objects of progressively longer lengths and calculates the matching metric for the objects in the identified groupings until said threshold number of candidate objects are evaluated to have a matching metric score better than said threshold. Further, the word evaluation component calculates the matching metric for each candidate object by summing the distance values calculated from each interaction location in the input sequence to the location assigned to the character in the corresponding position of the candidate object and adding an increment value, and applying to this sum a weighting function according to the frequency of use associated with the object, and wherein the increment value added to the sum of the distance values is a value that is based on the difference between the number of characters in the candidate object and the number of inputs in the current input sequence.

Preferably, the word evaluation component calculates the matching metric for each candidate object by summing the distance values calculated from each interaction location in the input sequence to the location assigned to the character in the corresponding position of the candidate object, and applying a weighting function according to the frequency of use associated with the object. Most preferably, the frequency of use associated with each candidate object in memory comprises the ordinal ranking of the object with respect to other objects in one or a plurality of sub-groupings in memory with which said object is associated, wherein an object associated with a higher relative frequency corresponds to a numerically lower ordinal ranking. In addition, for each calculated distance value between a interaction location in the input sequence and the known coordinate location corresponding to a character within the auto-correcting region wherein said calculated distance exceeds a threshold distance value, for each object in memory in which said character occurs at a position in the sequence of the characters of said object corresponding to the position of said interaction location in said input sequence, said object is ranked by the word evaluation component as an object that is excluded from presentation to the user for selection. One or a plurality of the identified candidate groupings of the objects in memory comprise objects that are excluded from presentation to the user for selection, wherein at least one of the calculated distance values included in the calculated sum of distance values for each object in said one or identified candidate groupings of objects exceeds a threshold distance value. The auto-correcting region is separated into two or more predefined clustering regions, each of which contains the known locations of one or a plurality of characters, and wherein each objects in memory is assigned to a predefined group according to which of said two or more predefined clustering regions contain the known locations corresponding to one or a plurality of the initial characters of said object. In one embodiment, the auto-correcting region is separated into three predefined clustering regions, and wherein each object in memory is assigned to one of nine predefined groupings based which of the three predefined clustering regions contain the known locations corresponding to each of the first two characters of said object.

Preferably, for each character corresponding to a known location in the auto-correcting region, a region is predefined around one or a plurality of said known locations wherein the distance between an input interaction location falling within said predefined region and the known character location within said predefined region is calculated as a distance of zero. Most preferably, the relative sizes of said predefined regions correspond to the relative frequencies of occurrence of the characters associated with the known locations within said predefined regions. The predefined region around the known location of a character corresponds to a displayed key on the virtual keyboard. Further, at least one of the locations with known coordinates in the auto-correcting region corresponds to a plurality of characters, one or a plurality of which include various diacritic marks, wherein the plurality of characters comprise variant forms of a single base character, and wherein objects in memory are stored with their correct accented characters.

Preferably, the selection component presents the identified one or a plurality of candidate objects for selection by the user in a candidate object list in the text display area. Most preferably, the selection component identifies the highest ranked candidate object and presents the identified object in the candidate object list in the position nearest to the auto-correcting region. In addition, user selection of a character that is associated with an interaction outside of the auto-correcting region accepts and outputs the determined highest ranked candidate object at a text insertion point in the text display area prior to outputting the selected character at the text insertion point in the text display area. The user selection of an object for output at a text insertion point in the text display area terminates the current input sequence such that the next interaction within the auto-correcting region starts a new input sequence. In addition, the selection component detects a distinctive manner of selection that is used to select a candidate object, and wherein upon detecting that an object has been selected through said distinctive manner, the system replaces the current input sequence of actual interaction locations with an input sequence of interaction locations corresponding to the coordinate locations of the characters comprising the selected object, and wherein a next interaction in the auto-correcting region is appended to the current input sequence.

Preferably, the word evaluation component determines, for each determined interaction location in each input sequence of interaction locations, the closest known location corresponding to a character, and constructs an exact typing object composed of said determined corresponding characters in the order corresponding to the input sequence of interaction locations. Most preferably, for each input sequence of interaction locations, the selection component presents said exact typing object to the user for selection. Further, when the user selects said exact typing object for output to the text display area on the output device and said exact typing object is not already included as one of the objects in memory, said exact typing object is added to the memory. Prior to displaying the exact typing object to the user for selection, the selection component compares the exact typing object to a database of offensive objects, each of which is associated with an acceptable alternative object for display, and if a match is found, replaces the exact typing object with the associated acceptable object for presentation to the user.

Preferably, the selection component identifies the highest ranked candidate object and presents the identified object at the text insertion point in the text display area on the output device. Most preferably, the text entry system includes a select key region associated with an object selection function, wherein when said select key region is interactioned, the object presented at the text insertion point in the text display area on the output device is replaced with next highest ranked object of the identified one or a plurality of candidate objects.

Preferably, the text entry system includes a delete key region associated with a delete function, wherein when the current input sequence includes at least one interaction and said delete key region is selected, the last input interaction from the current input sequence of interactions is deleted, without terminating the current input sequence. In another preferred embodiment, the text entry system includes an Edit Word key region associated with an Edit Word function, wherein when no current input sequence exists and said Edit Word key region is selected:

(i) when the text insertion point in the text display area on the output device is contained within a previously output word, the system establishes a new current input sequence consisting of a sequence of interaction locations corresponding to the coordinate locations associated with the characters of said word, and (ii) when the text insertion point in the text display area on the output device is located between two previously output words, the system establishes a new current input sequence consisting of a sequence of interaction locations corresponding to the coordinate locations associated with the characters of the word adjacent to the text insertion point, and wherein the text entry system processes said new current input sequence and determines a corresponding ranking of new candidate objects, and wherein selection of one of the new candidate objects replaces the previously output word used to establish said new current input sequence.

Preferably, as the user enters an input sequence by performing a sequence of interactions within the auto-correcting region, the processor determines the location associated with each user interaction by recording each interaction in the sequence as an indexed primary set of a fixed number of two or more regularly spaced interaction points along the path traced out by the user interaction, and by assembling two or more corresponding secondary sets of interaction points by taking, for each of the two or more possible primary index values, the sequence of interaction points having the same index value, one from each recorded indexed primary set of interaction points, and by determining with respect to each word is selected by the user for output, a minimizing primary index value that identifies the assembled secondary set of interaction points for which the calculated distance between the assembled secondary set of interaction points and the known locations corresponding to the characters of the selected word is minimized, and whereby for a next input sequence of user interactions, the distance value calculation component calculates distance values based on a sequence of interaction locations determined as the secondary set of interaction point locations assembled from said next input sequence of interactions corresponding to the determined minimizing primary index value. Most preferably, for a plurality of user input sequences, the distance value calculation component computes a running average of the distance calculations for each of the two or more assembled secondary sets corresponding to the two or more primary index values, and whereby for a next input sequence of interactions, the distance value calculation component calculates distance values based on a sequence of interaction locations determined as the secondary set of interaction point locations assembled from said next input sequence of interactions corresponding to the minimizing primary index value determined with respect to said computed running averages. Further, for each primary index value, the distance value calculation component computes a running average of the horizontal and vertical components of the offset of the coordinate location corresponding to each character of each selected word with respect to the coordinate location of each corresponding recorded indexed interaction point, and wherein in performing distance calculations for the word evaluation component, the distance value calculation component adjusts the horizontal and vertical coordinates of each recorded indexed interaction point by an amount that is a function of the average horizontal and vertical offsets computed with respect to the corresponding primary index value.

Preferably, for each input interaction location, the distance value calculation component computes a running average of the horizontal and vertical components of the offset of the coordinate location corresponding to each character of each selected word with respect to the coordinates of each corresponding input interaction location, and wherein in performing distance calculations for the word evaluation component, the distance value calculation component adjusts the horizontal and vertical coordinates of each input interaction location by amounts that are functions of the computed average signed horizontal and vertical offsets. Alternatively, the processor further comprises a stroke recognition component that determines for each user interaction action within the auto-correcting region whether the point of interaction is moved less than a threshold distance from the initial interaction location prior to the finger or stylus being lifted from the touch sensitive surface.

The invention further provides a text entry system for virtual keyboards whereby:

(a) when the point of interaction is moved less than a threshold distance from the initial interaction location prior to being lifted, the stroke recognition component determines that the user interaction is a tap interaction, and the location determined to be associated with the user interaction is added to the current input sequence of interaction locations to be processed by the distance value calculation component, the word evaluation component, and the selection component, and;

(b) when the point of interaction is moved greater than or equal to a threshold distance from the initial interaction location prior to being lifted, the stroke recognition component determines that the user interaction is one of a plurality of stroke interactions that are associated with known system functions, and classifies the stroke interaction as one of the plurality of predefined types of stroke interactions.

Preferably, when a threshold number of interaction locations in the input sequence are further than a threshold maximum distance from the corresponding character in the sequence of characters comprising a given candidate object, said object is identified as no longer being a candidate object for the selection component. Alternatively, the processor further comprises a frequency promotion component for adjusting the frequency of use associated with each object in memory as a function of the number of times the object is selected by the user for output to the text display area on the output device. Moreover, the frequency of use associated with each object in memory comprises the ordinal ranking of the object with respect to other objects in memory, wherein an object associated with a higher relative frequency corresponds to a numerically lower ordinal ranking, and wherein when an object is selected for output by the user, the frequency promotion component adjusts the ordinal ranking associated with said selected object by an amount that is a function of the ordinal ranking of said object prior to said adjustment. Further, the function used by the frequency promotion component to determine the amount by which the ordinal ranking associated with a selected object is adjusted reduces said amount for objects with ordinal rankings that are associated with relatively higher frequencies of use. The frequency promotion component analyzes additional information files that are accessible to the text entry system to identify new objects contained in said files that are not included among the objects already in said memory of said text entry system, and wherein said newly identified objects are added to the objects in memory as objects that are associated with a low frequency of use. Further, the frequency of use associated with a newly identified object that is added to the objects in memory is adjusted by the frequency promotion component as a function of the number of times that the newly identified object is detected during the analysis of said additional information files.

Preferably, the processor further comprises a frequency promotion component for adjusting the frequency of use associated with each object in memory as a function of the number of times the object is selected by the user for output to the text display area on the output device with respect to other objects associated with the same predefined grouping. Most preferably, when an object is selected by the user for output to the text display area on the output device, the frequency promotion component increases the value of the frequency associated with the selected object by a relatively large increment, and decreases by a relatively small decrement the frequency associated with unselected objects that are associated with the same grouping as the selected object. Alternatively, information regarding the capitalization of one or a plurality of objects is stored along with the objects in memory and wherein the selection component presents each identified object in a preferred form of capitalization according to the stored capitalization information. In another embodiment, one or a plurality of objects in memory are associated with a secondary object in memory comprising a sequence of one or a plurality of letters or symbols, and wherein when the selection component identifies one of said objects for presentation to the user based on the matching metric calculated by the word evaluation component, the selection component presents the associated secondary object for selection.

The invention further provides a text entry system comprising:

- a user input device comprising a virtual keyboard comprising an auto-correcting region having a plurality of interaction locations [representing defined keys] at known coordinates, which locations correspond to one or more characters of an alphabet, wherein user selection of a determined location corresponds to a key activation event that is appended to a current input sequence;
- a memory containing a plurality of objects each comprising a string of one or a plurality of characters forming a word or a part of a word; also can move freq. association to a dependent claim?
- an output device; and
- a processor coupled to the user input device, memory, and output device, said processor comprising:
- a distance value calculation component which, for a generated key activation event location, calculates a set of distance values between the key activation event location and the known coordinate locations corresponding to one or a plurality of keys within the auto-correcting region;
- a word evaluation component which, for a generated input sequence, identifies one or a plurality of candidate objects in memory, and for one or a plurality of identified candidate objects evaluates each identified candidate object by calculating a matching metric based on the calculated distance values and the frequency of use associated with the object, and ranks the evaluated candidate objects based on the calculated matching metric values; and
- a selection component for identifying one or a plurality of candidate objects according to their evaluated ranking, presenting the identified objects to a user, and enabling the user to select one of the presented objects for output to the output device.

Preferably, (a) each of the plurality of objects in memory is further associated with one or a plurality of predefined groupings of objects; and (b) the word evaluation component, for each generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values and the frequency of use associated with each candidate object, and ranks the evaluated candidate objects based on the calculated matching metric values. Further, the keys associated with the characters of the alphabet are arranged in the auto-correcting region in approximately a standard QWERTY layout.

Preferably, when a key activation event is detected comprising the simultaneous activation of a plurality of adjacent keys in the auto-correcting region, a location corresponding to said key activation event is determined as a function of the locations of the simultaneously activated keys, and said determined location is appended to the current input sequence of the locations of the key activation events. Most preferably, the function used to determine the location of said key activation event comprises the computation of the location corresponding to the center of the locations of the simultaneously activated keys. Further, the function used to determine the location of said key activation event comprises the computation of the location corresponding to the weighted center of gravity of the locations of the simultaneously activated keys, wherein the weights associated with each of the keys in the auto-correcting region correspond to the relative frequencies of occurrence of the characters associated with the keys, wherein said relative frequencies are determined with respect to the frequencies of occurrence of the characters in the objects in memory.

Preferably, when a key activation event is detected comprising the activation of a plurality of adjacent keys in the auto-correcting region within a predetermined threshold period of time, wherein at all times during said key activation event at least one of said plurality of adjacent keys is activated and wherein at any moment during said key activation event that any subset of said plurality of keys is simultaneously activated, said simultaneously activated subset of keys comprises keys that are contiguously adjacent, a location corresponding to said key activation event is determined as a function of the locations of the entire plurality of adjacent keys detected during said key activation event, and said determined location is appended to the current input sequence of the locations of the key activation events. Most preferably, the function used to determine the location of said key activation event comprises the computation of the location corresponding to the center of the locations of the simultaneously activated keys. Further, the function used to determine the location of said key activation event comprises the computation of the location corresponding to the weighted center of gravity of the locations of the simultaneously activated keys, wherein the weights associated with each of the keys in the auto-correcting region correspond to the relative frequencies of occurrence of the characters associated with the keys, wherein said relative frequencies are determined with respect to the frequencies of occurrence of the characters in the objects in memory.

Preferably, the auto-correcting region includes one or a plurality of keys associated with one or a plurality of punctuation characters, wherein said memory includes one or a plurality of objects in memory which include one or a plurality of the punctuation characters associated with keys in said auto-correcting region. Alternatively, the word evaluation component calculates the matching metric for each candidate object by summing the distance values calculated from determined location in the input sequence to the known location of the key corresponding to the character in the corresponding position of the candidate object, and applying a weighting function according to the frequency of use associated with the object. In another embodiment, at least one of the keys in the auto-correcting region corresponds to a plurality of characters, one or a plurality of which include various diacritic marks, wherein the plurality of characters comprise variant forms of a single base character, and wherein objects in memory are stored with their correct accented characters.

Preferably, the selection component presents the identified one or a plurality of candidate objects for selection by the user in a candidate object list in the text display area. Most preferably, the selection component identifies the highest ranked candidate object and presents the identified object in the candidate object list in the position nearest to the auto-correcting region. Further, activation of a key that is associated with a character, wherein the key is not included within the auto-correcting region, accepts and outputs the determined highest ranked candidate object at a text insertion point in the text display area prior to outputting the selected character at the text insertion point in the text display area. Further, the user selection of an object for output at a text insertion point in the text display area terminates the current input sequence such that the next key activation event within the auto-correcting region starts a new input sequence.

A presently preferred embodiment of the invention provides a text entry system having user input device comprising a virtual keyboard including an auto-correcting region comprising a plurality of the characters of an alphabet, wherein each of the plurality of characters corresponds to a location with known coordinates in the auto-correcting region, wherein each time a user interacts with the user input device within the auto-correcting region, a location associated with the user interaction is determined and the determined interaction location is added to a current input sequence of interaction locations; a memory containing a plurality of objects, wherein each object is a string of one or a plurality of characters or symbols forming a word or a part of a word, wherein each object is further associated with a frequency of use; an output device; and a processor coupled to the user input device, memory, and output device, said processor comprising: a distance value calculation component which, for each determined interaction location in the input sequence of interactions, calculates a set of distance values between the interaction locations and the known coordinate locations corresponding to one or a plurality of characters within the auto-correcting region; a word evaluation component which, for each generated input sequence, identifies one or a plurality of candidate objects in memory, and for each of the one or a plurality of identified candidate objects, evaluates each identified candidate object by calculating a matching metric based on the calculated distance values and the frequency of use associated with the object, and ranks the evaluated candidate objects based on the calculated matching metric values; and a selection component for identifying one or a plurality of candidate objects according to their evaluated ranking, presenting the identified objects to the user, and enabling the user to select one of the presented objects for output to the output device.

The invention also provides such system wherein each of the plurality of objects in memory is further associated with one or a plurality of predefined groupings of objects; and the word evaluation component, for each generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values and the frequency of use associated with each candidate object, and ranks the evaluated candidate objects based on the calculated matching metric values.

The invention also provides such system wherein the characters of the alphabet are arranged on the auto-correcting region in approximately a standard QWERTY layout.

In such system the width to height ratio of the auto-correcting region may be approximately 2 to 1. Alternatively, the width to height ratio of the auto-correcting region is less than 2 to 1.

In a further embodiment, one or a plurality of the characters arranged on the auto-correcting region are presented in a small illegible font or are represented by small shapes.

The invention also provide such system wherein said auto-correcting region includes one or a plurality of known locations associated with one or a plurality of punctuation characters, wherein said memory includes one or a plurality of objects in memory which include one or a plurality of the punctuation characters associated with locations in said auto-correcting region.

The invention also provides such system wherein objects in memory are further associated with one or a plurality of modules, wherein each module comprises a set of objects with one or a plurality of common characteristics.

In further embodiments, the text entry system comprises a module selector whereby a user can determine which modules are to be evaluated by the word evaluation component to identify candidate objects.

In further embodiments, the plurality of modules comprises word stem modules and suffix modules, wherein each word stem module comprises a logical organization of uninflected word stem objects, and wherein each suffix module comprises a logical organization of suffixes which can be appended to word stems to form inflected words; wherein each word stem module is associated with one or a plurality of suffix modules; wherein whenever the word evaluation component calculates a matching metric value for a given word stem in a given word stem module with respect to an initial sequence of interactions within an input sequence such that the calculated matching metric value ranks higher than a predetermined threshold, the word evaluation component evaluates the remaining interactions of the input sequence with respect to the associated suffix modules; and wherein whenever the word evaluation component calculates a matching metric value for a given suffix in one of said associated suffix modules that ranks higher than a second predetermined threshold, said suffix is appended to said word stem to form a completed word corresponding to a matching metric value that is a function of said determined word stem matching metric value and said determined suffix matching metric value.

The invention also provide such system wherein the word evaluation component calculates the matching metric for each candidate object by summing the distance values calculated from each interaction location in the input sequence to the location assigned to the character in the corresponding position of the candidate object, and applying a weighting function according to the frequency of use associated with the object.

In further embodiments, each character of the alphabet associated with the auto-correcting region is assigned a Cartesian coordinate and wherein the distance value calculation component calculates the distance between the interaction location and the location corresponding to a character according to standard Cartesian coordinate distance analysis.

In further embodiments, each character of the alphabet associated with the auto-correcting region is assigned a Cartesian coordinate and wherein the distance value calculation component calculates the distance between the interaction location and the location corresponding to a character as the square of the standard Cartesian coordinate distance.

In further embodiment, the distance values are placed in a table.

In further embodiments, each location on the auto-correcting region is defined by a horizontal and a vertical coordinate, and wherein the distance value between a interaction location and the known coordinate location corresponding to a character comprises a horizontal and a vertical component, wherein the vertical component is adjusted by a weighting factor in calculating the distance of the interaction location from the character.

In further embodiments, the frequency of use associated with each candidate object in memory comprises the ordinal ranking of the object with respect to other objects in memory, wherein an object associated with a higher relative frequency corresponds to a numerically lower ordinal ranking.

In further embodiments, the frequency weighting function applied by the word evaluation component to the summed distance values for a candidate object comprises multiplying the sum of the distance values by the base 2 logarithm of the ordinal ranking of the object.

In further embodiments, the word evaluation component adds an increment value to the sum of the distance values prior to applying a weighting function according to the frequency of use associated with the candidate object.

In further embodiments, the increment value is a fixed value that is approximately twice the average distance between adjacent locations on the auto-correcting region corresponding to characters.

In further embodiments, objects in memory are stored such that objects are classified into groupings comprising objects of the same length.

In further embodiments, the word evaluation component limits the number of objects for which a matching metric is calculated by initially identifying candidate groupings of objects of the same length as the number of inputs in the input sequence.

In further embodiments, if fewer than a threshold number of candidate objects are evaluated to have a matching metric score better than a threshold value, the word evaluation component identifies candidate groupings of objects of progressively longer lengths and calculates the matching metric for the objects in the identified groupings until said threshold number of candidate objects are evaluated to have a matching metric score better than said threshold.

In further embodiments, the word evaluation component calculates the matching metric for each candidate object by summing the distance values calculated from each interaction location in the input sequence to the location assigned to the character in the corresponding position of the candidate object and adding an increment value, and applying to this sum a weighting function according to the frequency of use associated with the object, and wherein the increment value added to the sum of the distance values is a value that is based on the difference between the number of characters in the candidate object and the number of inputs in the current input sequence.

In further embodiments, the word evaluation component calculates the matching metric for each candidate object by summing the distance values calculated from each interaction location in the input sequence to the location assigned to the character in the corresponding position of the candidate object, and applying a weighting function according to the frequency of use associated with the object.

In further embodiments, the frequency of use associated with each candidate object in memory comprises the ordinal ranking of the object with respect to other objects in one or a plurality of sub-groupings in memory with which said object is associated, wherein an object associated with a higher relative frequency corresponds to a numerically lower ordinal ranking.

In further embodiments, for each calculated distance value between a interaction location in the input sequence and the known coordinate location corresponding to a character within the auto-correcting region wherein said calculated distance exceeds a threshold distance value, for each object in memory in which said character occurs at a position in the sequence of the characters of said object corresponding to the position of said interaction location in said input sequence, said object is ranked by the word evaluation component as an object that is excluded from presentation to the user for selection.

In further embodiments, one or a plurality of the identified candidate groupings of the objects in memory comprise objects that are excluded from presentation to the user for selection, wherein at least one of the calculated distance values included in the calculated sum of distance values for each object in said one or identified candidate groupings of objects exceeds a threshold distance value.

In further embodiments, the auto-correcting region is separated into two or more predefined clustering regions, each of which contains the known locations of one or a plurality of characters, and wherein each objects in memory is assigned to a predefined group according to which of said two or more predefined clustering regions contain the known locations corresponding to one or a plurality of the initial characters of said object.

In further embodiments, the auto-correcting region is separated into three predefined clustering regions, and wherein each object in memory is assigned to one of nine predefined groupings based which of the three predefined clustering regions contain the known locations corresponding to each of the first two characters of said object.

The invention also provides such system wherein for each character corresponding to a known location in the auto-correcting region, a region is predefined around one or a plurality of said known locations wherein the distance between an input interaction location falling within said predefined region and the known character location within said predefined region is calculated as a distance of zero.

In further embodiments, the relative sizes of said predefined regions correspond to the relative frequencies of occurrence of the characters associated with the known locations within said predefined regions.

In further embodiments, said predefined region around the known location of a character corresponds to a displayed key on the virtual keyboard.

The invention also provides such system wherein at least one of the locations with known coordinates in the auto-correcting region corresponds to a plurality of characters, one or a plurality of which include various diacritic marks, wherein the plurality of characters comprise variant forms of a single base character, and wherein objects in memory are stored with their correct accented characters.

The invention also provides such system wherein the selection component presents the identified one or a plurality of candidate objects for selection by the user in a candidate object list.

The invention also provides such system wherein the selection component identifies the highest ranked candidate object and presents the identified object in the candidate object list in the position nearest to the auto-correcting region.

The invention also provides such system wherein a user selection of a character that is associated with a interaction outside of the auto-correcting region accepts and outputs the determined highest ranked candidate object prior to outputting the selected character.

The invention also provides such system wherein user selection of an object for output terminates the current input sequence such that the next interaction within the auto-correcting region starts a new input sequence.

The invention also provides such system wherein the selection component detects a distinctive manner of selection that is used to select a candidate object, and wherein upon detecting that an object has been selected through said distinctive manner, the system replaces the current input sequence of actual interaction locations with an input sequence of interaction locations corresponding to the coordinate locations of the characters comprising the selected object, and wherein a next interaction in the auto-correcting region is appended to the current input sequence.

The invention also provides system wherein the word evaluation component determines, for each determined interaction location in each input sequence of interaction locations, the closest known location corresponding to a character, and constructs an exact typing object composed of said determined corresponding characters in the order corresponding to the input sequence of interaction locations.

In further embodiments, for each input sequence of interaction locations, the selection component presents said exact typing object to the user for selection.

In further embodiments, when the user selects said exact typing object for output on the output device and said exact typing object is not already included as one of the objects in memory, said exact typing object is added to the memory.

In further embodiments, wherein prior to displaying said exact typing object to the user for selection, the selection component compares the exact typing object to a database of offensive objects, each of which is associated with an acceptable alternative object for display, and if a match is found, replaces the exact typing object with the associated acceptable object for presentation to the user.

The invention also provides such system wherein the selection component identifies the highest ranked candidate object and presents the identified object on the output device.

The invention also provides such system wherein the text entry system includes a select key region associated with an object selection function, wherein when said select key region is interacted with, the object presented on the output device is replaced with next highest ranked object of the identified one or a plurality of candidate objects.

The invention also provides such system wherein the text entry system includes a delete key region associated with a delete function, wherein when the current input sequence includes at least one interaction and said delete key region is interacted with, the last input interaction from the current input sequence of interactions is deleted, without terminating the current input sequence.

The invention also provides such system wherein the text entry system includes an Edit Word key region associated with an Edit Word function, wherein: when no current input sequence exists and said Edit Word key region is interacted with; and when the text insertion point on the output device is contained within a previously output word; the system establishes a new current input sequence consisting of a sequence of interaction locations corresponding to the coordinate locations associated with the characters of said word; and when the text insertion point in the text display area on the output device is located between two previously output words; the system establishes a new current input sequence consisting of a sequence of interaction locations corresponding to the coordinate locations associated with the characters of the word adjacent to the text insertion point; and wherein the text entry system processes said new current input sequence and determines a corresponding ranking of new candidate objects; and wherein selection of one of the new candidate objects replaces the previously output word used to establish said new current input sequence.

The invention also provides such system wherein for each input interaction location, the distance value calculation component computes a running average of the horizontal and vertical components of the offset of the coordinate location corresponding to each character of each selected word with respect to the coordinates of each corresponding input interaction location, and wherein in performing distance calculations for the word evaluation component, the distance value calculation component adjusts the horizontal and vertical coordinates of each input interaction location by amounts that are functions of the computed average signed horizontal and vertical offsets.

The invention also provides such system wherein the processor further comprises: a stroke recognition component that determines for each user interaction action within the auto-correcting region whether the point of interaction is moved less than a threshold distance from the initial interaction location prior to being lifted from the virtual keyboard; and whereby when the point of interaction is moved less than a threshold distance from the initial interaction location prior to being lifted from the virtual keyboard, the stroke recognition component determines that the user interaction is a tap interaction, and the location determined to be associated with the user interaction is added to the current input sequence of interaction locations to be processed by the distance value calculation component, the word evaluation component, and the selection component; and whereby when the point of interaction is moved greater than or equal to a threshold distance from the initial interaction location prior to being lifted from the virtual keyboard, the stroke recognition component determines that the user interaction is one of a plurality of stroke interactions that are associated with known system functions, and classifies the stroke interaction as one of the plurality of predefined types of stroke interactions.

The invention also provides such system wherein when a threshold number of interaction locations in the input sequence are further than a threshold maximum distance from the corresponding character in the sequence of characters comprising a given candidate object, said object is identified as no longer being a candidate object for the selection component.

The invention also provides such system wherein information regarding the capitalization of one or a plurality of objects is stored along with the objects in memory; and wherein the selection component presents each identified object in a preferred form of capitalization according to the stored capitalization information.

The invention also provides such system wherein one or a plurality of objects in memory are associated with a secondary object in memory comprising a sequence of one or a plurality of letters or symbols, and wherein when the selection component identifies one of said objects for presentation to the user based on the matching metric calculated by the word evaluation component, the selection component presents the associated secondary object for selection.

The invention also provides such system wherein said virtual keyboard comprises: any of a laser-projection keyboard, a muscle sensing keyboard, a fabric keyboard, a gesture detection device, and a device for tracking eye movement.

The invention also provides such system wherein said user input device and said output device are integrated.

The invention also provides such system further comprising: a linguistic model comprising any of: frequency of occurrence of a linguistic object in formal or conversational written text; frequency of occurrence of a linguistic object when following a preceding linguistic object or linguistic objects; proper or common grammar of the surrounding sentence; application context of current linguistic object entry; and frequency of use or repeated use of the linguistic object by the user or within an application program.

The invention also provides such system wherein user interaction comprises: a scrolling gesture across or adjacent to the auto-correcting keyboard region that causes a list to scroll and changes a candidate word that is selected for output.

The invention also provides such system wherein user interaction comprises any of: a gesture and other movement expressive of user intent.

A further embodiment of the invention provides text entry system having: a user input device comprising a virtual keyboard including an auto-correcting region comprising a plurality of keys, each corresponding to a character of an alphabet and each at a known coordinate location, wherein each time a user activates one or a plurality of adjacent keys in the auto-correcting region within a predetermined threshold period of time to generate a key activation event, a determined location corresponding to the key activation event is appended to a current input sequence of the determined locations of the key activation events; a memory containing a plurality of objects, wherein each object is a string of one or a plurality of characters forming a word or a part of a word, wherein each object is further associated with a frequency of use; an output device; and a processor coupled to the user input device, memory, and output device, said processor comprising: a distance value calculation component which, for each generated key activation event location in the input sequence of key activation events, calculates a set of distance values between the key activation event location and the known coordinate locations corresponding to one or a plurality of keys within the auto-correcting region; a word evaluation component which, for each generated input sequence, identifies one or a plurality of candidate objects in memory, and for each of the one or a plurality of identified candidate objects, evaluates each identified candidate object by calculating a matching metric based on the calculated distance values and the frequency of use associated with the object, and ranks the evaluated candidate objects based on the calculated matching metric values; and a selection component for identifying one or a plurality of candidate objects according to their evaluated ranking, presenting the identified objects to the user, and enabling the user to select one of the presented objects for output to the output device.

The invention also provides such system wherein: each of the plurality of objects in memory is further associated with one or a plurality of predefined groupings of objects; and the word evaluation component, for each generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values and the frequency of use associated with each candidate object, and ranks the evaluated candidate objects based on the calculated matching metric values.

The invention also provides such system wherein the keys associated with the characters of the alphabet are arranged in the auto-correcting region in approximately a standard QWERTY layout.

The invention also provides such system wherein when a key activation event is detected comprising the simultaneous activation of a plurality of adjacent keys in the auto-correcting region, a location corresponding to said key activation event is determined as a function of the locations of the simultaneously activated keys, and said determined location is appended to the current input sequence of the locations of the key activation events.

In further embodiments, the function used to determine the location of said key activation event comprises the computation of the location corresponding to the center of the locations of the simultaneously activated keys.

In further embodiments, the function used to determine the location of said key activation event comprises the computation of the location corresponding to the weighted center of gravity of the locations of the simultaneously activated keys, wherein the weights associated with each of the keys in the auto-correcting region correspond to the relative frequencies of occurrence of the characters associated with the keys, wherein said relative frequencies are determined with respect to the frequencies of occurrence of the characters in the objects in memory.

In further embodiments, when a key activation event is detected comprising the activation of a plurality of adjacent keys in the auto-correcting region within a predetermined threshold period of time, wherein at all times during said key activation event at least one of said plurality of adjacent keys is activated and wherein at any moment during said key activation event that any subset of said plurality of keys is simultaneously activated, said simultaneously activated subset of keys comprises keys that are contiguously adjacent, a location corresponding to said key activation event is determined as a function of the locations of the entire plurality of adjacent keys detected during said key activation event, and said determined location is appended to the current input sequence of the locations of the key activation events.

In further embodiments, the function used to determine the location of said key activation event comprises the computation of the location corresponding to the center of the locations of the simultaneously activated keys.

In further embodiments, the function used to determine the location of said key activation event comprises the computation of the location corresponding to the weighted center of gravity of the locations of the simultaneously activated keys, wherein the weights associated with each of the keys in the auto-correcting region correspond to the relative frequencies of occurrence of the characters associated with the keys, wherein said relative frequencies are determined with respect to the frequencies of occurrence of the characters in the objects in memory.

The invention also provides such system wherein said auto-correcting region comprises one or a plurality of keys associated with one or a plurality of punctuation characters, wherein said memory includes one or a plurality of objects in memory which include one or a plurality of the punctuation characters associated with keys in said auto-correcting region.

The invention also provides such system wherein the word evaluation component calculates the matching metric for each candidate object by summing the distance values calculated from determined location in the input sequence to the known location of the key corresponding to the character in the corresponding position of the candidate object, and applying a weighting function according to the frequency of use associated with the object.

The invention also provides such system wherein at least one of the keys in the auto-correcting region corresponds to a plurality of characters, one or a plurality of which include various diacritic marks, wherein the plurality of characters comprise variant forms of a single base character, and wherein objects in memory are stored with their correct accented characters.

The invention also provides such system wherein the selection component presents the identified one or a plurality of candidate objects for selection by the user in a candidate object list.

In further embodiments, the selection component identifies the highest ranked candidate object and presents the identified object in the candidate object list in the position nearest to the auto-correcting region.

In further embodiments, activation of a key that is associated with a character, wherein said key is not included within the auto-correcting region, accepts and outputs the determined highest ranked candidate object prior to outputting the selected character.

In further embodiments, user selection of an object for output area terminates the current input sequence such that the next key activation event within the auto-correcting region starts a new input sequence.

The invention also provides such system wherein said virtual keyboard comprises any of a laser-projection keyboard, a muscle sensing keyboard, a fabric keyboard, a gesture detection device, and a device for tracking eye movement.

The invention also provides such system wherein said user input device and said output device are integrated.

DETAILED DESCRIPTION OF THE INVENTION

Figure 1A:
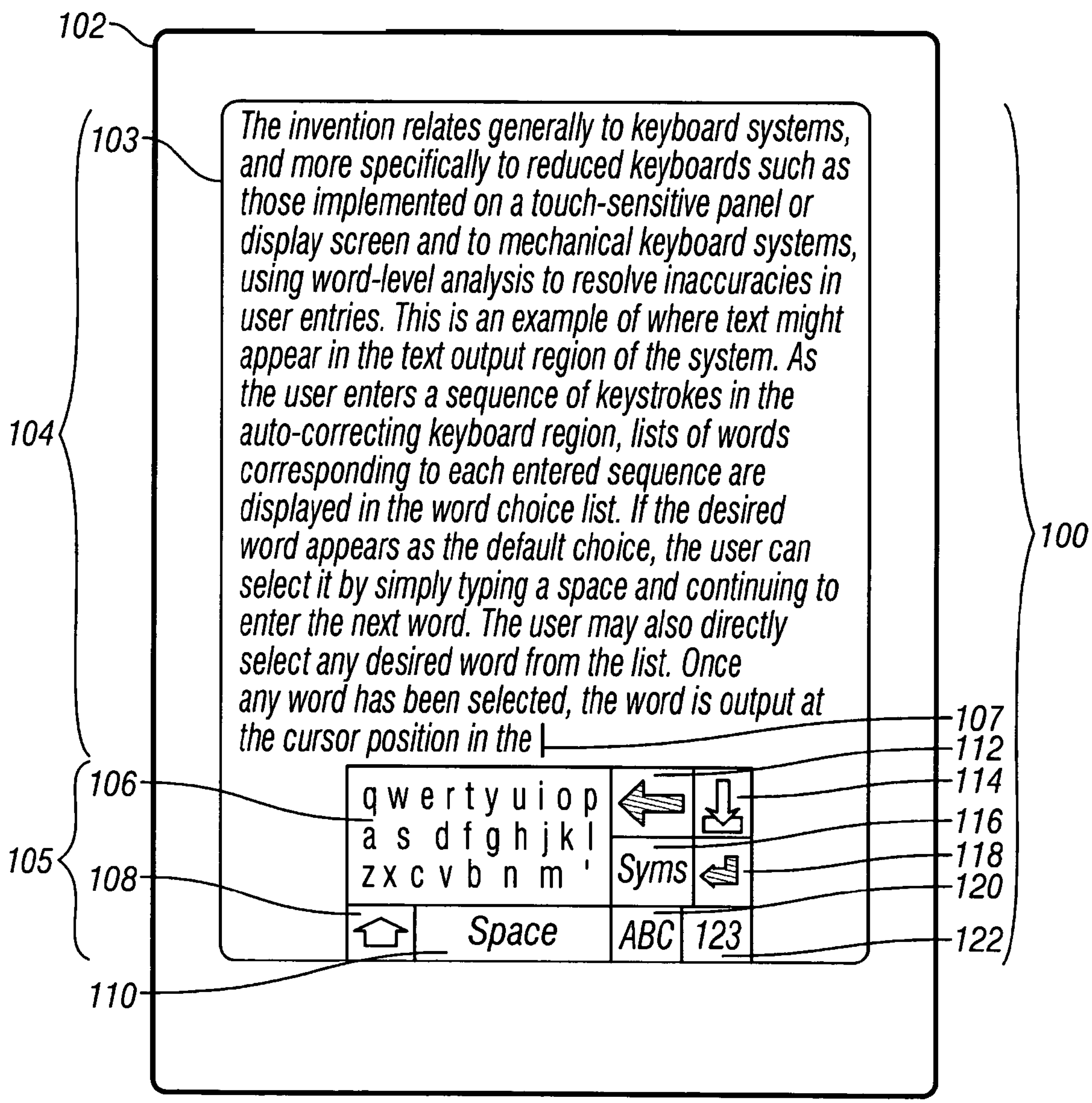
FIG. 1A is a schematic view of a preferred embodiment of a portable computer incorporating a reduced keyboard system of the invention which automatically corrects input keystrokes.

Because user keystroke entries are presumed to be possibly inaccurate, there is some ambiguity as to how a particular sequence of keystrokes should be interpreted to generate the sequence of characters that the user intended to type. The invention provides a process and system, i.e. an apparatus or device, wherein the user is presented with one or more alternate interpretations of each keystroke sequence corresponding to a word such that the user can easily select the desired interpretation, and wherein no special action need be taken to select the interpretation deemed most likely. This approach enables the system to use the information contained in the entire sequence of keystrokes corresponding to a word in resolving what the user's likely intention was for each character of the sequence.

The method of the present invention has two very significant advantages over prior systems, such as that disclosed by U.S. Pat. No. 5,748,512. One is that the inventive system uses information regarding both preceding and succeeding keystrokes in determining the intended character for each keystroke, together with the length of the word and a database that includes information as to the relative frequencies of potentially matching words. This is far more information than can be used by prior systems, and greatly increases the performance of the system. The second advantage is that the user need only interact and respond to predictions by the system at word boundaries, after all the characters of each word have been entered, rather than having to examine, and accept or reject each character generated by the system immediately following each keystroke. This greatly enhances the usability of the system because the user is thus able to focus much more on the entry of text on the keyboard, without needing to divert his attention constantly to the display following each keystroke. Another advantage is the system also accommodates punctuation characters, such as a hyphen or apostrophe, that are commonly embedded in words, such as hyphenated compounds and contractions in English. Such embedded punctuation characters can be associated with one or more keys or character locations included among those associated with alphabetic characters.

Definitions

"Keyboard" shall mean any input device having defined areas including, but not limited to, an input device having a defined area containing a plurality of defined locations associated with one or more characters and, in particular but not limited to, virtual keyboards, which shall include by way of example, but not limitation, laser-projection keyboards, muscle-sensing keyboards, and fabric keyboards.

"Auto-correcting region" refers to that region of the keyboard having the inventive auto-correcting process and features applied.

"Object" shall mean a linguistic object, such as a string of one or more characters or symbols forming a word, word stem, prefix or suffix, phrase, abbreviation, chat slang, emoticon, user ID, URL, or ideographic character sequence.

"Word evaluation component" refers to the part of the system that determines which objects to present in which order to the user, encompassing all linguistic objects as they are defined above and is not limited only to complete words.

"Word stem" shall mean a "root word" or "component," with or without prefixes prepended. For example, the word "interestingly" consists of the root word "interest" to which the suffix "ingly" has been appended.

"Alphabet" shall mean letters, accented or unaccented, or other characters or symbols that represent a phonetic or sub-word component, including Japanese kana, Korean jamos, and Chinese zhuyin, or other linguistic and non-linguistic characters such as digits and punctuation that are contained in abbreviations, chat slang, emoticons, user IDs, or URLs.

"Frequency of use" shall mean static or dynamic frequency information in accordance with a linguistic model, which may include one or more of: frequency of occurrence of a word in formal or conversational written text; frequency of occurrence of a word when following a preceding word or words; proper or common grammar of the surrounding sentence; application context of current word entry; and recency of use or repeated use of the word by the user or within an application program.

"Module" is a logical organization of objects based upon characteristics of the objects. For example, (1) words of the French language versus words of the English language are arranged in different modules, (2) a verb stem module contains verb stems to each of which one or more possible suffixes may be appended, wherein the suffixes are contained in one or more suffix modules associated with the verb stem module, wherein the suffixes from the suffix modules can be appended to a verb stem in the verb stem module to form a properly inflected word.

Similarly, a module may modify or generate objects based on linguistic patterns, such as placing a diacritic mark on a particular syllable, or generate objects based on any other algorithm for interpretation of the current input sequence and surrounding context.

An "interaction action" comprises the entirety of a user action which results in an interaction with the keyboard, starting from the first point and moment of interaction, and including any additional contiguous points of interaction that are detected up to the moment at which interaction with the keyboard is terminated. Examples of interactions include, but are not limited to, physically or proximately touching a surface or spatial location with a stylus or finger and moving the stylus or finger to a greater or lesser degree prior to lifting the stylus or finger from the surface or spatial location.

An "interaction location" is the location determined to correspond to a user action which results in an interaction with the keyboard. Methods of determining an interaction location include, but are not limited to, detecting the location at or near where the initial or final interaction was made by the user, or detecting a user action whereby the interaction location is determined corresponding to the location of the user action within a displayed keyboard region at the time of such user interaction.

A "distance value calculation component" calculates a set of distance values between a interaction location and the known coordinate locations corresponding to one or more characters within the auto-correcting region of the keyboard. The method used to calculate the distance between two locations includes, but is not limited to, assigning Cartesian coordinates to each location and calculating the distance between two locations according to standard Cartesian coordinate distance analysis, assigning Cartesian coordinates to each location and calculating the distance between two locations as the square of the standard Cartesian coordinate distance, assigning Cartesian coordinates to each location and calculating the distance between two locations according to Cartesian coordinate distance analysis where the vertical component is adjusted by a weighting factor, and applying the foregoing techniques in three-dimensional space.

A "matching metric" is a score calculated for an object with respect to an input sequence of interaction locations as a means to estimate how likely it is that the object corresponds to the user's intention in performing the input sequence of interactions. For example, a matching metric can be calculated in one embodiment as the sum of the squares of the distances from each interaction location in the entry sequence to the location assigned to the character in the corresponding position of a given candidate object, and then multiplying the sum of the squared distances by a frequency adjustment factor, which in one preferred embodiment is calculated as the base 2 logarithm of the ordinal position of the word with respect to other potential candidate objects, where objects associated with higher relative frequencies correspond to lower ordinal positions, i.e. the most frequent object is at position "1." Thus, in this embodiment, the lower the numeric value of the calculated matching metric, the more likely a given object is deemed to correspond to the user's intention in generating a sequence of interaction points.

An "evaluated ranking" is the relative prioritization of a set of candidate objects according the likelihood that each of the objects corresponds to the user's intention in generating a sequence of interaction points, where this likelihood is determined according to the matching metric calculated for the objects.

A "key activation event" includes but is not limited to an event that comprises the entirety of the activated keys detected during the course of a user action which results in the activation of one or more adjacent keys of a virtual keyboard, starting from the first depressed key and including the time at which it was depressed, and including any additional keys that are adjacent to the first depressed key and that are simultaneously depressed, detected up to the moment at which neither the first key nor any simultaneously depressed adjacent key is depressed.

With regard to FIG. 1A, a reduced auto-correcting keyboard system 100 formed in accordance with the invention is depicted incorporated in a palmtop portable computer 102. Portable computer 102 contains a reduced keyboard 105 implemented on a touch screen display 103, which is used to generate text to be output to text display region 104. For purposes of this application, the term "keyboard" is defined broadly to include any input device having defined areas for keys. Keyboard 105 has an auto-correcting region 106 wherein the 26 letters of the English alphabet plus an apostrophe are displayed in approximately the standard QWERTY arrangement. In this preferred embodiment, it is relevant to note that the aspect ratio of the keyboard 106, i.e. the ratio of its width to its height, is less than 2:1; whereas for a standard computer keyboard or typewriter this ratio is approximately 4:1. This aspect ratio renders the keyboard 106 easier to use in that the less elongated shape tends to minimize the distance the stylus must be moved between letters at opposite ends of the keyboard, while enhancing the system's ability to distinguish between letters in adjacent rows by increasing their relative separation. This makes it easier for the user to interact with the keyboard in a location that is relatively close to the intended letter in the vertical dimension. Consequently, in a preferred embodiment, the distance of an interaction point from a letter is calculated using a method that increases the relative weight of the vertical component of the distance with respect to the horizontal component.

The keyboard may be of any size, very small or very large. In the case of a virtual keyboard as taught herein, the size of the keyboard is literally a function of user preference and available surface area. For a more conventional keyboard, an implementation using a space for the auto-correcting keyboard as small as 1 cm by 0.5 cm that includes all 26 letters of the English alphabet has been found to be quite usable with a small plastic stylus. When embodied as a keyboard of this size, a well-known key arrangement such as the standard QWERTY layout may be used. With this key arrangement it is not necessary to include legible displayed characters, because the relative locations of each character in the defined keyboard space are well known to users familiar with such a standard layout. Alternatively, a very small label such as a dot may be displayed at each character location to aid the user.

In accordance with another aspect of the invention, the internal, logical representation of the characters need not mirror the physical arrangement represented by the labels on the actual characters in the auto-correcting keyboard. For example, in a database constructed to represent a French vocabulary module, the accented characters Â and À may also be associated with the unaccented character A that appears at a character location in a virtual keyboard. The word entries in the French vocabulary module include the necessary information to determine whether a given word is spelled with an accented or unaccented character so that the correctly spelled form can be automatically generated based on an input interaction point sufficiently near the key or character location associated with the unaccented character. This is a significant advantage for languages, such as French, that often use accented characters since no special typing techniques, additional keys, or additional keystrokes are required to type words using their correct spellings including appropriate accents.

In accordance with another aspect of the invention, the displayed keyboard may appear in multiple states for entering sub-word components such as syllables. For Pinyin, for example, the keyboard may switch between displaying valid initials z/zh/c/ch/b/p/m/f etc., and valid finals o/on/ong/a/an/ang/uong/uang/uan/uon, etc. In each of these cases, the vocabulary modules will contain the necessary information to support dynamic keyboard behavior.

The keyboard layout of FIG. 1A contains six additional keys associated with the execution of specific functions or the generation of specific characters. These keys include a Shift key 108, a Space key 110, a BackSpace key 112, an Edit Word key 114, a Symbols Mode key 116, a Return (or "Enter") key 118, an Alternate Keyboard Mode key 120, and a Numeric Mode key 122. The function of these keys is discussed in conjunction with FIG. 1B.

Figure 1B:
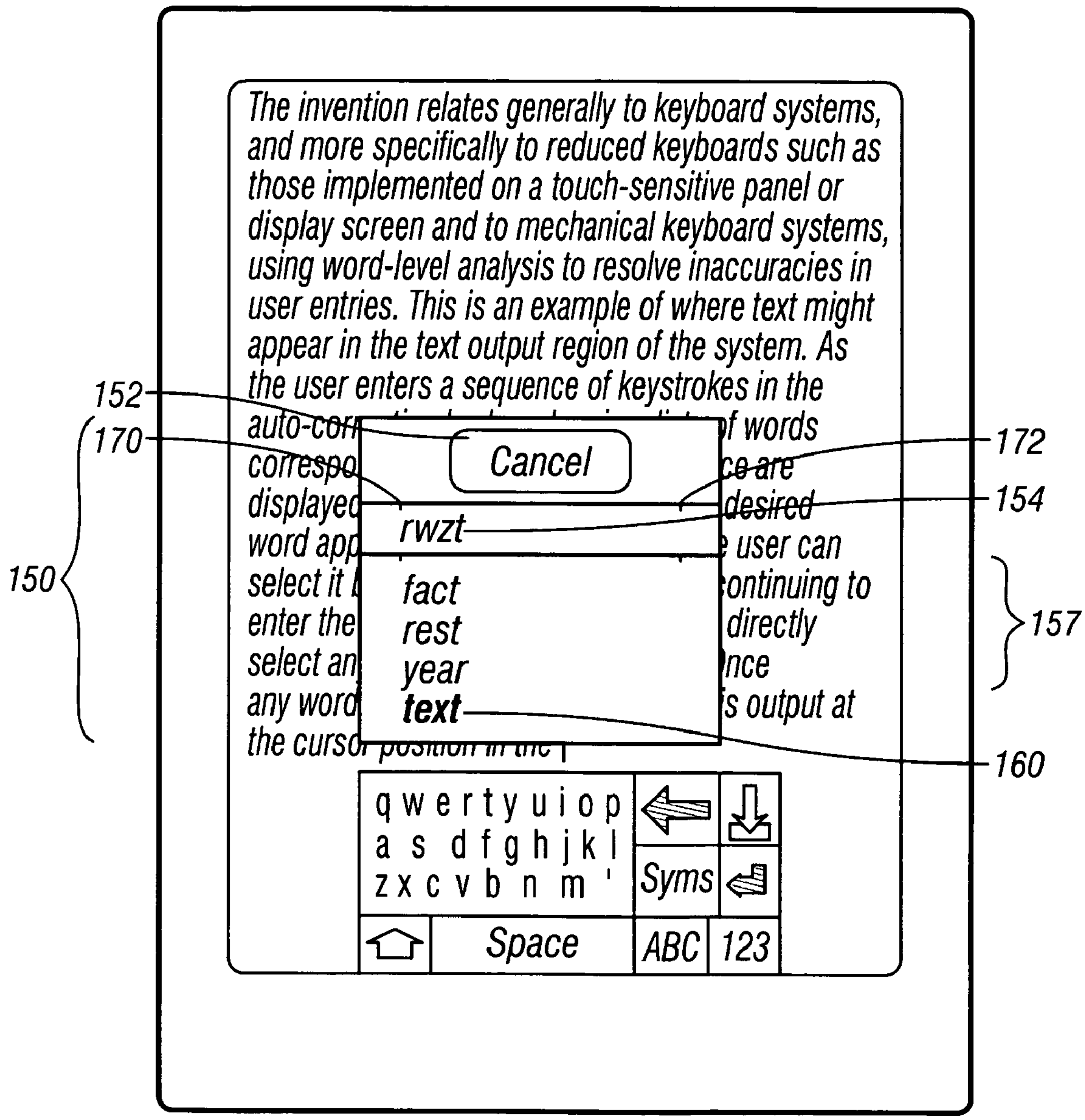
FIG. 1B is the same schematic view as that of FIG. 1A showing an embodiment of a word choice list that is displayed after the user has entered a sequence of keystrokes within the auto-correcting region.

Text is generated using the keyboard system via keystrokes on the auto-correcting keyboard 106. As a user enters a keystroke sequence using the keyboard, text is displayed on the computer display 103. Two overlapping regions are defined on the display each of which display information to the user. An upper output text region 104 displays the text entered by the user and serves as a buffer for text input and editing. A word choice list region 150, which in a preferred embodiment shown in FIG. 1B is super-imposed on top of the text region 104, provides a list of words and other interpretations corresponding to the keystroke sequence entered by a user. The word choice list region 150 aids the user in correcting inaccuracies in the entered keystrokes. In another embodiment, the system may be implemented on a device with limited display space, and display only the Default or most likely word object at the insertion point 107 in the text being generated.

In another preferred embodiment, the keyboard of the invention is implemented using a virtual keyboard device. Examples of such devices include the laser-projection keyboard offered by companies such as Virtual Keyboard (see http://www.vkb.co.il/) and Canesta (see http://www.canesta-.com/), muscle-sensing keyboards, such as the Senseboard® virtual keyboard (see, for example, http://www.senseboard.com/), and the fabric keyboard (see, for example, http://www.electrotextiles.com/).

Unfortunately, in virtual keyboards a single inaccurate or erroneous key activation may not only consist of activating a key other than the one intended, but also may consist of simultaneous or closely sequential activation of two or more adjacent keys, wherein the activated keys may or may not include among them the intended key. Thus, in accordance with another aspect of the invention, a sequence of keystrokes on the auto-correcting keyboard is filtered through a window of both time and space, in that a single intended keystroke may activate more than one adjacent key. An example is when a user depresses 2, 3 or 4 keys when the user's finger is not properly aligned with the intended key or any single specific key. Thus, following each received keystroke, the keystroke is not processed until after the system waits for a very brief timeout threshold, or until a keystroke is received on a non-adjacent key. If the next keystroke occurs on an adjacent key, or if multiple keystrokes occur on adjacent keys, before the expiration of the timeout threshold, the detected keys are regarded as a single keystroke event. In such cases, a virtual point of interaction is calculated at the center of the set of simultaneously activated keys. The distances from this calculated virtual interaction point and the known character locations are calculated by interpolating to a logical coordinate frame with a finer resolution than that of the virtual keys.

In another embodiment of the invention, keystrokes on the auto-correcting keyboard are not matched to characters in isolation, but rather entire sequences of keystrokes corresponding to completed words are matched against a lexicon of candidate words that includes frequency of use information. In this way, the system is often able to compensate correctly for occasional keystroke errors of a larger than average magnitude, or even multiple errors of a relatively larger magnitude when the intended word is of high relative frequency. This word-level analysis of keystroke input sequences are a key factor in enabling the inventive system to accommodate user keystroke errors flexibly.

The word-level analysis of keystroke sequences enables the system to generate punctuation characters, such as a hyphen or apostrophe, that are commonly embedded in words, such as hyphenated compounds and contractions in English. Such embedded punctuation characters can be associated with one or more keys or character locations included in the auto-correcting keyboard among those associated with alphabetic characters. When more than one punctuation character is associated with a single key, the specific punctuation character intended can be disambiguated based on the information included in the lexicon. Thus, for example, if a word in the lexicon includes an apostrophe in a position corresponding to a key interaction in the region of an ambiguous punctuation key, the matching algorithm automatically identifies the associated word and disambiguates the keystroke as an apostrophe. Simultaneously, the system can separately analyze the keystroke sequences preceding and following the key interaction in the region of the punctuation key to determine the most likely matching words in the lexicon and calculate the likelihood that a hyphenated compound was intended. In some embodiments, punctuation, other symbols, numbers or other characters not commonly used are relegated to a separate symbol selection scheme, preferably through presentation in a series of temporarily displayed tables. Such Symbol Tables are preferably accessed through a function key or entry element assigned adjacent to the auto-correcting region. In the case of a virtual keyboard, these other symbols, numbers and uncommon characters can be accommodated through additional keys not included in the auto-correcting keyboard.

In other embodiments, a diacritic function is associated with a location in the auto-correcting region or with a defined key. When selected, it adds an appropriate diacritic mark, such as an accent aigu in French or dakuten in Japanese, to the preceding or following character in the input sequence.

In accordance with another aspect of the invention, candidate words that match the input sequence are presented to the user in a word selection list on the display as each input is received. In accordance with another aspect of the invention, the word interpretations are presented in the order determined by the matching metric calculated for each candidate word, such that the words deemed to be most likely according to the matching metric appear first in the list. Selecting one of the proposed interpretations of the input sequence terminates an input sequence, so that the next keystroke inside the auto-correcting region starts a new input sequence.

In accordance with yet another aspect of the invention, only a single word interpretation appears on the display, preferably at the insertion point for the text being generated. The word interpretation displayed is that deemed to be most likely according to the matching metric. By repeatedly activating a specially designated selection input, the user may replace the displayed word with alternate interpretations presented in the order determined by the matching metric. An input sequence is also terminated following one or more activations of the designated selection input, effectively selecting exactly one of the proposed interpretations of the sequence for actual output by the system, so that the next keystroke inside the auto-correcting region starts a new input sequence. In an alternative embodiment, the designated selection input changes the highlighting of a word in the displayed word choice list, indicating the user's current selection of a word to be output or extended with a subsequent action. In accordance with yet another aspect of the invention, a designated selection input selects one syllable or word for correction or reentry from a multiple-syllable sequence or multiple-word phrase that has been entered or predicted by word completion. In accordance with yet another aspect of the invention, the selection input action may be a scrolling gesture across or adjacent to the auto-correcting keyboard region that causes the list to scroll and changes the candidate word that is selected for output.

In accordance with another aspect of the invention, for each input sequence of interaction points, a word is constructed by identifying the character nearest each interaction point and composing a word consisting of the sequence of identified characters. This "Exact Type" word is then presented as a word choice in the word selection list. This word may then be selected in the usual manner by, for example, touching it in the word selection list. Exact Type entries can be edited by, for example, pressing a backspace key to delete one character at a time from the end of the word. Once the user selects the Exact Type word, it is automatically accepted for output and is added to the information being composed. When so selected, the Exact Type string may be added as a candidate for inclusion into the lexicon of words so that in the future it can be typed using the auto-correcting keyboard without needing to precisely interaction each letter of the word as is necessary in first entering an Exact Type entry. In accordance with another aspect of the invention, an indication such as a small pop-up window magnifying the character associated with the location under a finger as it is dragged across the auto-correcting region gives the user visual feedback on which exact-tap letter is selected. The indication may be offered during a temporary state triggered by, for example, interacting with an input location for more than half a second. In accordance with another aspect of the invention, the temporary state may also change the distance or speed necessary to move from one Exact Type character to the next, in an inverse manner to that of mouse acceleration on a desktop PC, to ease the selection of a particular character.

FIG. 1B shows a preferred embodiment of a word choice list 150 that is displayed after the user has entered a sequence of keystrokes within the auto-correcting region 106. The word choice list includes a Cancel key 152, wherein interaction with the Cancel key causes the system to discard the current input sequence, clearing the word choice list and causing the system to restore the display of any text or graphics obscured by the appearance of the word choice list. In the preferred embodiment, the non-onscreen virtual keyboard equivalent is a Cancel/Escape key near the auto-correcting region. The "Exact Type" word 154 shows the sequence of letters closest to the actual interaction points of the input sequence, whether or not these correspond to any word in any vocabulary module. In the example shown in FIG. 1B, the Exact Type word "rwzt" does not correspond to an English word. In a preferred embodiment, selecting the Exact Type word for output results in the automatic addition of that word to the appropriate vocabulary module if it is not already included. The Default word 160, "text" in the example of FIG. 1B, is the word from the vocabulary modules determined to have the lowest value of the matching metric, i.e. the more likely the word corresponds to the user's intention, and in a preferred embodiment, is shown at the bottom of the word choice list, nearest to the auto-correcting region 106. Similarly, three alternate word choices 157 are shown in the list in an order determined by their corresponding matching metric values.

The Symbols Mode key 116, the Alternate Letter Mode key 120, and the Numeric Mode key 122 each cause a corresponding keyboard of punctuation and symbols, alphabetic letters, and numeric digits, respectively, to appear on the display screen. The user can then select the desired character or characters from the displayed keyboard. If a word choice list was displayed prior to displaying such an alternate keyboard, the selection of any character from the displayed alternate keyboard causes the Default word of the previously displayed word choice list to be output to the output text region 104 prior to outputting the selected character from the alternate keyboard. Similarly, if a word choice list was displayed prior to interaction with the Space key 110 or the Return key 118, the Default word 160 is flushed to the output text region 104 prior to generating a single space or carriage return character, respectively. In another embodiment, the system matches the selected character from an alternate keyboard with any object containing that character in its corresponding character sequence, and also adds it to the Exact Type word, without outputting the Default word of the previously displayed word choice list.

In the preferred embodiment, the Shift key 108 functions as a latching Shift key, such that interaction with it causes the letter associated with the next interaction in the auto-correcting keyboard 106 to be generated as an upper-case letter. In another preferred embodiment, two successive interactions on the Shift key 108 puts the system in "Caps-Lock," and a subsequent activation cancels "Caps-Lock" mode. BackSpace key 112 deletes the last input interaction from the current sequence of interactions if one exists, and otherwise deletes the character to the left of the cursor at the insertion point 107 in the output text region 104. When no current input sequence exists, an interaction on the Edit Word key 114 causes the system to establish a current input sequence consisting of the coordinate locations associated with the letters of the word that contains the insertion point cursor 107 or is immediately to the left of this cursor in the output text region 104. The result is that this word is pulled in to the system creating a word choice list in which the word appears both as the Default word 160 and the Exact Type word 154. In an alternate embodiment, the system establishes a current input sequence using the word containing or adjacent to the insertion point cursor as soon as the user begins a new series of interactions with the auto-correcting keyboard region, appending the new interactions to the established current input sequence.

Figure 1C:
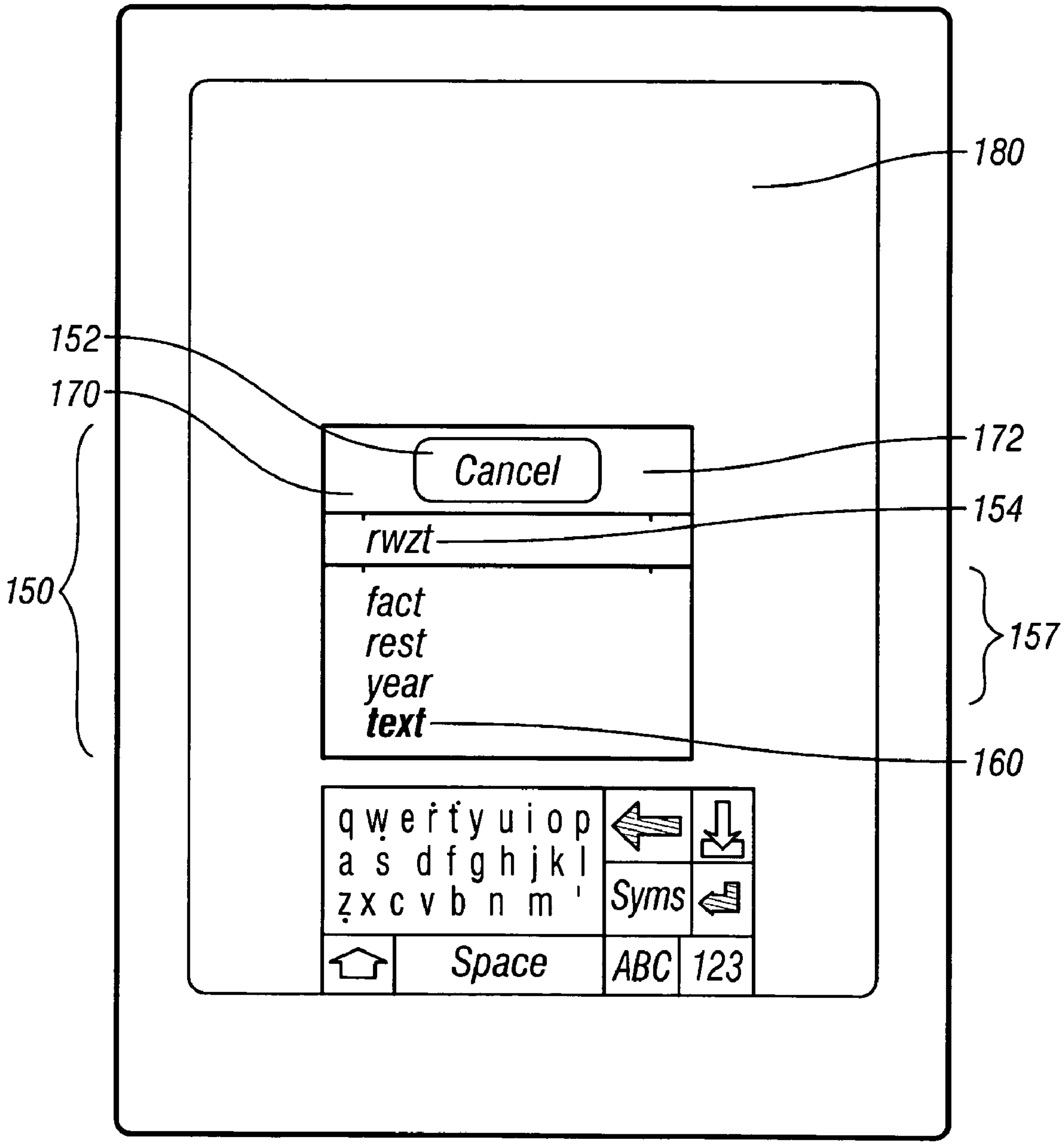
FIG. 1C is the same schematic view as that of FIG. 1B showing a non-screen embodiment of he invention.

With regard to FIG. 1C, a reduced auto-correcting keyboard system formed in accordance with the invention is depicted in connection with a virtual keyboard which is projected onto a surface 180. The keyboard has an auto-correcting region wherein the 26 letters of the English alphabet plus an apostrophe are displayed in approximately the standard QWERTY arrangement.

Figure 2:
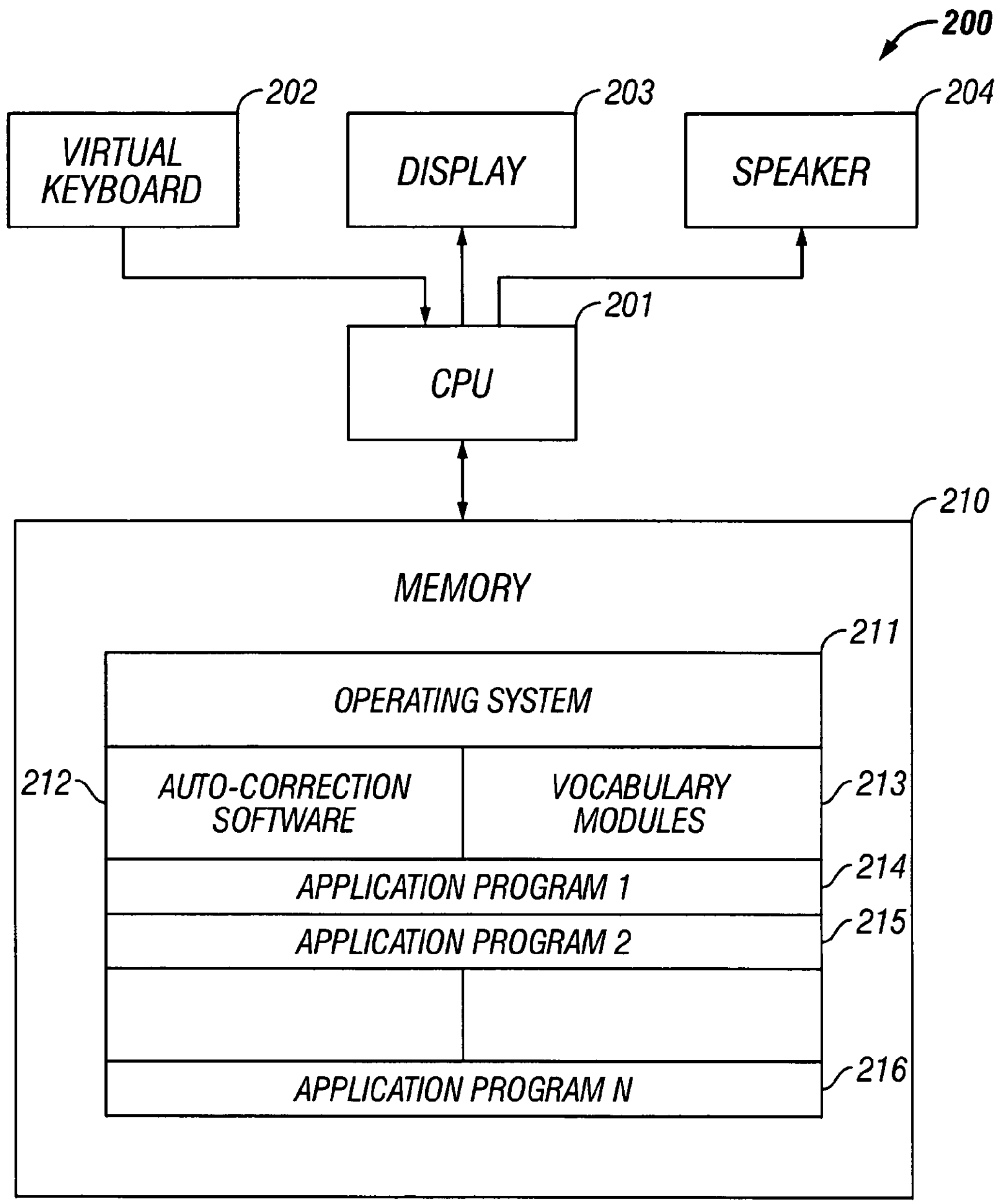
FIG. 2 is a hardware block diagram of the reduced keyboard system of FIGS. 1A and 1B.

A block diagram of the reduced keyboard disambiguating system hardware is provided in FIG. 2. The virtual keyboard 202 and the display 203 are coupled to a processor 201 through appropriate interfacing circuitry. Optionally, a speaker 204 is also coupled to the processor. The processor 201 receives input from the virtual keyboard, and manages all output to the display and speaker. Processor 201 is coupled to a memory 210. The memory includes a combination of temporary storage media, such as random access memory (RAM), and permanent storage media, such as read-only memory (ROM), floppy disks, hard disks, or CD-ROMs. Memory 210 contains all software routines to govern system operation. Preferably, the memory contains an operating system 211, auto-correction software 212, and associated vocabulary modules 213 that are discussed in additional detail below. Optionally, the memory may contain one or more application programs 214, 215, 216. Examples of application programs include word processors, software dictionaries, and foreign language translators. Speech synthesis software may also be provided as an application program, allowing the reduced auto-correcting keyboard system to function as a communication aid.

In accordance with another aspect of the invention, each input sequence is processed with reference to one or more vocabulary modules, each of which contains one or more words together with information about each word including the number of characters in the word and the relative frequency of occurrence of the word with respect to other words of the same length. Alternatively, information regarding the vocabulary module or modules of which a given word is a member is stored with each word.

In one embodiment, there are one or more word stem modules and prefix/suffix modules; each word stem module comprises a logical organization of uninflected word stem objects, and each prefix/suffix module comprises a logical organization of prefixes and/or suffixes that can be appended to word stems to form inflected words. Each word stem module is associated with one or more prefix/suffix modules, such that whenever the word evaluation component calculates a matching metric value for a given word stem in a given word stem module with respect to a sequence of interactions within an input sequence such that the calculated matching metric value ranks higher than a predetermined threshold, the word evaluation component evaluates the remaining interactions of the input sequence with respect to the associated prefix/suffix modules. When the word evaluation component calculates a matching metric value for a given prefix or suffix in one of the associated modules that ranks above another threshold, the prefix or suffix is appended to the word stem to form a completed word with a combined matching metric value that is a function of both the word stem matching metric value and the prefix/suffix matching metric value.

Further, in some languages, such as Indic languages, the vocabulary module may employ "templates" of valid character or sub-word sequences to determine which characters around an interaction point are possible given the preceding interactions and the word objects being considered. Components of the system may also consider the broader context—the immediately preceding or following words, the formality of the writing style chosen by the user in the current text or habitually, or even the type of input field or application—and refer to only the relevant vocabulary modules or weigh the calculated matching metric value of likely words, word stems, prefixes, or suffixes appropriately. In addition, the application may supply specific vocabularies to the system for use in the current context.

Each input sequence is processed by summing the distances calculated from each interaction point in the entry sequence to the location assigned to the letter in the corresponding position of each candidate word, wherein the distances are calculated according to one of the preferred methods. This total distance is combined with the frequency information regarding each candidate word to calculate a matching metric by which the various candidate words are rank ordered for presentation to the user. In one preferred embodiment, the matching metric is calculated as follows. The square of the distance from each interaction point in the entry sequence to the location assigned to the letter in the corresponding position of each candidate word is calculated, and the sum of the squared distances is calculated for each candidate word. This sum is then multiplied by a frequency adjustment factor, which in one preferred embodiment is calculated as the base 2 logarithm of the ordinal position of the word in the candidate list, where words of higher relative frequency are moved higher in the list to positions corresponding to a lower ordinal position, i.e. the most frequent word is at position "1." Thus, the lower the numeric value of the calculated matching metric, the more likely a given word is deemed to correspond to the user's intention in generating a sequence of interaction points.

In another aspect of the invention, prior to multiplying the sum of the distances from each interaction point in the entry sequence to each corresponding letter in a candidate word by the frequency adjustment factor, a fixed increment is added to the sum so that it is at least greater than or equal to this increment value. This is done to avoid calculating a matching metric value of zero, i.e. the most likely match, when the sequence of interaction points happens to correspond exactly to the spelling of a given word, even when that word occurs with very low frequency, i.e. has a high numeric ordinal position. This allows much more frequently occurring words to produce a better matching metric even when an inaccurate sequence of interaction points is entered. In one implementation of this preferred embodiment, it was found that a fixed increment value of approximately twice the average distance between adjacent characters in the keyboard was effective in reducing spurious matches with infrequent words.

In accordance with another aspect of the invention, words in each vocabulary module are stored such that words are grouped into clusters or files consisting of words of the same length. Each input sequence is first processed by searching for the group of words of the same length as the number of inputs in the input sequence, and identifying those candidate words with the best matching metric scores. In accordance with another aspect of the invention, if fewer than a threshold number of candidate words are identified which have the same length as the input sequence, and which have a matching metric score better than a threshold value, then the system proceeds to compare the input sequence of N inputs to the first N letters of each word in the group of words of length N+1. This process continues, searching groups of progressively longer words and comparing the input sequence of N inputs to the first N letters of each word in each group until the threshold number of candidate words are identified. Viable candidate words of a length longer than the input sequence may thus be offered to the user as possible interpretations of the input sequence, providing a form of word completion. In another aspect of the invention, prior to multiplying the sum of the distances from each interaction point in the entry sequence to each corresponding initial letter in a candidate word whose length is greater than the length of the current input sequence by the frequency adjustment factor, a second fixed increment is added to the sum so that it is greater than the distance sum that would be calculated for a word whose length corresponds exactly to the length of the current input sequence. This is done to assign a relatively higher matching probability to words whose length does correspond exactly. In another preferred embodiment, this second increment factor is a function of the difference in length between the candidate word and the current input sequence.

Figure 3:
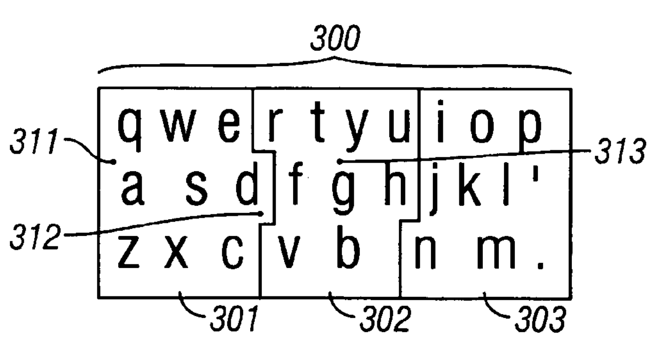
FIG. 3 is a schematic view of a preferred embodiment of an auto-correcting region of the reduced keyboard system of the invention which automatically corrects input keystrokes, showing its division into three clustering regions and three example interaction points.

In accordance with another aspect of the invention, to increase the efficiency with which the vocabulary modules can be processed, each character mapped onto the virtual keyboard in the auto-correcting region is assigned a boundary of exclusion. Each such boundary identifies the region beyond which the distance from the interaction point to the character is not calculated and the character is removed from consideration for that interaction point in the input sequence, reducing the computation required by the distance calculation process. The boundaries of exclusion for several characters may share some or all common boundary segments. Examples of shared boundaries include the extreme edge of the auto-correcting region, or gross boundaries drawn through the character space to subdivide the auto-correcting keyboard into 2, 3 or more major clustering regions. Conceptually, it is identical to consider the boundary of exclusion for a given interaction point, where any character outside that boundary is excluded from consideration as a match for that input point. For example, FIG. 3 shows an auto-correcting region 300 that consists of a horizontal rectangle which is divided vertically into three clustering regions 301, 302, 303 of approximately equal size, where these regions are defined such that each character falls into only one of the three clustering regions. The clustering regions are defined such that for each interaction point in the auto-correcting region, at least one and frequently two of the three regions lie completely outside the boundary of exclusion for that interaction point. For example, a interaction point 311 at the left side of region 301 is far enough away from region 302 that all characters in region 302 (and region 303) could be defined to lie outside the boundary of exclusion for interaction point 311. In contrast, the boundary of exclusion for interaction point 312 at the right side of region 301 would extend into region 302 such that one or more characters in region 302 would be considered to lie inside the boundary, so that the only region completely outside the boundary of exclusion for interaction point 312 would be region 303. The boundary of exclusion for interaction point 313 in the center of region 302 could be considered to be far enough away from both region 301 and region 303 that all characters in both these regions could be defined to lie outside the boundary.

Such clustering regions are then used to increase the efficiency with which the system can identify the most likely matching words in one or more vocabulary modules for a given input sequence of interaction points. Continuing the example described above and depicted in FIG. 3, the words of a given length in each vocabulary module can be divided up into nine different sub-groups based on the clustering regions in which each of the first two letters of each word is found, since there are nine possible ordered pairs of such regions. Note that processing words of only one letter need not be optimized since very little calculation is required and there are only a very small number of one-letter words, even when every letter is treated as if it is a one-letter word. For each of the first two interaction points, letters in one or two of the clustering regions can be eliminated from consideration, so that all of the words in the sub-groups associated with letters in the eliminated regions can be skipped over without needing to perform any distance calculations. Thus, assuming a more or less equal distribution of total character frequency among the three regions for the first two character positions of words in the vocabulary modules, upon the receipt of the second interaction point, the system need only calculate distances for and compare at most 4/9 of the candidate words, when only one clustering region is eliminated from consideration for each interaction point, to as few as 1/9 of the candidate words, when two clustering regions are eliminated for each interaction point. As would be obvious to one of ordinary skill in the art, this method can be used with a greater or lesser number of clustering regions, and for different numbers of initial interaction points, with corresponding results. For example, four clustering regions could be used to divide candidate words into sixteen sub-groups based on the first two interaction points.

In another embodiment of the invention, a subset of characters or functions is associated with uniquely defined regions or keys outside the auto-correcting keyboard, where entries within these regions are interpreted as explicit entries of a specific character or function, for example, a Space key that unambiguously generates a single space when selected.

For a defined set of such keys, selecting such a key immediately following an input sequence, and prior to performing an explicit selection of any of the interpretations offered by the system for the input sequence, results in the automatic acceptance of the interpretation of the input sequence deemed to be most likely according to the matching metric calculated for each candidate word. The input sequence is terminated, so that the next keystroke inside the auto-correcting region starts a new input sequence. Once the desired word interpretation of an input sequence has been determined and the sequence is terminated, the system automatically outputs the word so that it is added to the information being constructed. In the case of certain functions, for example the backspace function, an entry within the associated region is interpreted as an explicit entry of the backspace function, which is immediately executed. The result in this case however, does not terminate the input sequence, but simply deletes the last (most recent) input from the sequence. In many embodiments, keys outside the auto-correcting keyboard are immediately interpreted and acted upon according to the unique character or function associated with the key. Depending on the associated character or function, in some cases the current input sequence is terminated as a result.

In accordance with another aspect of the invention, the system distinguishes between two different types of interaction events that occur in the area of the virtual keyboard that is used to display the auto-correcting region and other uniquely defined regions or keys outside the auto-correcting keyboard. One type of interaction consists of a tap event, wherein the virtual keyboard is interacted with and then the interaction is terminated without moving beyond a limited distance from the initial point of interaction. This type of event is processed as a keystroke intended for the reduced auto-correcting keyboard system as described in this disclosure. The second type of interaction consists of a stroke event, wherein the virtual keyboard is interacted with and then the point of interaction is moved in one or more directions beyond the limited distance threshold used to define a tap event. This second type of interaction can then be processed by using a stroke recognition system using techniques that are well known in the art. This allows a number of additional functions or special characters to be made easily accessible to the user without having to trigger pull-down menus or define additional keys that would either require additional screen space or reduce the size of the keys provided. The interpretation of such strokes and the resulting character or function associated with a recognized stroke is then processed by the system in the same fashion as an activation of one of the uniquely defined regions or keys outside the auto-correcting keyboard. In this way, only a limited area of the available virtual keyboard needs to be used to accommodate both keyboard-based and stroke recognition input approaches.

In accordance with another aspect of the invention, each character recognized by the stroke recognition system may have its own calculated matching metric value, based on resemblance to character shape templates rather than distance to known character locations. The system may convert the values to their distance equivalents and incorporate such recognized characters into the input sequence, with one or more possible character interpretations (with relative values) of each stroke event, or an explicit entry that is either recorded as a distance of zero from the known location of the character or a explicit entry that the word evaluation component will only match objects with that character in the corresponding position in the sequence.

In accordance with another aspect of the invention, the system performs additional processing of tap events to dynamically adjust to a particular user's style of interaction with the virtual keyboard. For a user who interacts with the virtual keyboard with a gesture that closely approximates a point, i.e. the stylus or finger interacts with the surface and is lifted before being moved any appreciable distance, there is no significant ambiguity as to where the user intended to interact with the keyboard. However, when the stylus or finger moves to a greater or lesser extent before being lifted from the surface, there is ambiguity as to which point is interacted with during the duration of the gesture which best represents the point that the user intended to interact with. That is, whether it is the initial point of interaction, the final point where the stylus or finger was lifted, or some other point along the path of interaction. In a preferred embodiment, the system records the path traced out by each interaction as a set of N interaction points that include the endpoints of the path of interaction and zero or more points equally spaced points along the path. For example, in an embodiment where N is set to 3, the set would include the endpoints and the midpoint of the path. Initially, one point of each set of recorded points is designated as the coordinate to be used to represent the point of interaction in calculating distances to letters in the auto-correcting keyboard. For example, in a preferred embodiment, the initial point of interaction recorded in each set is designated as the coordinate to be used to represent the point of interaction in all distance calculations. Each time a word is selected for output from the word choice list, the distance calculation is repeated from each letter in the chosen word to each of the other sets of recorded points. For example, when N is set to 3 and the calculation is performed for the starting point of interaction, the calculation is repeated for the set of midpoints and for the set of endpoints. Whichever set of points results in the minimum calculated distance is then designated as the set of points whose coordinates are to be used to represent the sequence points of interaction in all subsequent distance calculations in creating the word choice list for each sequence of interactions. In another preferred embodiment, a running average is computed of the distance calculations performed for each point set, and the point set for which this running average is lowest is used for distance calculations in creating the word choice list.

In another preferred embodiment, the running average is computed of the horizontal and vertical signed offset of the designated points from the intended target letters, and the coordinates used in distance calculations for creating the word choice list are adjusted by this average signed offset, or by a fixed fraction of this offset. Thus, if a user consistently interacts with the virtual keyboard somewhat to the left and below the intended letters, the system can automatically adjust and more accurately predict the intended word on average.

Further, if the auto-correcting region is not a flat plane, or certain sub-regions or characters are more prone to error than others, or the virtual keyboard display or projection is erroneous or distorted, or the interaction detection technology records inputs unevenly, the system may adjust to the pattern of inaccuracy in a more sophisticated way than just a single horizontal and vertical offset. For example, the system may maintain an independent adustment for each clustering region or for each individual character. As the user repeatedly enters and selects words from the word choice list; the difference between each interaction point and the known location of the intended character can be included in a running average of the horizontal and vertical signed offsets for each character.

In accordance with another aspect of the invention, each character mapped onto the virtual keyboard in the auto-correcting region is assigned a region of territory. Each such region identifies an area wherein the distance from the user entry to the character is assigned the value of zero, simplifying the distance calculation process. The size of such regions can vary for different characters and functions. For example, a larger region may be assigned to a character that occurs with a relatively higher frequency within a representative corpus of usage. In one embodiment, this region assigned to a character simply corresponds to a defined key that is clearly circumscribed and demarcated on the virtual keyboard, and to which the character is assigned.

The system can change character regions dynamically, especially if the keyboard is not pre-printed. It may either assign more area to letters that are more frequent, thus decreasing their ambiguity, based on the user's own vocabulary or pattern of use, or visually reflect the cumulative inaccuracy adjustments by moving characters and reshaping their regions.

In another embodiment, the virtual keyboard arrangement is similar to a telephone keypad where multiple characters are associated with some defined keys. The characters in each cluster are mapped to the same region and are all assigned a distance of zero for any user interaction within the region. In this way, the auto-correcting keyboard system can also support ambiguous text input similar to the T9™ Text Input system for mobile phones, if the maximum number of defined keys is restricted or for the benefit of users more familiar with that keyboard layout. The distance calculation process treats the zero-distance characters as being equally likely, creating an ambiguity bias that is closer to the T9 model but still allowing auto-correction in case an entered location is associated with the wrong key for the desired word.

The operation of the reduced auto-correcting keyboard system is governed by the auto-correction software 212 which is based in part on the distance between the interaction point and the various candidate characters. In one embodiment of the invention, each character in the auto-correcting keyboard is assigned a Cartesian coordinate to simplify the calculation of the distance to keystrokes. The distance between the interaction point and the various candidate character locations in the auto-correcting keyboard, therefore, is calculated through simple Cartesian coordinate distance analysis. In another embodiment of the invention, the square of the simple Cartesian coordinate distance is used to both simplify calculation because no square root need be calculated, and to apply a non-linear weighting to more distant interaction points. In other embodiments, the distance calculation also uses other nonlinear functions such as natural logarithms or discrete steps, either exclusively or in an appropriately weighted combination with Cartesian coordinate distance analysis.

Also, in another preferred embodiment the distances in the x and y directions are weighted differently. Such modifications to the distance calculation can serve to simplify word selection, reduce processing requirements, or to accommodate systematic entry anomalies depending on the particular needs of a given system and its implementation. For example, in the case of a virtual keyboard on which a QWERTY keyboard arrangement is displayed with three rows of character keys, it is generally less likely that a significant error is made in interaction with the keyboard in the wrong row. In this case, vertical distance along the y-axis may be weighted more heavily than horizontal distance along the x-axis.

Additionally, the spacing between characters on the auto-correcting keyboard may be non-uniform, depending on how frequently any given character is used in a representative corpus of the language, or on its location relative to the center or the edge of the keyboard. Alternatively, when sufficient computational resources are available, one or more characters may be assigned a plurality of corresponding coordinate locations to be used as reference points in calculating the distance of the key from the coordinate location of a point at which the keyboard was interacted with, wherein that distance is calculated as the distance from the interaction point to the closest such assigned reference coordinate. This tends to decrease the calculated distances to points at which the surface is interacted with in a non-linear fashion, and consequently increase the size of the region surrounding the character in which there is a high likelihood that a sequence of interactions that includes a interaction point in the region matches a word with the character in the corresponding position.

Also, the coordinates of the characters may be assigned to locations not shared by keyboard keys or directly detectable by sensors. This allows the system to be implemented using virtual keyboards which may have a lower resolution in detecting points of interaction. It also allows the keyboard to be reconfigured according to the user's wishes, but still using the same virtual keyboard. For example, the common three rows of characters in the QWERTY layout may be served with 1, 2, 3 or more rows of sensors to reduce the keyboard's complexity or to allow dynamic reassignment of novel keyboard arrays. An example is changing from 3 rows of 9 characters to 4 rows of 7 characters. The assigned coordinate location for a given character key may thus lie between the nearest two or more points at which interactions with the keyboard may be detected and resolved. In this case, the distance from a detectable interaction point and the assigned character location is calculated by interpolating to a logical coordinate frame with a finer resolution than that of the virtual keyboard.

In one preferred embodiment of the system, additional processing optimization is achieved by setting a limit on how many letters in a given candidate word can be further away from the corresponding input interaction point than a preset threshold distance (maximum_key_distance). If this preset threshold maximum_key_distance is set to a value other than MAX_DISTANCE_VALUE (the maximum distance value that can be calculated by the distance measurement algorithm used in the system), then a second threshold over_max_distance_limit is set to the maximum number of letters in a given candidate word that can be further than maximum_key_distance from the corresponding input interaction point.

FIGS. 4A through 4K show a flow chart of a preferred embodiment of a main routine of the auto-correction software 212 that generates and manages a word choice list to aid the user in efficiently using inaccurate keystroke sequences.

Figure 4A:
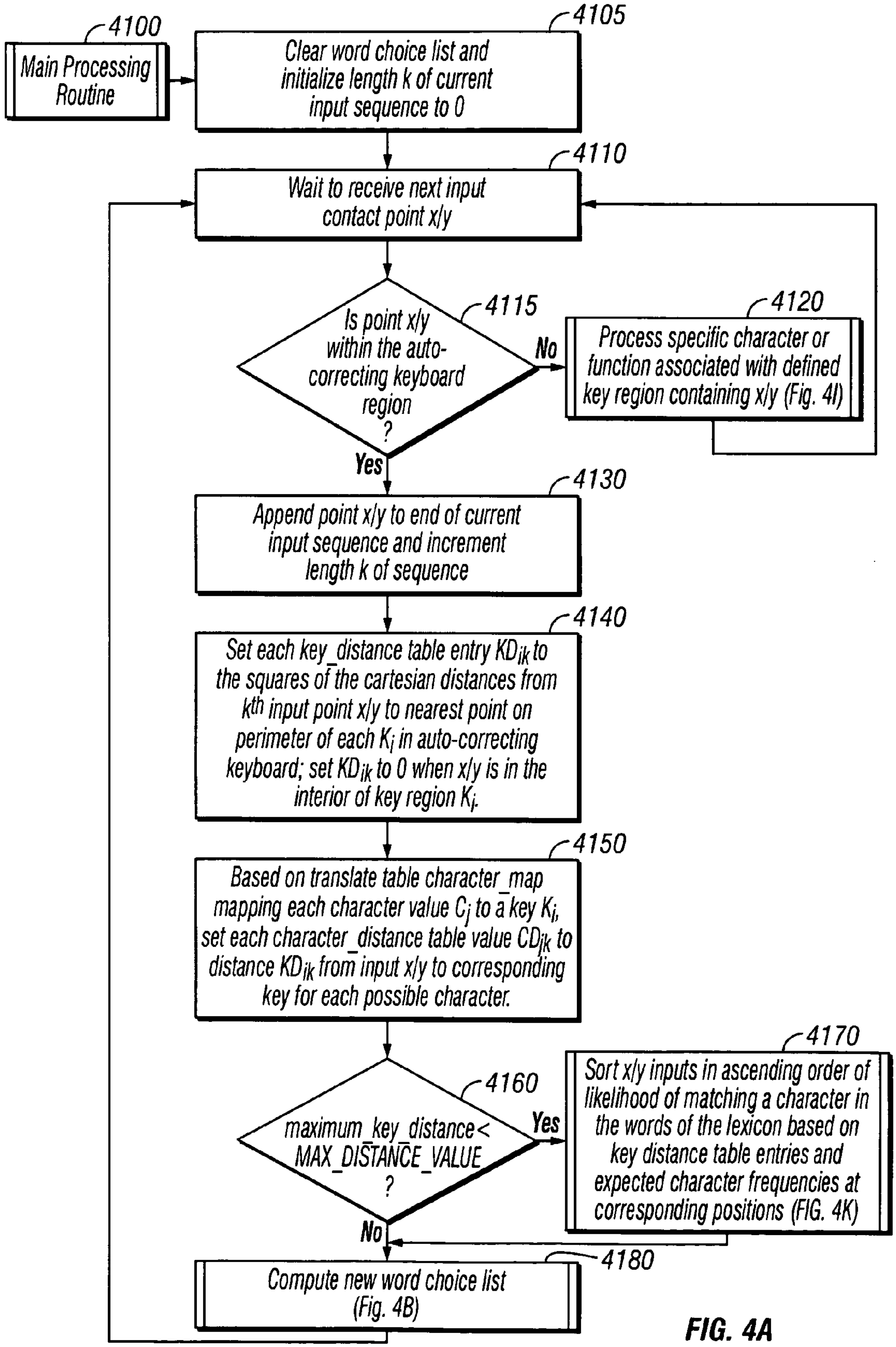
FIGS. 4A through 4K show a flow chart of a preferred embodiment of software to determine the intended text to be generated in response to an input sequence of keystrokes.

FIG. 4A, shows the main processing routine, which when the system is first started, at block 4105 initializes both the word choice list and the current input sequence to an empty state. Then, at block 4110, the system waits to receive a keystroke from the virtual keyboard 202. Upon receipt of a keystroke, at block 4115 the system determines whether the coordinates x/y of the received keystroke interaction point lie within the boundaries of the auto-correcting region 106.

Figure 4B:
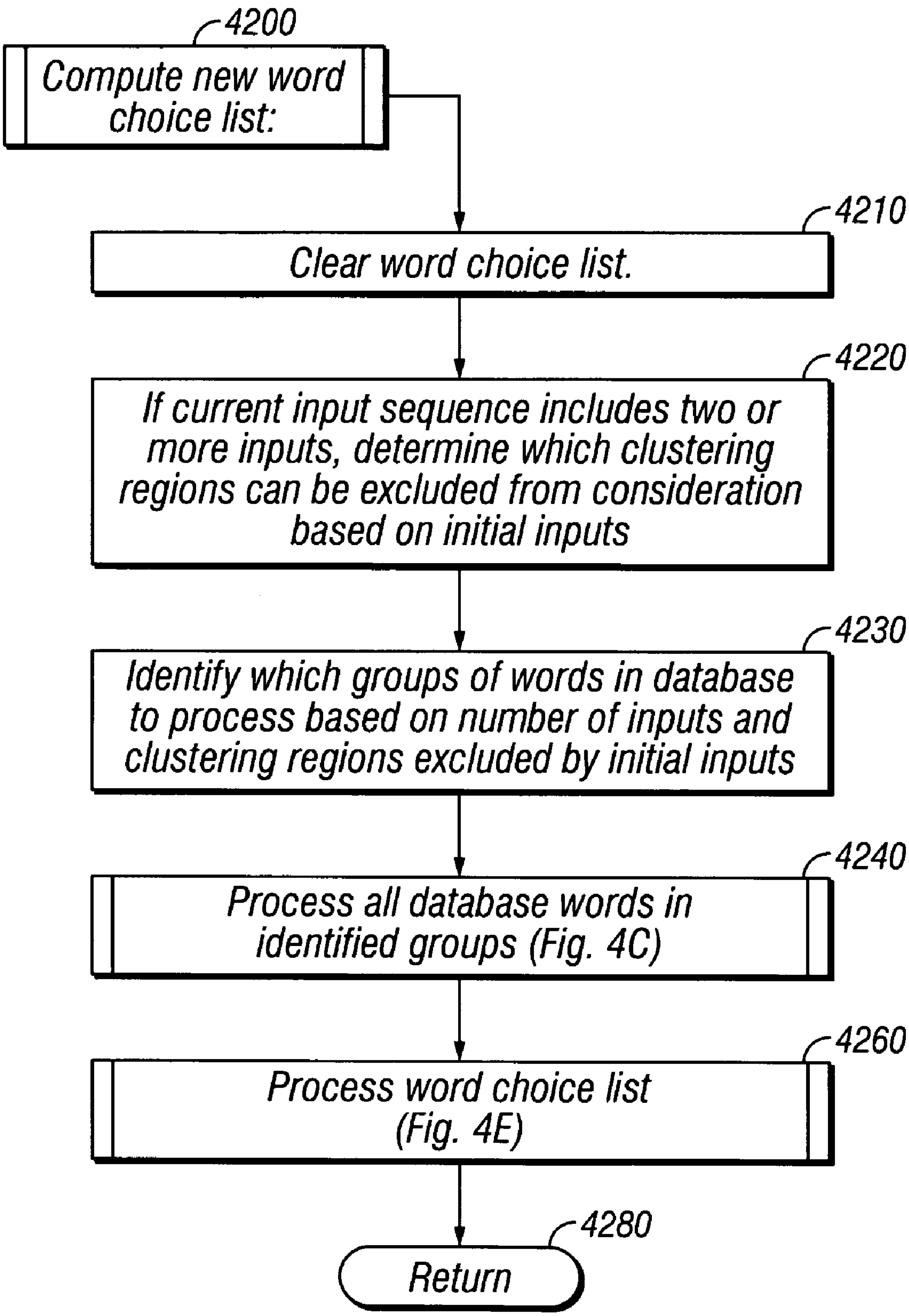
Figures 1, 4C:
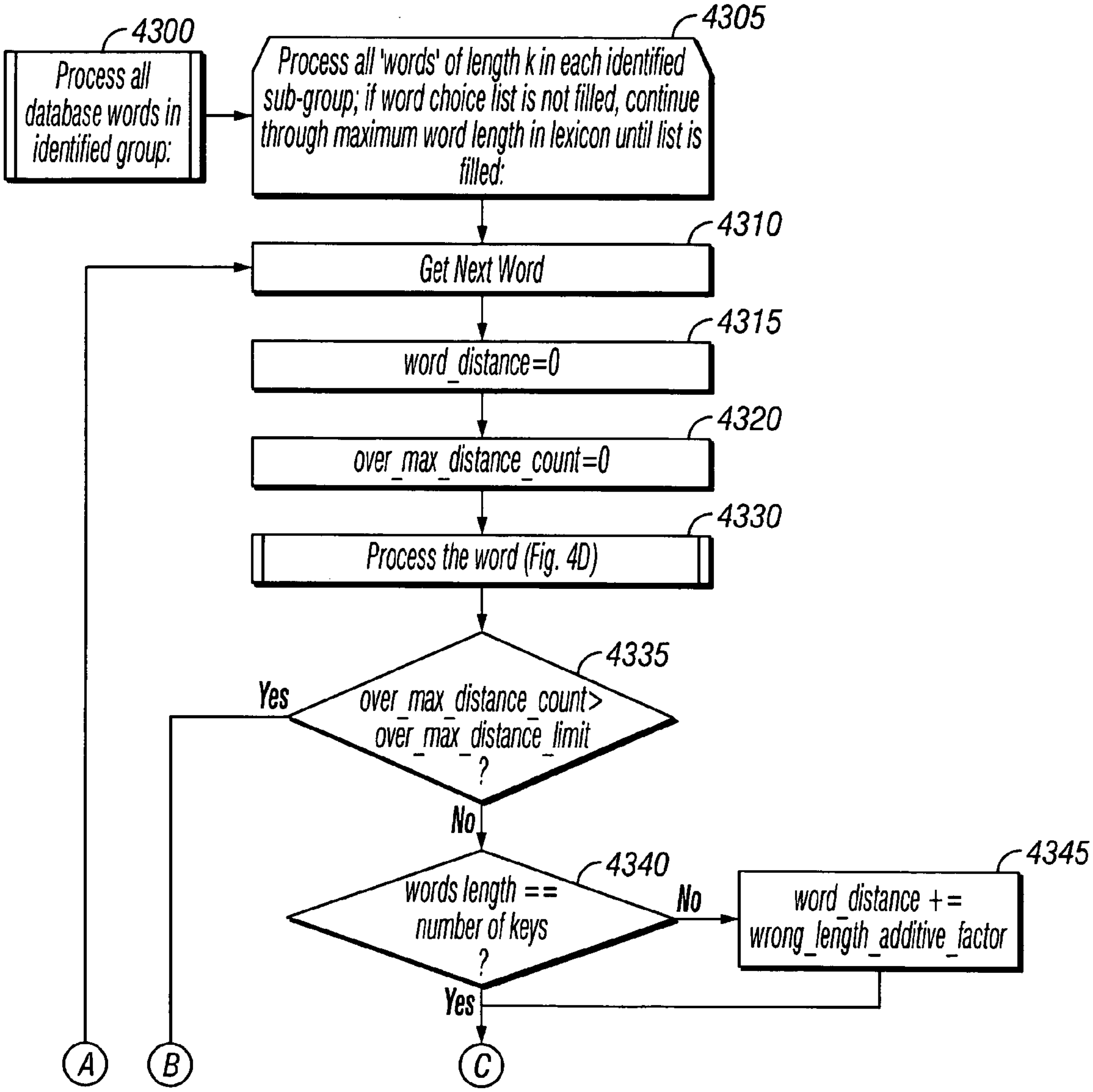
Figures 2, 4C:
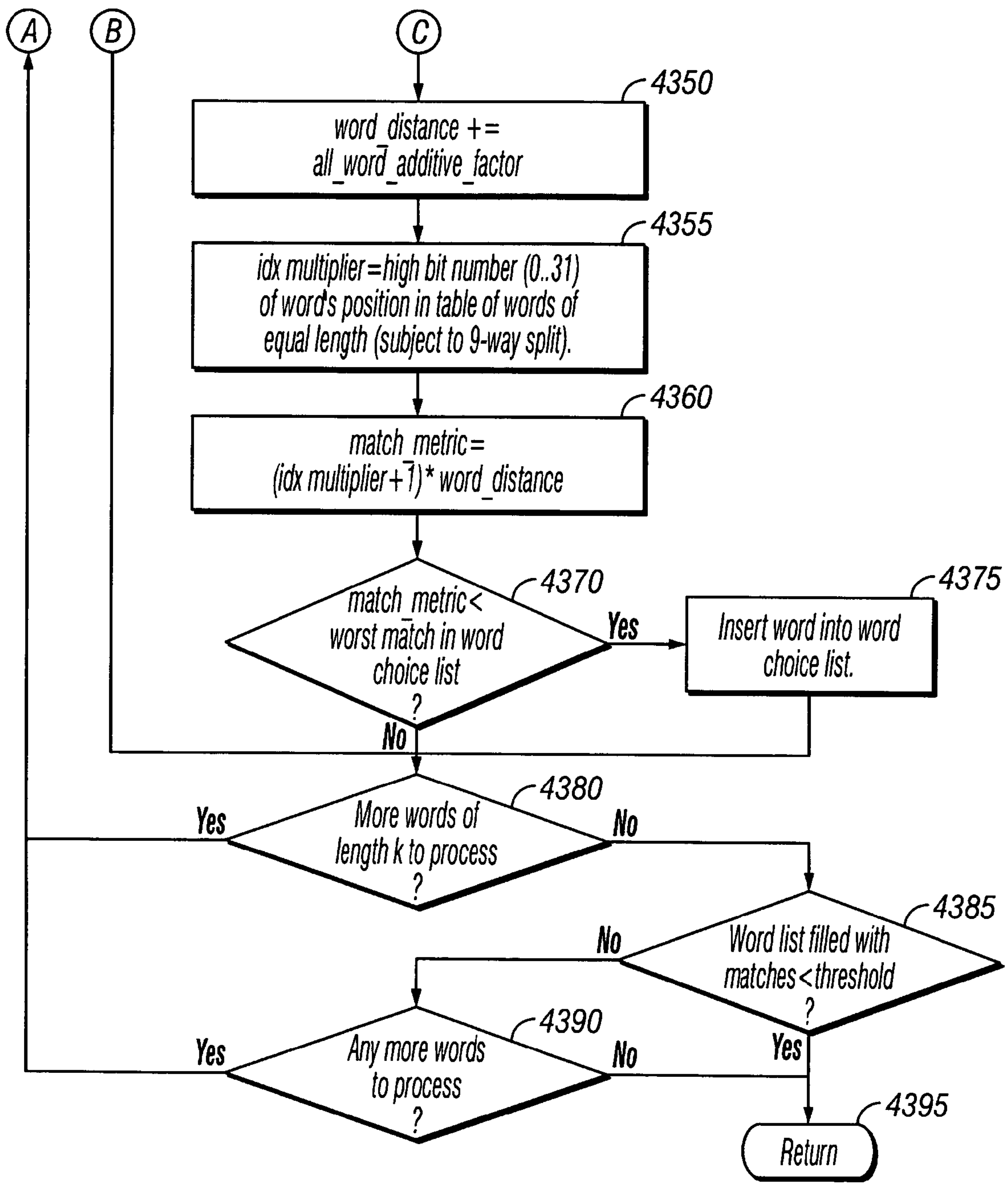
Figure 4D:
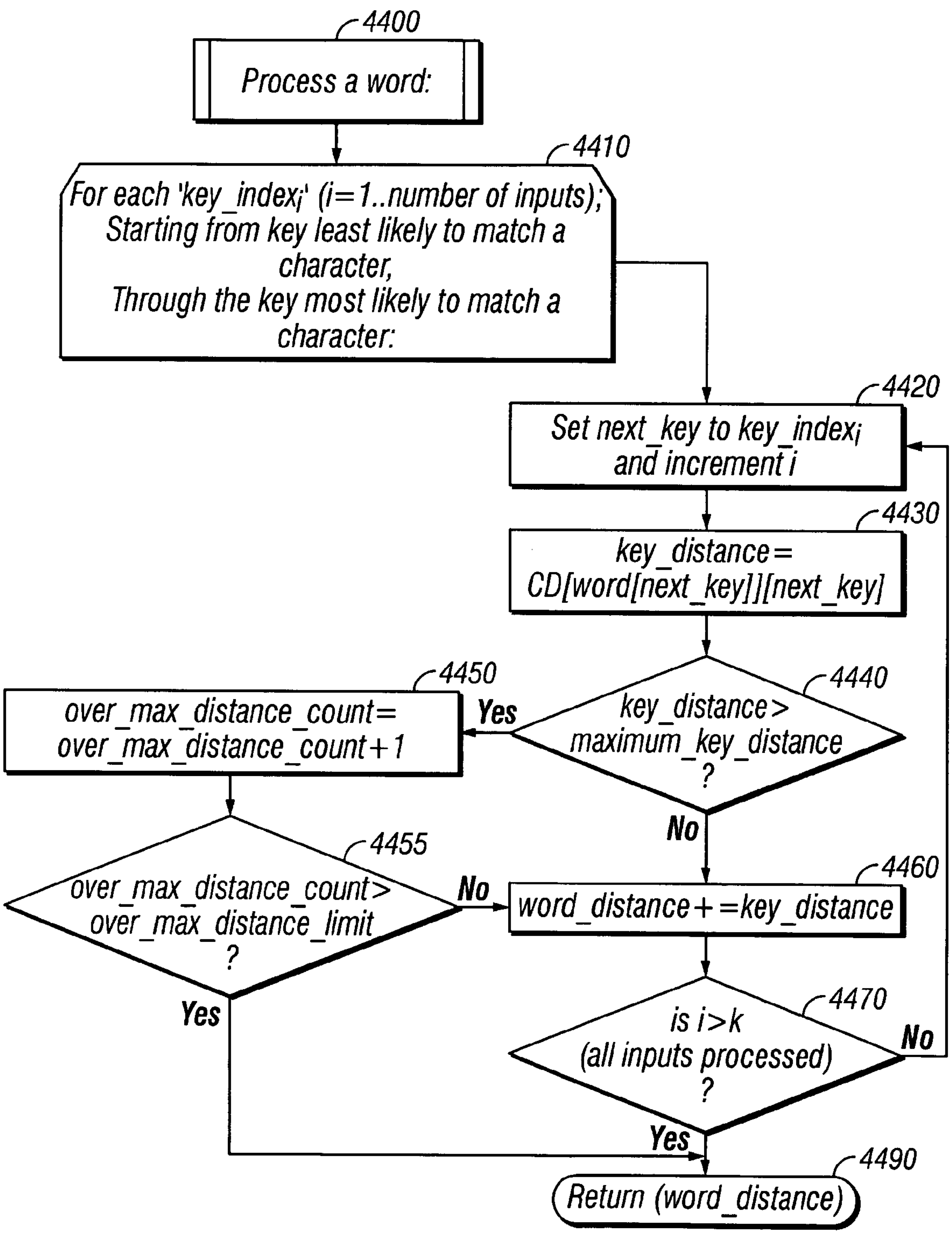
Figure 4E:
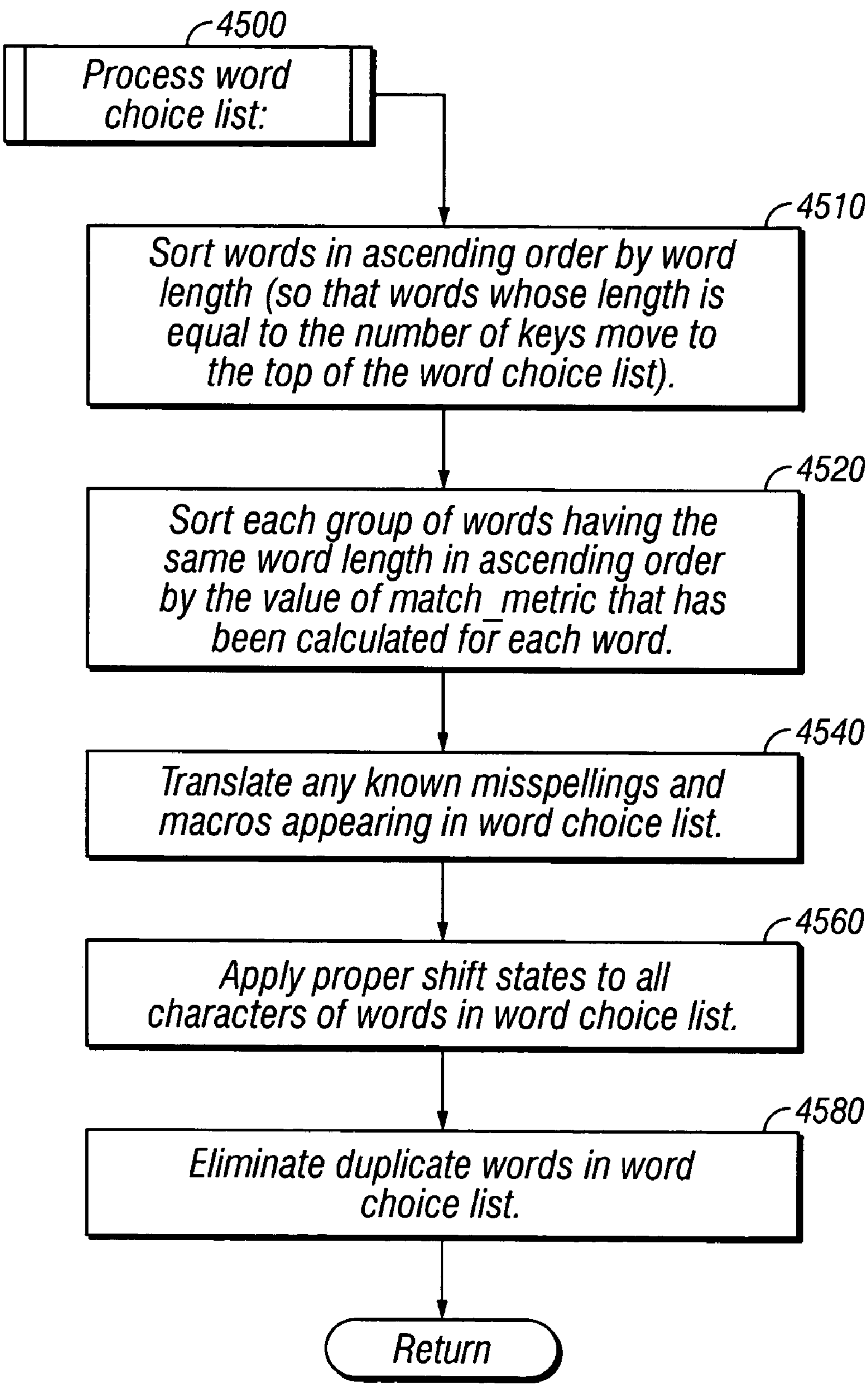
Figure 4F:
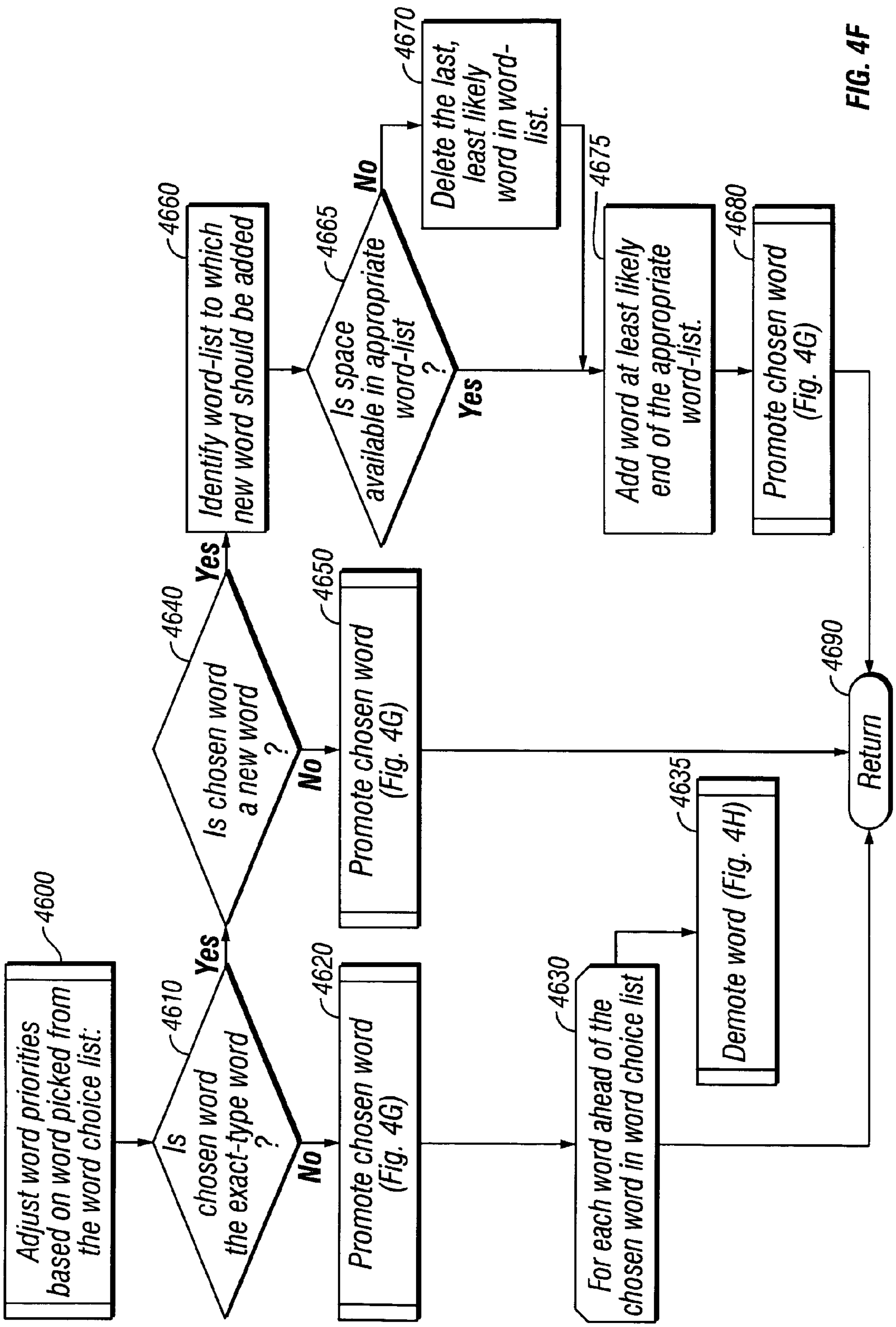
Figure 4G:
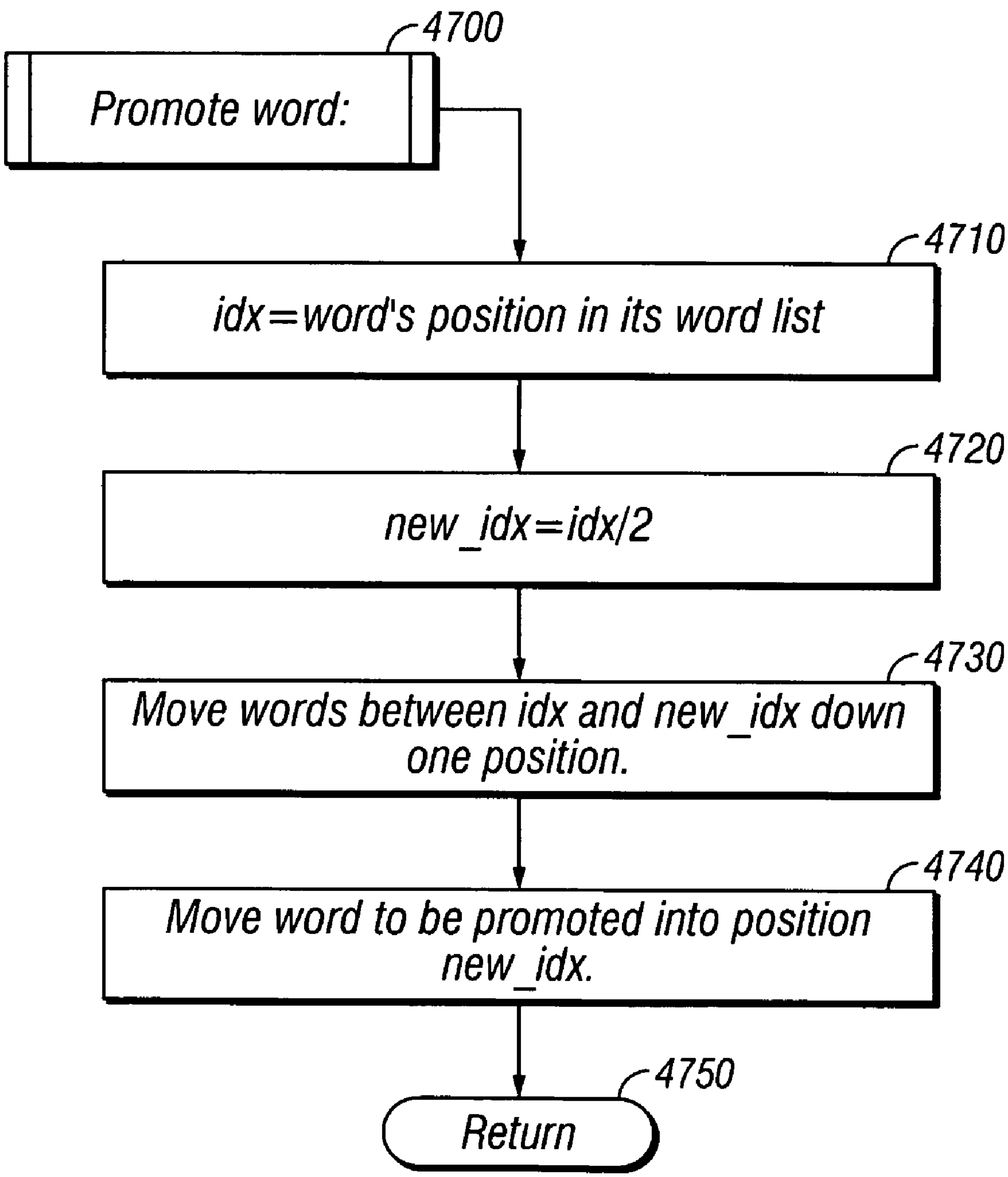
Figure 4H:
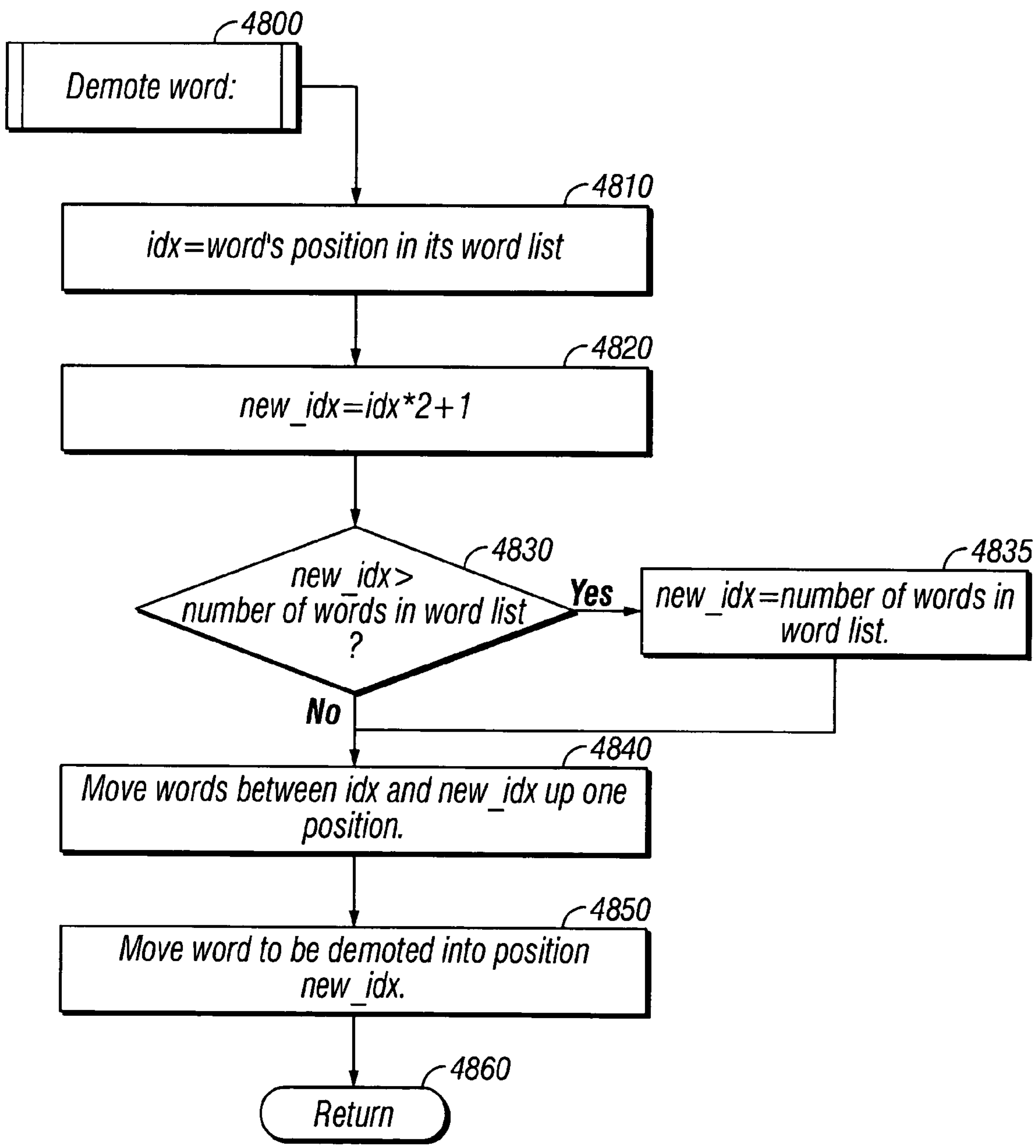
Figure 4I:
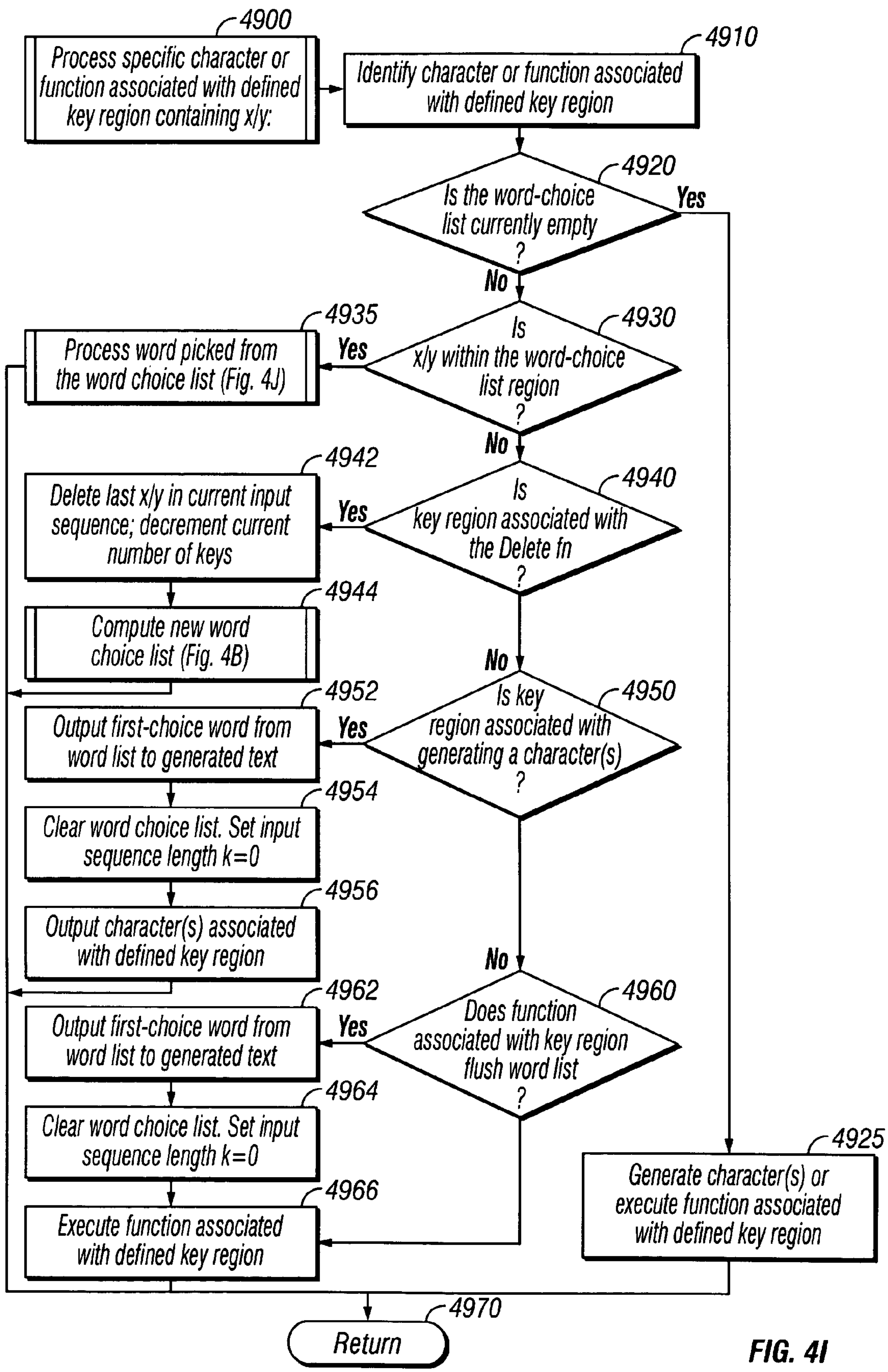

If not, then the process indicated in block 4120 is carried out as shown in the flowchart of FIG. 4I, wherein the system processes the specific character or function associated with the defined key region containing interaction point x/y. If at block 4115 the received keystroke interaction point x/y lies within the boundaries of the auto-correcting region 106, then at block 4130 the length k of the sequence is incremented by one, and the point x/y is appended to the end of the current input sequence as the $k^{th}$ input. Then at block 4140, the system sets the key_distance table entries $KD_{ik}$ to the squares of the Cartesian distances from the $k^{th}$ input point x/y to the nearest point on the perimeter of each key $K_i$ in auto-correcting keyboard, setting $KD_{ik}$ to 0 when x/y is in the interior of key region $K_i$. At block 4150, for each possible character $C_j$ that is a valid character appearing in one or more words of the vocabulary modules 213, a translate table character_map mapping each character value $C_j$ to its corresponding key $K_i$ is used to set each element $CD_{jk}$ of the $k^{th}$ row of the character_distance table to the squared distance $KD_{ik}$ from $k^{th}$ input x/y to the key $K_i$ corresponding to each possible character $C_j$. This allows the distances used in calculating the matching metric to be calculated only once (when $KD_{ik}$ is set in the key_distance table), and the translate table character_map is likewise used only once when the character_distance table is filled in from the key_distance table. This allows for greater efficiency in the large number of calculations that would otherwise be repeated in processing the words of the vocabulary modules.

At decision block 4160, the variable maximum_key_distance is checked to determine whether it is set to a value other than MAX_DISTANCE_VALUE, and if so, at block 4170, an auxiliary index array is sorted so that, in searching the words of the vocabulary modules, the x/y inputs can be processed in ascending order of the likelihood of matching a character mapped to a key close to the x/y input. Sorting the inputs x/y to be processed in this order tends to minimize the total amount of computation required to process the vocabulary modules for the input sequence, since this increases the likelihood across all words that one or more x/y inputs are greater than maximum_key_distance from the corresponding key before all inputs have been processed, so that the remaining inputs need not be processed since the word will be disqualified as a candidate as soon as the number of such inputs exceeds over_max_distance_limit.

Figure 4J:
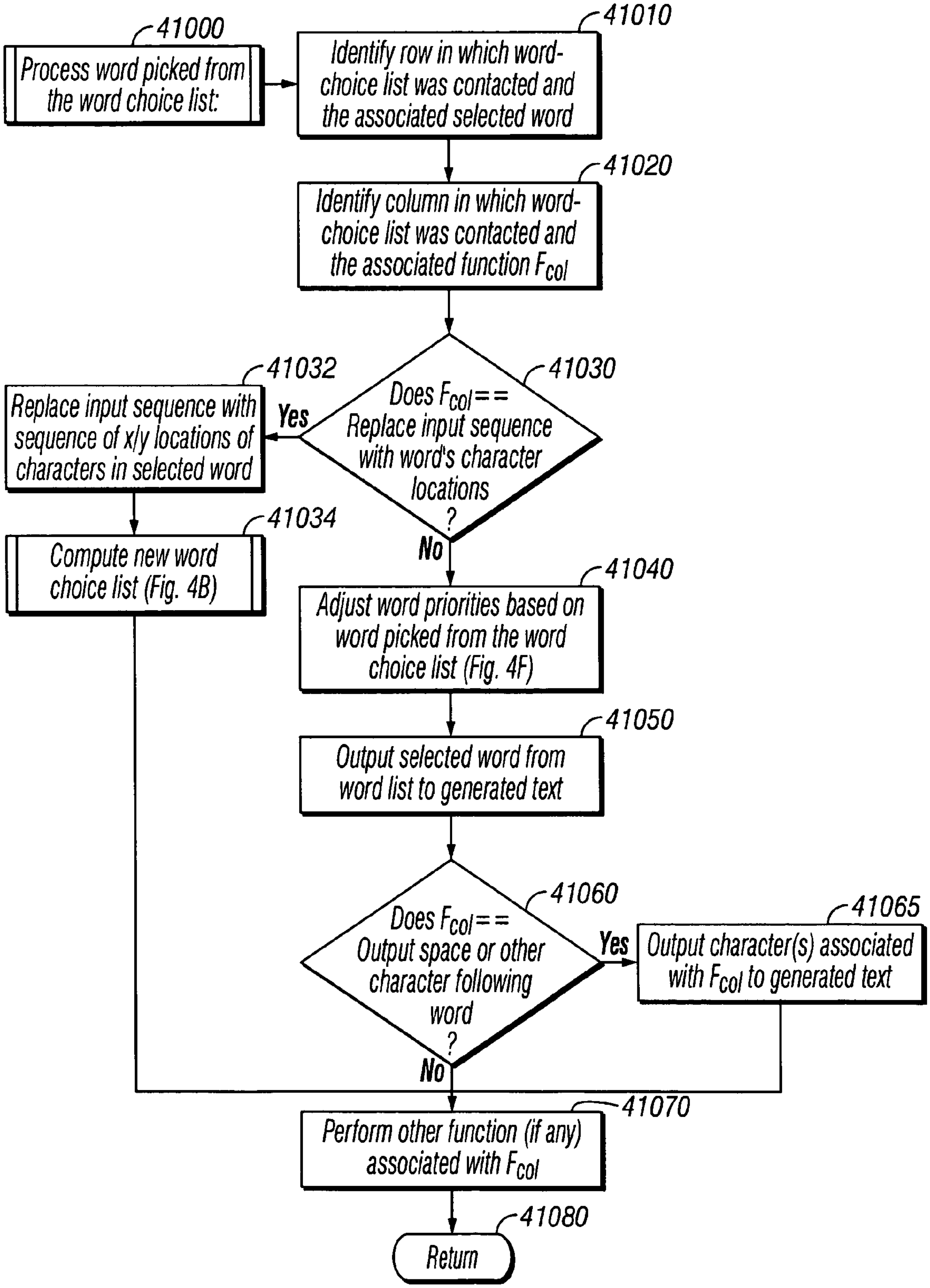
Figure 4K:
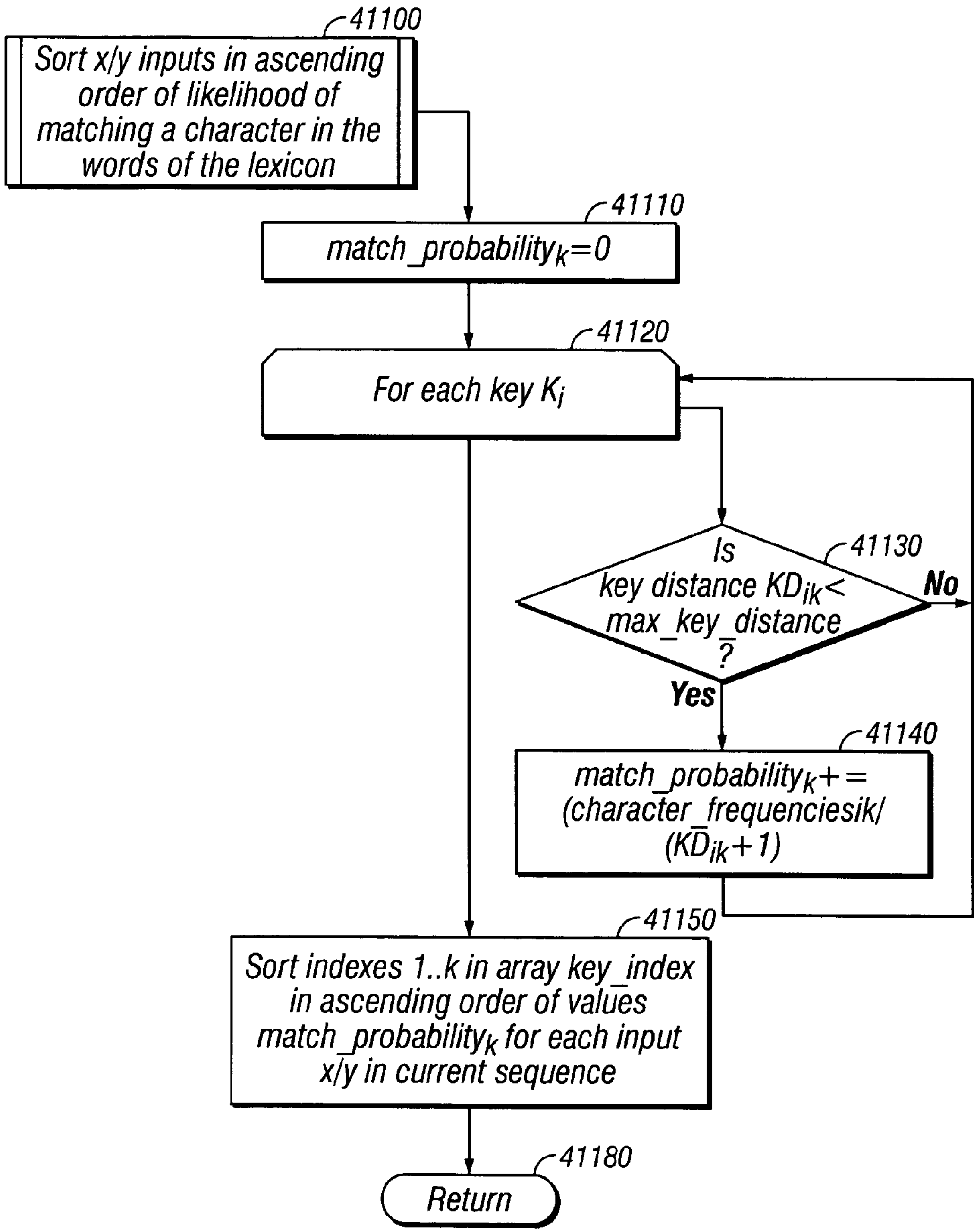

FIG. 4K shows a preferred embodiment of how the likelihood of matching a character mapped to a key close to a given x/y input is calculated. A table character_frequencies is included with the vocabulary modules wherein element $\text{character\_frequencies}_{ij}$ contains the sum of the relative frequencies of all characters found as the $j^{th}$ character of any word in the vocabulary, and which are mapped in character_map to key $K_i$. At block 41110, $\text{match\_probability}_k$ for the current input x/y is initialized to zero. In loop 41120, at decision block 41130, if key $K_i$ is no greater than maximum_key_distance from the input x/y, then at block 41140 then $\text{match\_probability}_k$ is incremented by the value of $\text{character\_frequencies}_{ij}$ divided by the distance $(KD_{ik}+1)$, where the distance $KD_{ik}$ is incremented by 1 to avoid division by zero and to scale each $\text{character\_frequencies}_{ij}$ appropriately. When all keys have been processed in loop 41120, then at block 41150, the index values 1.k in array key_index are sorted in ascending order according to the values of $\text{match\_probability}_k$ that have been calculated for each input.

Returning to FIG. 4A, at block 4180, a new word choice list is computed based on the current input sequence of length k.

FIG. 4B shows a preferred embodiment for computing a new word choice list. At block 4210, any previously computed word choice list is cleared. At block 4220, if current input sequence includes two or more inputs, the software determines which of the three clustering regions can be excluded from consideration based on the coordinate locations of the first two inputs of the sequence. At block 4230, based on the excluded clustering regions, of the nine possible sub-groups of each word list in the vocabulary modules, the sub-groups of words which actually need to be processed are identified. Then, in block 4240, only these identified sub-groups are processed to identify candidate words to show in the word choice list.

FIG. 4C shows how the words in the identified sub-groups are processed to build a word choice list of the words that are most likely to match the user's intention in entering an input sequence of keystrokes consisting of interaction points inside the auto-correcting region. Block 4305 defines the limits of the loop from block 4310 through the test at block 4380 for loop termination. Block 4380 tests whether there are any more words of length k, the current length of the input sequence, that belong to one of the identified sub-groups, that have not yet been processed. If not, then at block 4385 the system tests whether the word list has been filled, and whether the value of the matching metric calculated for each word in the list is less than a predetermined threshold. If so, then the word list is deemed to have been filled with potential matches of an appropriate quality, and at block 4395 the processor returns to block 4260 in FIG. 4B. If not, then at block 4390, the system tests whether there are any more words of any length greater than k, that belong to one of the identified sub-groups, that have not yet been processed. If not, then at block 4395 the processor returns to block 4260.

Once the next word to be processed has been obtained from a vocabulary module at block 4310, at block 4315 word_distance is set to zero so that the weighted distance from the input sequence to this word can be summed into this variable. Then at block 4320, over_max_distance_count is set to zero so that the number of letters in the word that are further from the corresponding interaction point in the input sequence than a preset maximum threshold maximum_key_distance to this word can be counted with this variable.

Then at block 4330, the word is processed as shown in FIG. 4D. Block 4410 initializes the loop counter i to 1 and defines the limits of the loop from block 4420 through the test at block 4490 for loop termination when each of the k inputs in the current sequence have been processed. At block 4420, the variable next_key is set to the next index array value $\text{key\_index}_i$, which was sorted according to FIG. 4J so that inputs are processed starting with those for which the calculated key_distance is most likely to exceed the threshold maximum_key_distance. The loop counter i is then incremented. At block 4430, key_distance is set to the corresponding value already calculated and stored as described above in the array CD, which contains the distance from each interaction point in the input sequence to each possible character that occurs in any word of the vocabulary modules. At decision block 4440, if key_distance exceeds the threshold maximum_key_distance, then at block 4450 over_max_distance_count is incremented and at decision block 4455 over_max_distance_count is tested to determine if the maximum number over_max_distance_limit of such inputs has been exceeded. If so, loop 4410 is terminated early and the incorrect word distance, which is then returned at block 4490, is of no consequence since this word is disqualified from further consideration. If at decision block 4440, key_distance does not exceed the threshold maximum_key_distance, or if at decision block 4455, over_max_distance_count does not exceed the threshold over_max_distance_limit, then at block 4460 key_distance is summed into the total word_distance being calculated for the current word. This process is repeated for each interaction point in the input sequence until at decision block 4470 it is determined that all inputs have been processed. When this process returns from block 4490, either word_distance has been correctly calculated for the current word, or over_max_distance_count exceeds the threshold over_max_distance_limit, and the current word is disqualified from further consideration.

Returning to FIG. 4C at decision block 4335, over_max_distance_count is tested to determine whether the current word is disqualified, and if so, execution proceeds to block 4380 to test whether the word processing loop 4305 should terminate. If not, at decision block 4340, if the length of the current word is greater than the number of inputs, then at block 4345 the calculated word_distance is incremented by a fixed amount wrong_length_additive_factor.

In another preferred embodiment, wrong_length_additive_factor is calculated as a function of the difference between the number of letters in the word and the number of interaction points in the input sequence. In either case, processing returns to block 4350 where word_distance is incremented by a fixed amount all_word_additive_factor, to prevent any word from having a word_distance value of zero, so that the match_metric calculated for the word reflects its relative priority in the vocabulary module's list. At block 4355, a multiplicative factor idx_multiplier is calculated to use as a weighting factor in combination with the calculated word_distance to determine the value of match_metric for the word. In the preferred embodiment shown in FIG. 4C, idx_multiplier is calculated as the bit position of the highest bit set to 1 in a binary representation of the numeric index of the word's ordinal position in the list of which it is a member. This value ranges from 0 to 31, where 0 corresponds to the highest bit position, and 31 the lowest. In block 4360, this value is incremented by 1 so the multiplicative factor used is greater than or equal to 1 so that any non-zero word_distance will result in a non-zero match_metric value.

If at decision block 4370 the match_metric is less than the worst, i.e. highest, match_metric score within the word choice list then the current word is inserted into the word choice list. If the match_metric is greater than or equal to the worst match_metric score within a full word choice list, than the current word is ignored. Decision block 4380 returns to block 4310 if there are any words left that have not been processed that are the same length k as the current input sequence. When decision block 4380 finds no more words to of length k to process, decision block 4385 tests whether the word choice list contains a full complement of matching words, e.g. in one preferred embodiment, a full complement consists of four words, each of which has a match_metric value below a predetermined threshold. If at decision block 4385 it is found that that the word list does not yet contain a full complement of matching words, then at block 4390 the system determines whether there are any words left of length greater than the current input sequence length k, and if so, execution continues from block 4310. Word testing continues until decision block 4385 finds that the word choice list is filled with matching words, or until decision block 4390 finds there are no additional words to test.

Returning to FIG. 4B, the word choice list is processed at block 4260.

FIG. 4E shows a preferred embodiment for processing the word choice list. At block 4510, the words selected for the word choice list are sorted in ascending order by word length, so that words whose lengths are equal to the number of keys for the entry string is presented as the most likely alternatives within the word choice list. At block 4520, each group of words of the same length is sorted in ascending order according the values of match_metric that have been calculated for each word, so that words with lower values of match_metric are presented as the most likely alternatives.

Words may be included in the vocabulary modules that are marked as known misspellings, for example, words in English in which the correct order of the letters "i" and "e" is commonly reversed. In one preferred embodiment, when such misspelled words are identified as candidate words from the vocabulary modules and are included in the word choice list, they are flagged such that they can be replaced in the word list at block 4540 with the corresponding correctly spelled words. Similarly, words may also be included in the vocabulary modules that are flagged as macros or abbreviations that are associated with other strings of text to be output and/or designated functions to be executed upon selection of the associated word. Such macros are also replaced in the word choice with the corresponding associated text strings at block 4540. Block 4560 applies the proper shift states to all characters of words within the word choice list, transforming the relevant characters into their proper form of upper case or lower case, according to the shift state that was in effect at the time the keystroke corresponding to each letter was performed. At block 4580 duplicate words in the word choice list are eliminated by removing the lowest priority duplicates.

In accordance with another aspect of the invention, a software application implementing the input method of the present invention is installed in an existing device. During the installation of this application in the device, or continuously upon the receipt of text messages or other data, existing information files are scanned for words to be added to the lexicon. Methods for scanning such information files are well known in the art. As new words are found during scanning, they are added to the lexicon structure as low frequency words, and as such are placed at the end of the word lists with which the words are associated. Depending on the number of times that a given new word is detected during the scanning, it is assigned a relatively higher and higher priority, by promoting it within its associated list, increasing the likelihood of the word appearing in the word selection list during information entry.

In accordance with another aspect of the invention, the lexicon of words has an appendix of offensive words, paired with similar words of an acceptable nature, such that entering the offensive word, even through Exact Typing of the locations of the letters comprising the offensive word, yields only the associated acceptable word in the Exact Type field, and if appropriate as a suggestion in the Word Selection List. This feature can filter out the appearance of offensive words which might appear unintentionally in the selection list once the user learns that it is possible to type more quickly when less attention is given to interaction with the keyboard at the precise location of the intended letters. Thus, using techniques that are well known in the art, prior to displaying the Exact Type word string, the software routine responsible for displaying the word choice list compares the current Exact Type string with the appendix of offensive words, and if a match is found, replaces the display string with the associated acceptable word. Otherwise, even when an offensive word is treated as a very low frequency word, it still appears as the Exact Type word when each of the letters of the word is directly interacted with. Although this is analogous to accidentally typing an offensive word on a standard keyboard, the system of the present invention is designed to allow and even encourage the user to type with less accuracy. This feature can be enabled or disabled by the user, for example, through a system menu selection.

Those skilled in the art will also recognize that additional vocabulary modules can be enabled within the computer, for example vocabulary modules containing legal terms, medical terms, and other languages. Via a system menu, the user can configure the system so that the additional vocabulary words can be caused to appear first or last in the list of possible words, with special coloration or highlighting, or the system may automatically switch the order of the words based on which vocabulary module supplied the immediately preceding selected word(s). Consequently, within the scope of the appended claims, it will be appreciated that the invention can be practiced otherwise than as specifically described herein.

Returning through FIG. 4B to FIG. 4A, the word selection list is presented to the user and the main routine awaits the next keystroke from the virtual keyboard 202 at block 4110. If, upon receipt of a keystroke, at block 4115 the system determines that the received keystroke interaction point lies outside of the boundaries of the auto-correcting region 106, then the process of block 4120 is carried out as shown in FIG. 4I. Block 4910 identifies the character or function associated with the defined region. If at decision block 4920 the word choice list is empty, then block 4925 generates the character(s) associated with the defined key region, or executes the function associated with the defined key region, and at block 4970 the system returns to FIG. 4A. If one or more words are currently displayed in the word choice list, decision block 4930 determines if the keystroke x/y coordinate falls within the word-choice list region 150. If so, at block 4935 the system processes the word selection from the word-choice list.

In accordance with another aspect of the invention, the user presses a Space key to delimit an entered keystroke sequence. After receiving the Space key, the disambiguating system selects the most frequently used word and adds the word to the information being constructed. The Space key is used to delimit an entered sequence.

In accordance with another aspect of the invention, the word selection list is presented as a vertical list of candidate words, with one word presented in each row, and wherein each row is further subdivided into regions or columns. The regions or columns define functions related to the acceptance of the candidate string displayed in the selected row, such as including or not including a trailing blank space, appending a punctuation mark or applying a diacritic accent. The function may be applied when the user touches the row of the intended string in the word selection list at a point contained in the region or column associated with the desired function, or performs an equivalent interaction action on the virtual keyboard in a region that corresponds to the displayed region or column. When the user selects the desired candidate word by interacting with the row within certain regions or columns, the word is automatically accepted for output and is added to the information being composed. For example, interacting with a row within the region associated with appending a trailing space immediately outputs the associated word with a trailing space.

In accordance with another aspect of the invention, one such region or column is defined such that interacting with a row within the region invokes a function which replaces the current input sequence of actual interaction points with a sequence of interaction points corresponding to the coordinate locations of the letters comprising the word in the selected row, but without terminating the current input sequence. As a result, the selected word appears in the selection list as the Exact Type interpretation of the input sequence. In most cases, the selected word also appears as the most likely word interpretation of the input sequence, although if the letters of the word are each near those of a much more frequent word, the more frequent word still appears as the most likely word interpretation.

In an alternate embodiment, only the words which incorporate the selected word are shown in the word selection list, including words matched after each additional input. This ability to re-define the input sequence as the coordinate locations of the letters of the intended word without terminating the input sequence enables the user to then continue typing, for example, a desired inflection or suffix to append to the word. When the intended word is relatively infrequent, and especially when it is seen only infrequently with the desired inflection or suffix, this feature makes it easier for the user to type the desired infrequently occurring form of the infrequent word without needing to carefully type each letter of the word. Only one additional selection step is required when the uninflected form of the word is selected by interacting with the associated row in the selection list in the region associated with this feature.

In accordance with another aspect of the invention, an alternate input modality such as voice recognition may be used to select a word from the word selection list. If more than one likely word interpretation is found on the list, the selection component may eliminate the other candidates and show only the likely word interpretations matching the alternate input modality, optionally including interpretations whose calculated matching metric values were too low to qualify them for the selection list initially. In accordance with another aspect of the invention, when a designated selection input selects one syllable or word for correction or reentry from a multiple-syllable sequence or multiple-word phrase that has been matched or has been predicted using word completion, either the auto-correcting keyboard or an alternate input modality such as voice or handwriting recognition may be used to correct or reenter the syllable or word.

FIG. 4J shows a preferred embodiment for processing word-choice list selections, registering interactions within regions 154, 157, or 160. Block 41010 identifies which row of the word-choice list was interacted with and the associated word. Block 41020 identifies the word-choice list column that was interacted with and the associated function $F_{col}$ for that column. In the preferred embodiment shown in FIG. 1B, three different columns are defined: one to the left of column marker 170, one to the right of column marker 172, and one between the column markers 170 and 172. Decision block 41030 determines if the function $F_{col}$ consists of replacing the input sequence with a new set of x/y locations of the word selected, which in the preferred embodiment shown in FIG. 1B, corresponds to an x/y location to the right of column marker 172. If so, block 41032 replaces the input sequence with the sequence of x/y locations corresponding to the characters of the selected word and at block 41034 a new word choice list is generated as shown in FIG. 4B. If function $F_{col}$ does not replace the input sequence, processing of the selected word from the word choice list continues. Block 41040 adjusts the selected word's priorities.

In another embodiment, the word-choice list is horizontal with words placed side-by-side in one or more lines, displayed in a convenient area such as along the bottom of the application text area or projected along the top of the virtual keyboard. In another embodiment, an indication near each word or word stem in the list may cue the user that completions based on that word stem may be displayed and selected by means of a designated selection input applied to the list entry. The subsequent pop-up word choice list shows only words incorporating the word stem and may, in turn, indicate further completions. A word may be selected or extended via any of the methods described herein, adjusting appropriately for the horizontal versus vertical orientation.

In accordance with another aspect of the invention, during use of the system by a user, the lexicon is automatically modified by a "Promotion Algorithm" which, each time a word is selected by the user, acts to promote that word within the lexicon by incrementally increasing the relative frequency associated with that word. In one preferred embodiment, the Promotion Algorithm increases the value of the frequency associated with the word selected by a relatively large increment, while decreasing the frequency value of those words passed over by a very small decrement. For a lexicon in which relative frequency information is indicated by the sequential order in which words appear in a list, promotions are made by moving the selected word upward by some fraction of its distance from the head of the list. The Promotion Algorithm is designed to tend to avoid moving the words most commonly used and the words very infrequently used very far from their original locations. In one preferred embodiment, this is achieved by altering the fraction of the remaining distance by which a selected word is promoted depending on its current relative position in the overall list. For example, words in the middle range of the list are promoted by the largest fraction with each selection. Words intermediate between where the selected word started and finished in the lexicon promotion are effectively demoted by a value of one. Conservation of the "word list mass" is maintained, so that the information regarding the relative frequency of the words in the list is maintained and updated without increasing the storage required for the list.

In accordance with another aspect of the invention, the Promotion Algorithm operates both to increase the frequency of selected words, and where appropriate, to decrease the frequency of words that are not selected. For example, in a lexicon in which relative frequency information is indicated by the sequential order in which words appear in a list, a selected word which appears at position IDX in the list is moved to position (IDX/2). Correspondingly, words in the list at positions (IDX/2) down through (IDX+1) are moved down one position in the list. Words are demoted in the list when a sequence of interaction points is processed and a word selection list is generated based on the calculated matching metric values, and one or more words appear in the list prior to the word selected by the user. Words that appear higher in the selection list but are not selected may be presumed to be assigned an inappropriately high frequency, i.e. they appear too high in the list. Such a word that initially appears at position IDX is demoted by, for example, moving it to position (IDX*2+1). Thus, the more frequent a word is considered to be, the less it is demoted in the sense that it is moved by a smaller number of steps.

In accordance with another aspect of the invention, the promotion and demotion processes may be triggered only in response to an action by the user, or may be performed differently depending on the user's input. For example, words that appear higher in a selection list than the word intended by the user are demoted only when the user selects the intended word by clicking and dragging the intended word to the foremost location within the word selection list, using a stylus or mouse or equivalent interaction actions on the virtual keyboard. Alternatively, the selected word that is manually dragged to a higher position in the selection list may be promoted by a larger than normal factor. For example, the promoted word is moved from position IDX to position (IDX/3). Many such variations will be evident to one of ordinary skill in the art.

FIG. 4F shows a preferred embodiment for adjusting the prioritization of words when a word is picked from the word choice list. Decision block 4610 determines if the selected word choice item is the exact-type word, that string of characters whose x/y locations happens to correspond exactly to the sequence of interaction points, which in a preferred embodiment is displayed in a distinct location in the word choice list, such as in FIG. 1B where the exact-type word 154 ("rwzt" in the example shown) is separated by a solid line from other words in the list. If the chosen word is not the exact-type word, such as items 157 or 160, at block 4620 the chosen word is promoted, as in the preferred embodiment shown in FIG. 4G, and at block 4630 each of the words that appeared in the word choice list ahead of the chosen word are explicitly demoted, as in the preferred embodiment shown in FIG. 4H, in contrast to the incidental demotion that may occurs to one or more words simply as a consequence of the promotion of another word.

If at block 4610, the chosen word is determined to be the exact-type word, decision block 4640 identifies if that word is a new word that is not yet included in the vocabulary modules. If not, then at block 4650 promotes the chosen word is promoted. If the chosen exact-type word is not yet included in the vocabulary modules, block 4660 identifies the appropriate word-list to which the word is to be added. Decision block 4665 identifies if space is available within the appropriate word-list, And if not, at block 4670 the last, least likely word in the appropriate word-list is deleted to make room for the word to be added. At block 4675 the new word is added as the least likely word in the appropriate word-list, then at block 4680 the newly added word is promoted without explicitly demoting the other words that appeared in the word choice list.

FIG. 4G shows a preferred embodiment of the word promotion performed in blocks 4620, 4650 and 4680. Block 4710 identifies the chosen word's position within its word-list, and assigns idx that position value. Block 4720 defines new_idx as one half of the value of idx, specifying a position in the list halfway from the current position to the head of the list, i.e. the position of the word deemed to be most likely to be selected. Block 4730 demotes all words in positions between idx and new_idx by one position, filling the word's old position at idx and making room for the word at new_idx. Block 4740 then promotes the chosen word by inserting it back into the list at position new_idx. Note that this preferred method of promotion essentially has the effect of decrementing by 1 the idx_multiplier calculated for the word at block 4355.

FIG. 4H shows a preferred embodiment of explicit word demotion performed in block 4635. Block 4810 identifies the explicitly demoted word's position within its word-list, and assigns idx that position value. Block 4820 defines new_idx as double the value of idx plus one. Decision block 4830 compares the value of new_idx to the total number of words in the word-list. If new_idx is greater than the total number of words in the word-list, Block 4835 sets new_idx equal to the value of the number of words in the word-list, since a word can be demoted no further than the end of the list. Block 4840 promotes all words in positions between idx and new_idx by one position, filling the word's old position at idx and making room for the word at new_idx. Block 4850 then demotes the chosen word by inserting it back into the list at position new_idx. Note that this preferred method of demotion essentially has the effect of incrementing by 1 the idx_multiplier calculated for the word at block 4355.

FIGS. 5A through 5E are schematic views showing a sequence of character inputs as an illustrative example of entering a word on the preferred embodiment of a portable computer 102 incorporating a reduced auto-correcting keyboard system 100 formed in accordance with the invention as shown in FIGS. 1A, 1B, 2, 6 and 7. Portable computer 102 contains a reduced keyboard 105 implemented on a touch screen display 103, or virtual keyboard (see FIGS. 6 and 7), which is used to generate text to be output to text display region 104.

Figure 5A:
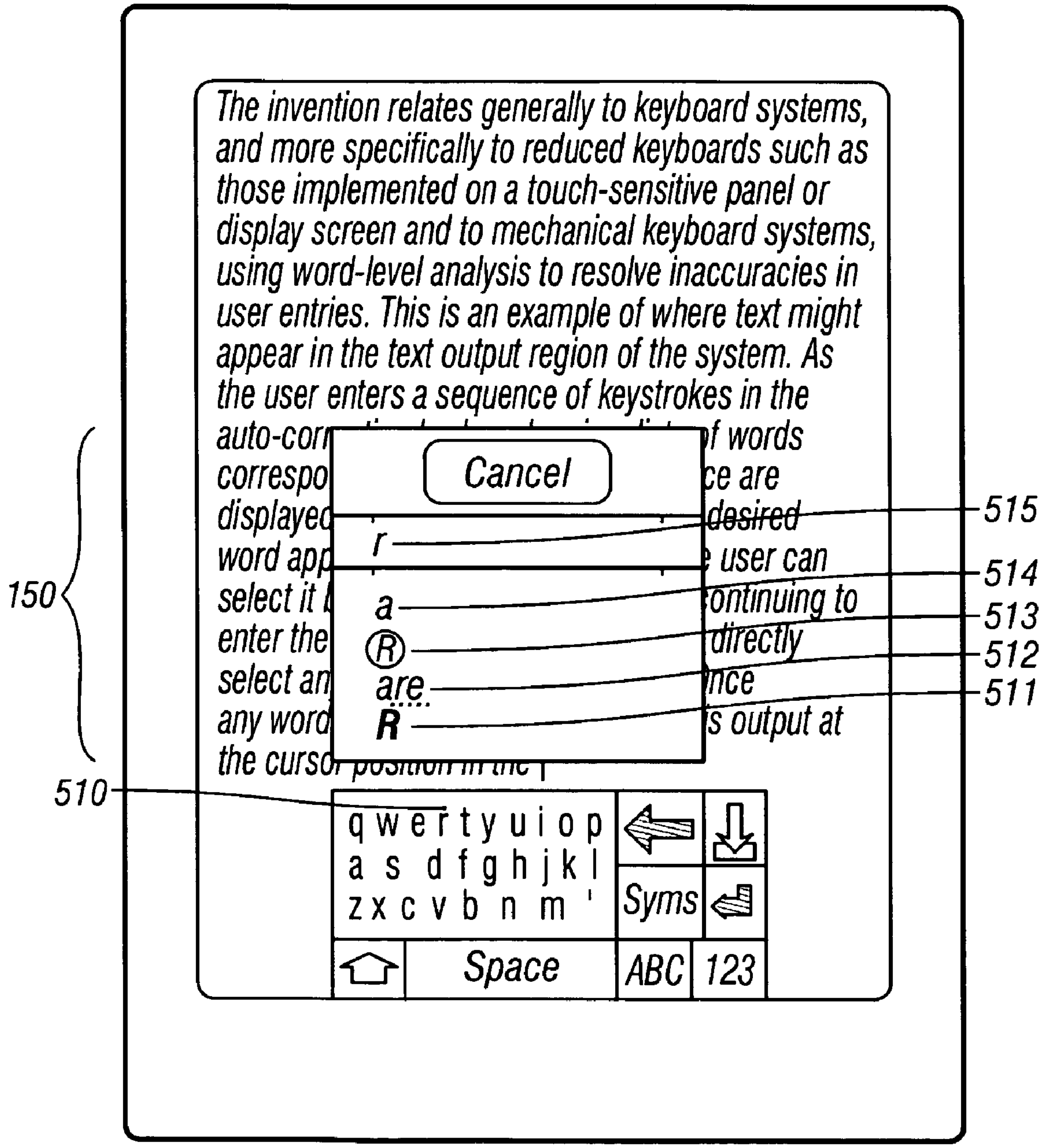
FIGS. 5A through 5D are schematic views showing a sequence of character inputs as an illustrative example of entering a word on a preferred embodiment of a portable computer incorporating a reduced keyboard system of the invention.

FIG. 5A shows the location 510 of the first keystroke of a sequence of keystrokes corresponding to the entry of the word "text." In response to the keystroke 501, the auto-correcting keyboard system displays the word choice list region 150 super-imposed on top of the text region 104, showing a list of words and other interpretations corresponding to the keystroke. In this example, the coordinate location 510 of the keystroke is physically nearest coordinate location associated with the letter "r." The word choice list includes "R" 511 as the default choice, shown in the word choice list in the position nearest the auto-correcting region 106. Because the letter "r", when it occurs as a "word" that is only one letter in length, is found more frequently in upper case, such as when "R" appears as an initial included as part of a person's name, "R" is offered in the word choice list in upper case. This is in accordance with the aspect of the invention wherein information regarding the capitalization of each word is stored along with the word in the vocabulary modules so that the word can be presented in a preferred form of capitalization without requiring the user to activate keys, such as a Shift key, to specify the capitalization of the word entered. The word choice list shows "are" 512 as the next most likely choice, in accordance with the aspect of the invention wherein a word or symbol may be associated with an arbitrary sequence of one or more letters, such that when the associated sequence of letters is entered by the user, the word or symbol is offered as a choice in the word choice list. In this example, the word "are" is associated as a "macro" expansion of the single letter "r" which is pronounced the same in English. Similarly, the word choice list shows "®" 513 as the third most likely choice, where this symbol has been included in the vocabulary modules based on the logical association with the letter "r." The word choice list shows "a" 514 as the fourth most likely choice, where "a" is a very commonly occurring word of one letter, so that it appears as a candidate in the word choice list even though the coordinate location associated with the letter "a" is relatively distant from interaction location 501. Above these choices is the exact type region displaying "r" 515 as an option for selection, since the coordinate location associated with the letter "r" is closer than that of any other letter to coordinate location 510 of the keystroke.

Figure 5B:
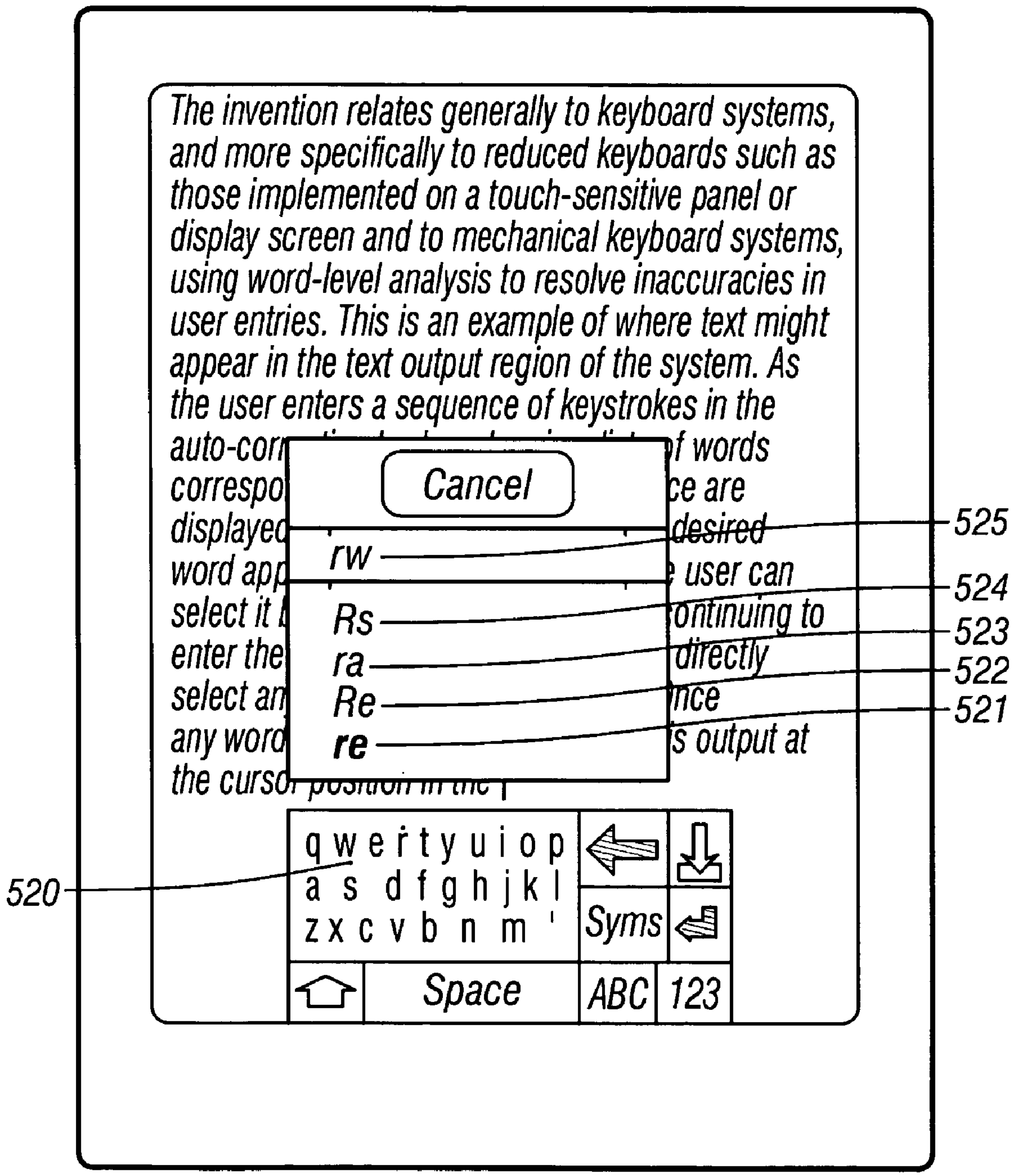

FIG. 5B shows the location 520 of the next keystroke, nearest to the coordinate location associated with the letter "w." The word choice list includes "re" 521 as the default choice, "Re" 522 as the next most likely choice, "ra" 523 as the third most likely choice and "Rs" 524 as the fourth most likely choice. Above these choices is the exact type region displaying "rw" 55 as an option for selection.

Figure 5C:
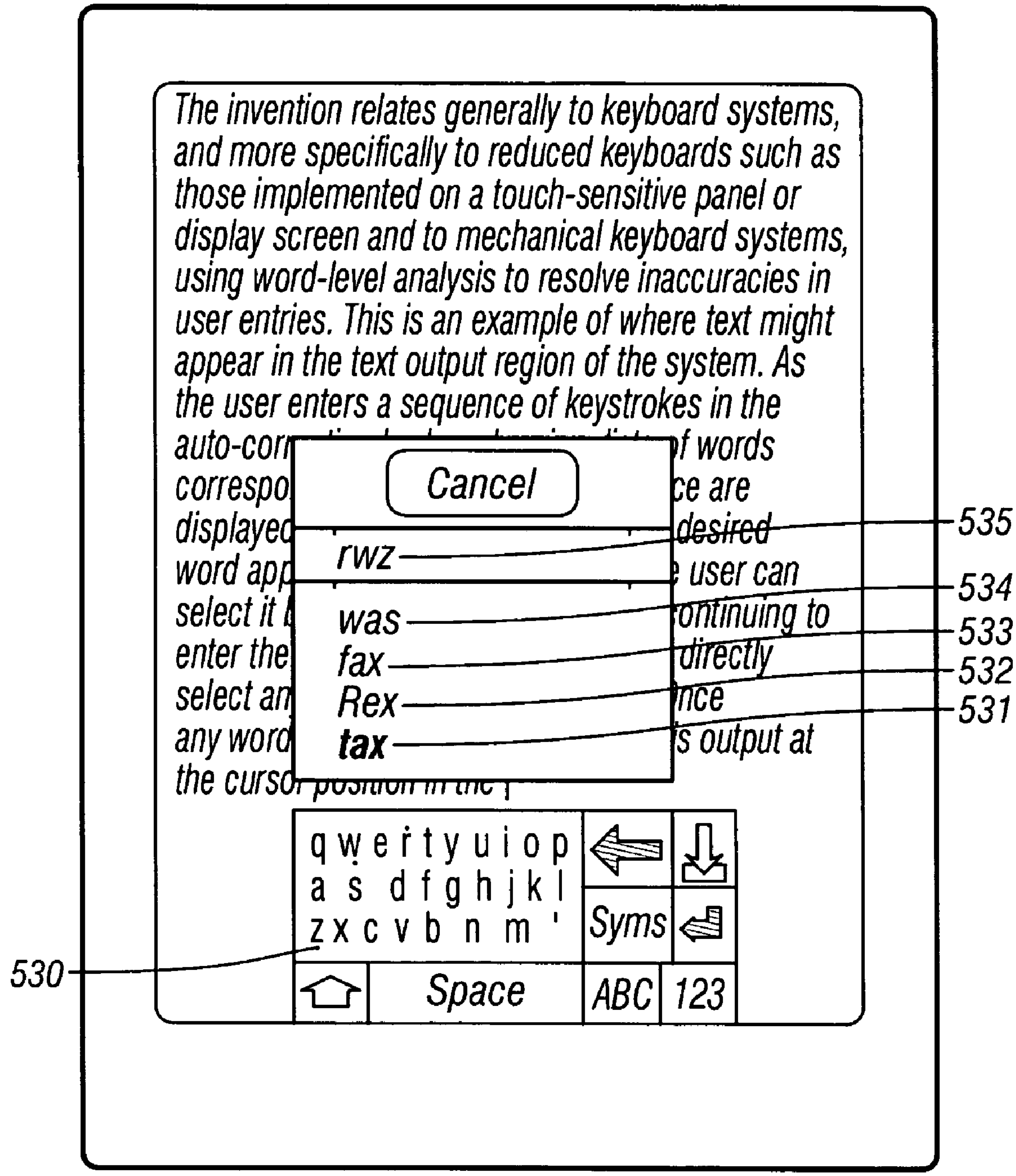

FIG. 5C shows the location 530 of the next keystroke, nearest to the coordinate location associated with the letter "z." The word choice list includes "tax" 531 as the default choice, "Rex" 532 as the next most likely choice, "fax" 533 as the third most likely choice and "was" 534 as the fourth most likely choice. Above these choices is the exact type region displaying "rwz" 535 as an option for selection.

Consider, now, the location of the next keystroke, very near the coordinate location associated with the letter "t." The word choice list would includes "text" as the default choice, "year" as the next most likely choice, "rest" as the third most likely choice and "fact" 544 as the fourth most likely choice. Above these choices, the exact type region would display "rwzt" as an option for selection. The word "text" is to be entered as the next word.

Figure 5D:
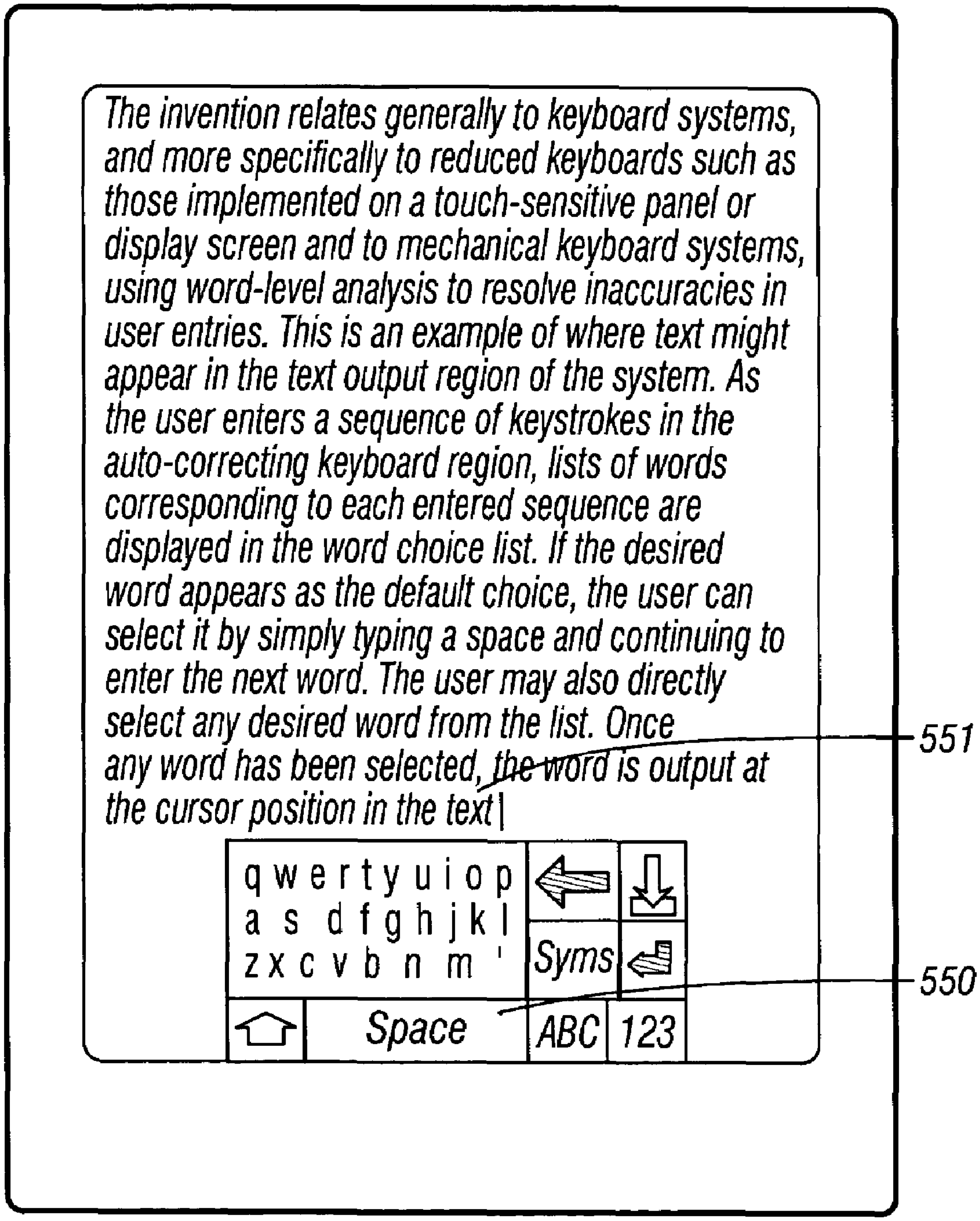

FIG. 5D shows the next keystroke at 550, in the region designated as the "space" key. The space key is outside of the auto-correcting region 106, and thus can be unambiguously associated with a specific function. The space key acts to accept the default word "text" 541 and enters the word "text" 542 in the text output region 104 at the insertion point 107 in the text being generated where the cursor was last positioned. Simultaneously, the current input sequence is cleared, and the word choice list display is removed from the display screen 103 of the portable computer 102 so that the text output region 104 is unobscured.

Figure 5E:
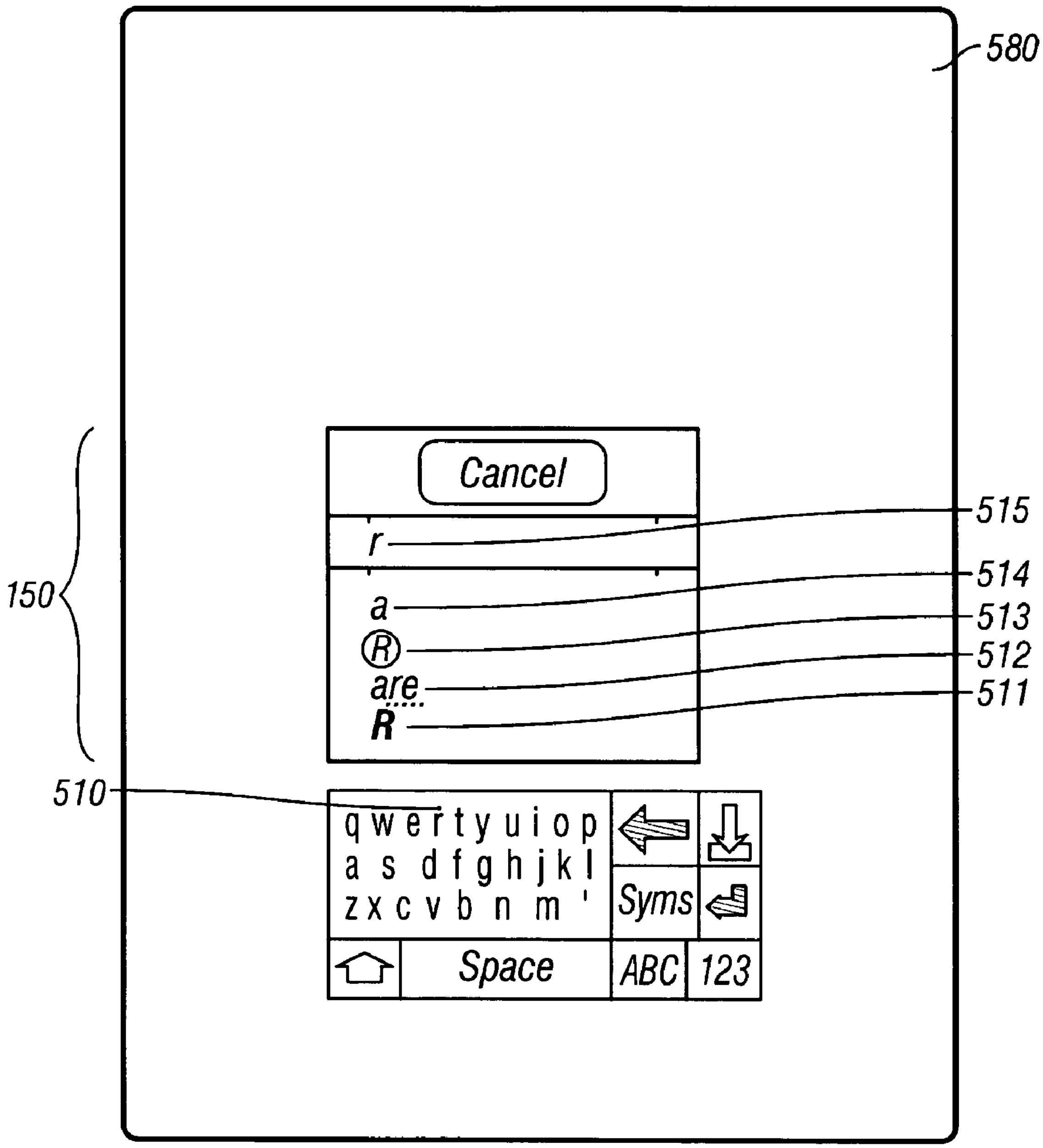
FIG. 5E is the same schematic viewing as that of FIG. 5A showing a non-screen embodiment of the invention.

FIG. 5E is the same schematic view as that of FIG. 5A showing a non-screen embodiment of the invention, where the keyboard is projected onto a surface 580.

Various input devices have been introduced that provide new opportunities for user interaction with computers, PDAs, video games, cell phones, and the like. As discussed above, such devices suffer from accuracy and registration problems, thereby rendering them generally unsuitable for the data entry input function for which they are intended. The invention herein, as discussed above, provides a solution to the problem of obtaining useful data input with such devices.

Figure 6:
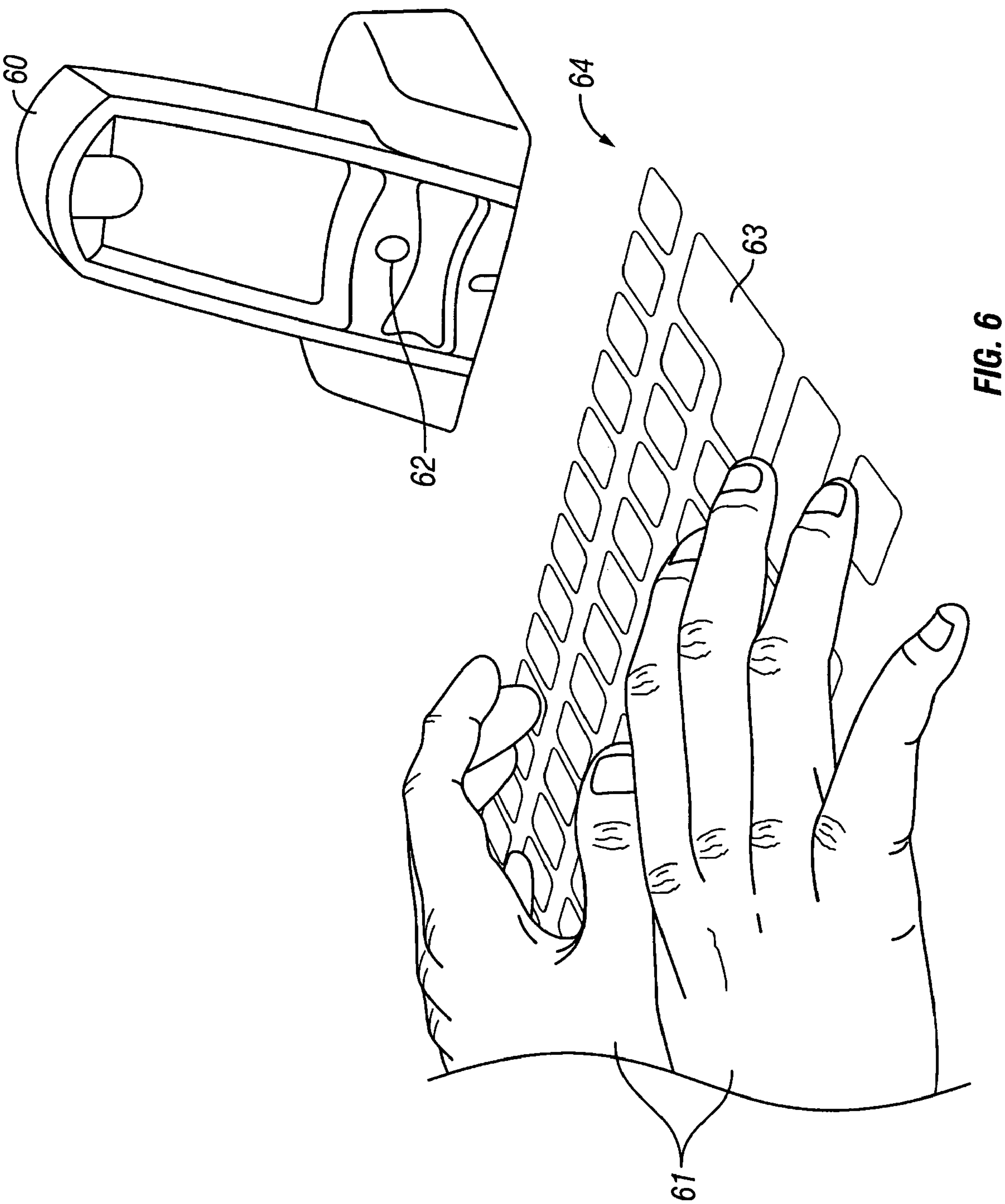
FIG. 6 is a schematic view showing a laser-projection keyboard for use in connection with the invention herein disclosed.

FIG. 6 is a schematic view showing a laser-projection keyboard for use in connection with the invention herein disclosed. For example, the laser-projection keyboard offered by companies such as VKB (see http://www.vkb.co.il/) and Canesta (see http://www.canesta.com/) is a projection keyboard that is capable of being fully integrated into smart phones, cell phones, PDAs, or other mobile or wireless devices. The laser-projection keyboard uses a tiny laser pattern projector 62 to project the image of a full-sized keyboard 63 onto a convenient flat surface 64, such as a tabletop or the side of a briefcase, between the device 60 and the user 61. The user can then type on this image and the associated electronic perception technology instantly resolves the user's finger movements into ordinary serial keystroke data that are easily used by the wireless or mobile device. The advantages offered by the laser-projection keyboard are best appreciated when considering current input solutions, such as thumb keyboards or handwriting recognition which, though popular, are limited in their ability to support typing-intensive applications, such as document and memo creation, as well as email composition. A laser-projection keyboard allows a mobile or wireless device to support applications that previously would have only been practical with a full-sized, mechanical keyboard.

Yet another embodiment is an in-flight system comprising a virtual keyboard on the tray table and a seatback or armrest display. The keyboard may either be projected by laser, facilitating easy user selection based on native language or region, using electronic perception technology described above; or printed on the tray table or a placemat, using conventional optical recognition technology to track finger motion and key positions. Since the tray table slides and tilts relative to the seatback, one or more registration marks on the tray table may be employed to allow the system to position or track the keyboard.

Figure 7:
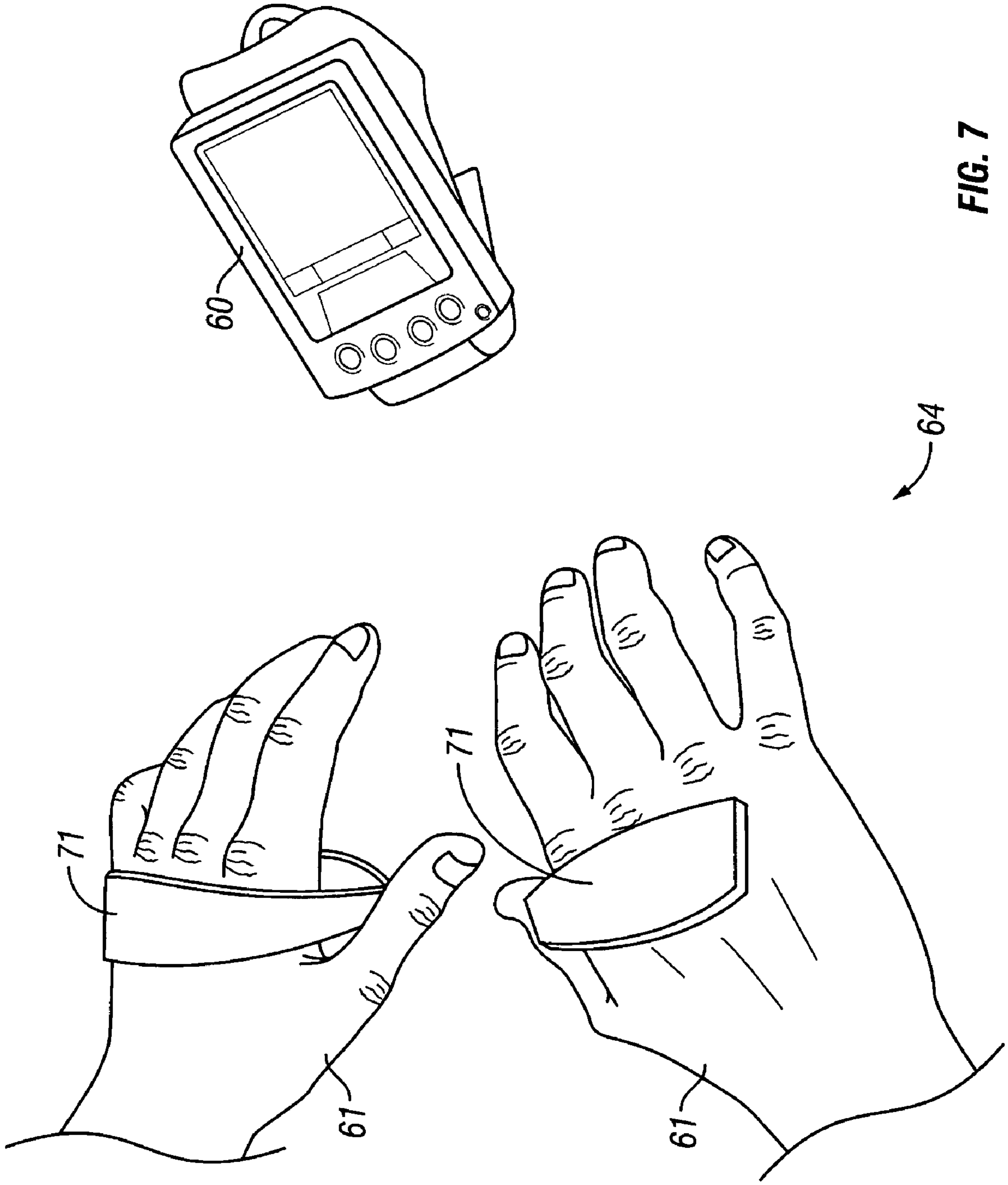
FIG. 7 is a schematic view showing a muscle-sensing keyboard for use in connection with the invention herein disclosed.

FIG. 7 is a schematic view showing a muscle-sensing keyboard for use in connection with the invention herein disclosed. Muscle-sensing keyboards, such as the Senseboard® virtual keyboard (see, for example, http://www.senseboard.com/), typically consist of a pair of hand modules 71 with a pad that is placed in the palm of the user's hand. A muscle-sensing keyboard enables a user to type without the physical limitations of a standard keyboard. This type of virtual keyboard typically uses sensor technology and artificial intelligence, such as pattern recognition, to recognize the characters that a user is typing. The keyboard detects the movements of the fingers and relates them to how a touch typist would use, for example, a standard QWERTY keyboard. The information thus generated is then transferred to, for example, a mobile device, such as a personal digital assistant (PDA) or a smart phone using, for example, a cable or a Bluetooth wireless connection.

Yet another virtual keyboard is the fabric keyboard (see, for example, http://www.electrotextiles.com/). Such keyboards provide three axes (X, Y and Z) of detection within a textile fabric structure approximately 1 mm thick. The technology is a combination of a fabric sensor and electronic and software systems. The resulting fabric interface delivers data according to the requirements of the application to which it is put. The three modes of sensor operation include position sensing (X-Y positioning), pressure measurement (Z sensing), and switch arrays. Thus, a keyboard can be constructed that detects the position of a point of pressure, such as a finger press, using the interface's X-Y positioning capabilities. The system works even if the fabric is folded, draped, or stretched. A single fabric switch can be used to provide switch matrix functionality. Interpreting software is used to identify the location of switch areas in any configuration, for example to implement keyboard functionality.

Figure 8:
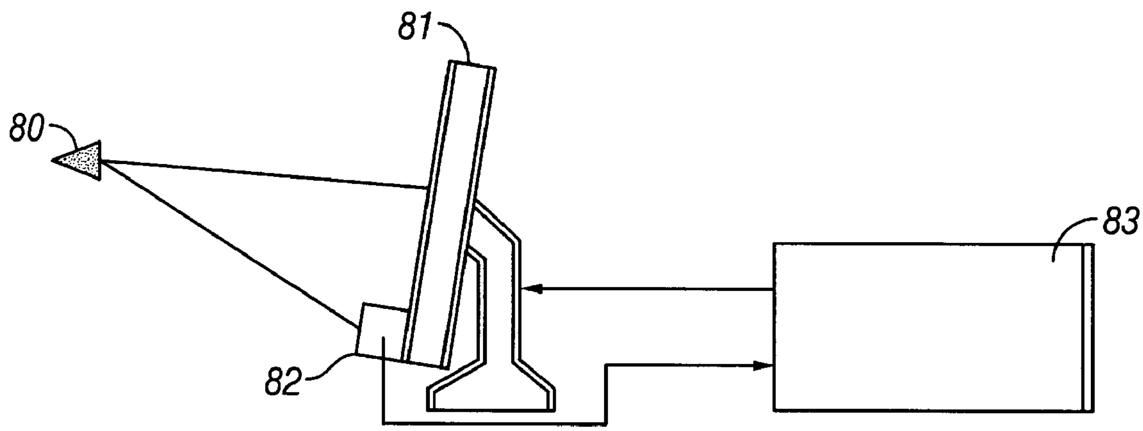
FIG. 8 is a schematic view showing an eye-tracking keyboard for use in connection with the invention herein disclosed.

FIG. 8 is a schematic view showing an eye-tracking keyboard for use in connection with the invention herein disclosed. In such systems, a user's eye movements 80 are tracked by a tracking device 82 and choices, as determined by a system 83 operating in accordance with the herein disclosed invention, are displayed on a monitor 81.

While the preferred embodiment of the invention has been illustrated and described, it will be appreciated that various changes can be made therein without departing from the spirit and scope of the invention. For example, those skilled in the art will appreciate that the keyboard 105 and its auto-correcting region 106 may be configured in various ways, and may have a varying number of explicit function keys 108–122. The auto-correction technique disclosed herein is equally applicable to keyboards of different sizes, and to traditional mechanical keyboards of various sizes as well as touch-panel and touch-screen based keyboards as well as various other types of virtual keyboards. The specific format of the word choice list 150, such as the number of word choices presented, the arrangement of the word choices, and the functions associated with different areas of the word choice list may be changed. For example, those skilled in the art will appreciate that the function that consists of replacing the input sequence with a new set of x/y locations of the word selected could be omitted in certain applications. Furthermore, the specific algorithms used in promoting and demoting words within the vocabulary modules could also be altered. For example, a selected word could be promoted by moving it ½ of the distance to the head of its list rather than the factor of 6 used in the preferred embodiment described above.

Further, the virtual keyboard may also comprise an output device, such as a television, heads-up display, or retinal projection system, and thereby provide a display/keyboard presentation, such as shown in FIG. 1*a*–1*b*. Further, the invention may comprise a virtual keyboard incorporated into a smart surface such as that comprised of an image projected therein and a camera, ultrasound or other device detecting user interaction therein. Further, the user interaction may comprise any gesture or other movement expressive of the user's intent, such as hand or finger movements, movements of other body parts, eye movements, brainwave detection, and the like. In that way, the virtual keyboard comprises any device suited for the special needs of people with disabilities. Further, the invention may be applied to the composition of phrases or parts of phrases in addition to, or instead of, characters and such objects. Accordingly, the invention should only be limited by the claims included below.

The invention claimed is:

1. A text entry system comprising:

a user input device comprising a virtual keyboard including an auto-correcting region comprising a plurality of the characters of an alphabet, wherein one or more of the plurality of characters corresponds to a location with known coordinates in the auto-correcting region, wherein a location associated with the user interaction is determined when a user interacts with the user input device within the auto-correcting region, and the determined interaction location is added to a current input sequence of interaction locations;

a memory containing a plurality of objects, wherein one or more objects comprise a string of one or a plurality of characters forming a word or a part of a word;

an output device; and a processor coupled to the user input device, memory, and output device, said processor comprising:

a distance value calculation component which, for a determined interaction location in the input sequence of interactions, calculates a set of distance values between the interaction locations and the known coordinate locations corresponding to one or a plurality of characters within the auto-correcting region;

a word evaluation component which, for a generated input sequence, identifies one or a plurality of candidate objects in memory, using information regarding both preceding and succeeding user interactions in determining an intended character for each user interaction and for one or more identified candidate objects, evaluates identified candidate objects by calculating a matching metric based on the calculated distance and ranks the evaluated candidate objects based on the calculated matching metric values; and a selection component for identifying one or a plurality of candidate objects according to their evaluated ranking, presenting the identified objects to the user, and enabling the user to select one of the presented objects for output to the output device.

2. The system of claim 1, wherein:

one or more of the plurality of objects in memory is further associated with one or a plurality of predefined groupings of objects; and the word evaluation component, for a generated input sequence, limits the number of objects for which a matching metric is calculated by identifying one or a plurality of candidate groupings of the objects in memory, and for one or a plurality of objects associated with one or more of identified candidate groupings of objects, calculates a matching metric based on the calculated distance values and ranks the evaluated candidate objects based on the calculated matching metric values.

3. The system of claim 1, wherein the characters of the alphabet are arranged on the auto-correcting region in approximately a standard QWERTY layout.

4. The system of claim 1, wherein said auto-correcting region comprises one or a plurality of known locations associated with one or a plurality of punctuation characters and/or diacritic marks, wherein said memory includes one or a plurality of objects in memory which include one or a plurality of the punctuation characters and/or diacritic marks associated with locations in said auto-correcting region.

5. The system of claim 1, wherein objects in memory are further associated with one or a plurality of modules, wherein each module comprises or generates a set of objects with one or a plurality of common characteristics.

6. The system of claim 1, wherein the word evaluation component calculates the matching metric for each candidate object by summing the distance values calculated from each interaction location in the input sequence to the location assigned to the character in the corresponding position of the candidate object.

7. The system of claim 1, further comprising the step of: applying a weighting function according to a frequency of use associated with the object.

8. The system of claim 6, wherein one or more locations on the auto-correcting region is defined by a horizontal and a vertical coordinate, and wherein the distance value between an interaction location and the known coordinate location corresponding to a character comprises a horizontal and a vertical component, wherein at least one of said horizontal and vertical components is adjusted by a weighting factor in calculating the distance of the interaction location from the character.

9. The system of claim 7, wherein the frequency of use associated with a candidate object in memory comprises an ordinal ranking of the object with respect to other objects in memory.

10. The system of claim 6, wherein the word evaluation component adds an increment value to a sum of the distance values prior to applying a weighting function according to the frequency of use associated with the candidate object.

11. The system of claim 2, wherein objects in memory are stored such that objects are classified into groupings comprising objects of the same length.

12. The system of claim 11, wherein the word evaluation component limits a number of objects for which a matching metric is calculated by identifying candidate groupings of objects of the same length as the number of inputs in the input sequence.

13. The system of claim 6, wherein for a calculated distance value between an interaction location in the input sequence and a known coordinate location corresponding to a character within the auto-correcting region, in which said calculated distance exceeds a threshold distance value, for one or more objects in memory in which said character occurs at a position in the sequence of the characters of said object that corresponds to the position of said interaction location in said input sequence, said object is ranked by the word evaluation component as an object that is excluded from presentation to the user for selection.

14. The system of claim 2, wherein one or a plurality of the identified candidate groupings of the objects in memory comprise objects that are excluded from presentation to the user for selection, wherein at least one of the calculated distance values included in a calculated sum of distance values for each object in said one or identified candidate groupings of objects exceeds a threshold distance value.

15. The system of claim 1, wherein for a character corresponding to a known location in the auto-correcting region, a region is predefined around one or a plurality of said known locations, wherein the distance between an input interaction location falling within said predefined region and the known character location within said predefined region is calculated as a distance of zero.

16. The system of claim 1, wherein at least one of the locations with known coordinates in the auto-correcting region corresponds to a plurality of characters, one or a plurality of which comprise various diacritic marks, wherein the plurality of characters comprise variant forms of a single base character, and wherein objects in memory are Stored with their correct accented characters.

17. The system of claim 1, wherein the selection component presents an identified one or a plurality of candidate objects for selection by a user in a candidate object list.

18. The system of claim 17, wherein the selection component identifies a highest ranked candidate object and presents the identified object in the first position of the candidate object list.

19. The system of claim 1, wherein a user selection of a character that is associated with an interaction outside of the auto-correcting region accepts and outputs a determined object prior to outputting said character.

20. The system of claim 1, wherein user selection of an object for output terminates a current input sequence such that a next interaction within the auto-correcting region starts a new input sequence.

21. The system of claim 1, wherein selection of a candidate may be through an alternate input modality.

22. The system of claim 1, wherein user inputs for the current input sequence may be through a combination of different modalities.

23. The system of claim 1, wherein correction of user entry errors employs an alternate input modality.

24. The system of claim 1, wherein the selection component detects a distinctive manner of selection that is used to select a candidate object, and wherein upon detecting that an object has been selected through said distinctive manner, the system replaces a current input sequence of actual interaction locations with an input sequence of interaction locations corresponding to the coordinate locations of the characters comprising the selected object, and wherein a next interaction in the auto-correcting region is appended to the current input sequence.

25. The system of claim 24, wherein said distinctive manner of selection eliminates all candidates except those candidates that incorporate said selected object.

26. The system of claim 1, wherein ,a distinctive manner of selection effects selection and/or editing of a word in a predicted/accepted phrase or sentence.

27. The system of claim 1, wherein the word evaluation component determines, for a determined interaction location in an input sequence of interaction locations, a closest known location corresponding to a character, and constructs an exact typing object composed of said determined corresponding characters in an order corresponding to the input sequence of interaction locations.

28. The system of claim 27, further comprising:

means for providing visual feedback of the exact typing object's letter tracking.

29. The system of claim 28, further comprising:

means for providing proportional scaling to improve accuracy.

30. The system of claim 1, wherein the selection component identifies a highest ranked candidate object and presents the identified object on the output device.

31. The system of claim 30, wherein the text entry system comprises a region that is associated with an object selection function, wherein interaction with said region replaces the object presented on the output device with a next highest ranked object of the identified one or a plurality of candidate objects.

32. The system of claim 1, wherein the text entry system comprises a delete key region associated with a delete function, wherein when a current input sequence includes at least one interaction and said delete key region is interacted with, a last input interaction from the current input sequence of interactions is deleted.

33. The system of claim 1, wherein the text entry system includes a region associated with an Edit Word function, wherein: when no current input sequence exists and said region is interacted with, and when the text insertion point on the output device is contained within a previously output word, the system establishes a new current input sequence comprising a sequence of interaction locations corresponding to coordinate locations associated with the characters of said word; and when a text insertion point in the text display area on the output device is located between two previously output words, the system establishes a new current input sequence comprising a sequence of interaction locations corresponding to coordinate locations associated with the characters of the word adjacent to the text insertion point;

wherein the text entry system processes said new current input sequence and determines a corresponding ranking of new candidate objects; and wherein selection of one of the new candidate objects replaces the previously output word used to establish said new current input sequence.

34. The system of claim 33, wherein when the text insertion point is within or adjacent to a word, and/or the word is selected/highlighted, and the user initiates a new input sequence, the system can establish a current input sequence using the adjacent/selected word with the user-entered interaction locations appended to the sequence.

35. The system of claim 1, wherein for each input interaction location, the distance value calculation component computes a running average of the horizontal and vertical components of an offset of the coordinate location corresponding to one or more characters of a selected word with respect to the coordinates of a corresponding input interaction location; and wherein in performing distance calculations for the word evaluation component, the distance value calculation component adjusts the horizontal and vertical coordinates of each input interaction location by amounts that are functions of the computed average signed horizontal and vertical offsets.

36. The system of claim 1, said processor further comprising:

a stroke recognition component that determines for one or more user interaction actions within the auto-correcting region whether a point of interaction is moved less than a threshold distance from an initial interaction location prior to being lifted from the virtual keyboard;

wherein when the start and end points of interaction are less than a threshold distance, the stroke recognition component determines the nature of the user interaction to be a single point, and the location determined to be associated with the user interaction is added to the current input sequence of interaction locations to be processed by the distance value calculation component, the word evaluation component, and the selection component; and wherein when the start and end points of interaction are greater than a threshold distance, the stroke recognition component determines that the user interaction is one of a plurality of stroke interactions that are associated with known system functions or recognizable characters, and classifies the stroke interaction as one of the plurality of predefined types of stroke interactions.

37. The system of claim 1, wherein when a threshold number of interaction locations in the input sequence are further than a threshold maximum distance from the corresponding character in the sequence of characters comprising a given candidate object, said object is identified as no longer being a candidate object for the selection component.

38. The system of claim 1, wherein the processor further comprises:

a frequency promotion component for adjusting a frequency of use value associated with each object in memory as a function of the number of times the object is selected by the user for output on the output device.

39. The system of claim 38, wherein the frequency promotion component analyzes additional information files that are accessible to the text entry system to identify new objects contained in said files that are not included among the objects already in said memory of said text entry system; and wherein said newly identified objects are added to the objects in memory as objects that are associated with a low frequency of use.

40. The system of claim 1, wherein information regarding capitalization of one or a plurality of objects is stored along with the objects in memory; and wherein the selection component presents each identified object in a preferred form of capitalization according to the stored capitalization information.

41. The system of claim 1, wherein one or a plurality of objects in memory are associated with a secondary object in memory comprising a sequence of one or a plurality of letters or symbols, and wherein when the selection component identifies one of said objects for presentation to the user based on the matching metric calculated by the word evaluation component, the selection component presents the associated secondary object for selection.

42. The system of claim 1, wherein said virtual keyboard comprises:

any of a laser-projection keyboard, a muscle sensing keyboard, a fabric keyboard, a gesture detection device, a device for tracking eye movement and a device for detecting brain waves.

43. The system of claim 1, further comprising:

a linguistic model comprising any of:

frequency of occurrence of a linguistic object in formal or conversational written text;

frequency of occurrence of a linguistic object when following a preceding linguistic object or linguistic objects;

proper or common grammar of the surrounding sentence;

application context of current linguistic object entry; and frequency of use or repeated use of the linguistic object by the user or within an application program.

44. The system of claim 1, wherein user interaction comprises:

a scrolling gesture across or adjacent to the auto-correcting keyboard region that causes a list to scroll and changes a candidate word that is selected for output.

45. The system of claim 1, wherein user interaction comprises any of:

a gesture and other movement expressive of user intent, comprising any of a finger tap, any distinguishable eye movement, muscle activity, and a brain wave pattern.

46. A text entry system comprising:

a user input device comprising a virtual keyboard comprising an auto-correcting region having a plurality of interaction locations representing defined keys at known coordinates, which locations correspond to one or more characters of an alphabet, wherein user selection of a determined location corresponds to a key activation event that is appended to a current input sequence;

a memory containing a plurality of objects each comprising a string of one or a plurality of characters forming a word or a part of a word;

an output device; and a processor coupled to the user input device, memory, and output device, said processor comprising:

a distance value calculation component which, for a generated key activation event location, calculates a set of distance values between the key activation event location and the known coordinate locations corresponding to one or a plurality of keys within the auto-correcting region;

a word evaluation component which, for a generated input sequence, identifies one or a plurality of candidate objects in memory, using information regarding both preceding and succeeding user interactions in determining an intended character for each user interaction and for one or a plurality of identified candidate objects evaluates each identified candidate object by calculating a matching metric based on the calculated distance values and the frequency of use associated with the object, and ranks the evaluated candidate objects based on the calculated matching metric values; and a selection component for identifying one or a plurality of candidate objects according to their evaluated ranking, presenting the identified objects to a user, and enabling the user to select one of the presented objects for output to the output device.

47. The text entry system of claim 46, wherein:

the plurality of objects in memory is further associated with one or a plurality of predefined groupings of objects;.and the word evaluation component, for a generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values, and ranks the evaluated candidate objects based on the calculated matching metric values.

48. The system of claim 46, wherein the characters of the alphabet are arranged on the auto-correcting region in approximately a standard telephone keypad layout.

49. The system of claim 46, wherein when a key activation event is detected comprising substantially simultaneous activation of a plurality of adjacent keys in the auto-correcting region, a location corresponding to said key activation event is determined as a function of the locations of the simultaneously activated keys, and said determined location is appended to the current input sequence of the locations of the key activation events.

50. The system of claim 46, wherein said auto-correcting region comprises one or a plurality of interaction locations associated with one or a plurality of punctuation characters and/or diacritic marks, wherein said memory comprises one or a plurality of objects in memory which comprise one or a plurality of the punctuation characters and/or characters accented by diacritic marks associated with keys in said auto-correcting region.

51. The system of claim 46, wherein the word evaluation component calculates a matching metric for candidate objects by summing distance values calculated from a determined location in the input sequence to a known location of the interaction location corresponding to the character in the corresponding position of the candidate object.

52. The system of claim 46, further comprising the step of:

applying a weighting function according to the frequency of use associated with the object.

53. The system of claim 46, wherein at least one of the interaction locations in the auto-correcting region corresponds to a plurality of characters, one or a plurality of which include various diacritic marks, wherein the plurality of characters comprise variant forms of a single base character, and wherein objects in memory are stored with their correct accented characters.

54. The system of claim 46, wherein the selection component presents the identified one or a plurality of candidate objects for selection by the user in a candidate object list.

55. The system of claim 54, wherein the selection component identifies a highest ranked candidate object and presents the identified object in the candidate object list in a position nearest to the auto-correcting region.

56. The system of claim 46, wherein activation of an interaction location that is associated with a character, where said interaction location is not included within the auto-correcting region, accepts and outputs a determined highest ranked candidate object prior to outputting the selected character.

57. The system of claim 46, wherein user selection of an object for output area terminates a current input sequence, wherein a next key activation event within the auto-correcting region starts a new input sequence.

58. The system of claim 46, wherein said virtual keyboard comprises:

any of a laser-projection keyboard, a muscle sensing keyboard, a fabric keyboard, a gesture detection device, a device for tracking eye movement, and a device for detecting brain waves.

* * * * *

UNITED STATES PATENT AND TRADEMARK OFFICE

CERTIFICATE OF CORRECTION

PATENT NO. : 7,030,863 B2
APPLICATION NO. : 11/019517
DATED : April 18, 2006
INVENTOR(S) : Michael R. Longe and Pim va Meurs It is certified that error appears in the above-identified patent and that said Letters Patent is hereby corrected as shown below:

Column 4, line 44 -- delete
"should not be plural?"

Column 4, line 51, 52, and 53 -- delete
"here "an" might be construed as "only one" ? perhaps just pluralized the next "object"?"

Signed and Sealed this

Twenty-third Day of March, 2010

David J. Kappos
*Director of the United States Patent and Trademark Office*